(12) United States Patent
Smith et al.

(10) Patent No.: US 12,381,244 B2
(45) Date of Patent: Aug. 5, 2025

(54) DECOUPLED ELECTRODE ELECTROCHEMICAL ENERGY STORAGE SYSTEM

(71) Applicant: FORM ENERGY INC., Somerville, MA (US)

(72) Inventors: Danielle Cassidy Smith, Cambridge, MA (US); William Henry Woodford, Cambridge, MA (US); Jarrod David Milshtein, Arlington, MA (US); Annelise Thompson, Medford, MA (US); Alexandra Rousseau, Peterborough (CA); Jessa Silver, Roxbury, MA (US)

(73) Assignee: FORM ENERGY, INC., Somerville, MA (US)

( * ) Notice: Subject to any disclaimer, the term of this patent is extended or adjusted under 35 U.S.C. 154(b) by 216 days.

(21) Appl. No.: 17/313,819

(22) Filed: May 6, 2021

(65) Prior Publication Data
US 2021/0351425 A1    Nov. 11, 2021

Related U.S. Application Data

(60) Provisional application No. 63/020,709, filed on May 6, 2020.

(51) Int. Cl.
| | | |
|---|---|---|
| *H01M 8/1027* | (2016.01) | |
| *H01M 4/52* | (2010.01) | |
| *H01M 8/14* | (2006.01) | |

(52) U.S. Cl.
CPC ......... *H01M 8/1027* (2013.01); *H01M 4/521* (2013.01); *H01M 8/146* (2013.01)

(58) Field of Classification Search
CPC .... H01M 8/1027; H01M 4/521; H01M 8/146; H01M 4/9016; H01M 4/9041; H01M 4/96; H01M 2300/006; Y02E 60/10; Y02E 60/50
See application file for complete search history.

(56) References Cited

U.S. PATENT DOCUMENTS

| | | |
|---|---|---|
| 2,083,364 A | 6/1937 | Cook, Jr. et al. |
| 2,643,276 A | 6/1953 | Jean et al. |
| 2,683,182 A | 7/1954 | Jean et al. |
| 3,219,486 A | 11/1965 | Salcedo et al. |
| 3,223,611 A | 12/1965 | Kergan et al. |

(Continued)

FOREIGN PATENT DOCUMENTS

| | | |
|---|---|---|
| CN | 1233861 A | 11/1999 |
| CN | 1535489 A | 10/2004 |

(Continued)

OTHER PUBLICATIONS

Notification of Transmittal of the International Search Report and the Written Opinion of the International Searching Authority for International Patent Application No. PCTUS2021/031184, mailed on Aug. 27, 2021, 9 pages.

(Continued)

*Primary Examiner* — Helen Oi K Conley
(74) *Attorney, Agent, or Firm* — The Marbury Law Group, PLLC

(57) ABSTRACT

Systems and methods of the various embodiments may provide decoupled electrode electrochemical energy storage systems.

17 Claims, 24 Drawing Sheets

(56) References Cited

U.S. PATENT DOCUMENTS

| | | |
|---|---|---|
| 3,329,530 A | 7/1967 | Yutaka et al. |
| 3,338,746 A | 8/1967 | Gunther et al. |
| 3,363,570 A | 1/1968 | Scott |
| 3,415,689 A | 12/1968 | Carson, Jr. et al. |
| 3,483,036 A | 12/1969 | Gregor et al. |
| 3,484,291 A | 12/1969 | MacKenzie, Jr. et al. |
| 3,489,610 A | 1/1970 | Berger et al. |
| 3,525,643 A | 8/1970 | Spahrbier et al. |
| 3,532,548 A | 10/1970 | Stachurski et al. |
| 3,615,843 A | 10/1971 | Moran |
| 3,615,844 A | 10/1971 | Spengler |
| 3,650,837 A | 3/1972 | Palmer |
| 3,686,225 A | 8/1972 | Pedersen et al. |
| 3,713,892 A | 1/1973 | Moran |
| 3,716,413 A | 2/1973 | Eisner |
| 3,717,505 A | 2/1973 | Unkle, Jr. et al. |
| 3,728,244 A | 4/1973 | Cooley et al. |
| 3,785,868 A | 1/1974 | Devitt |
| 3,801,376 A | 4/1974 | Lindstrom |
| 3,822,149 A | 7/1974 | Hale et al. |
| 3,840,455 A | 10/1974 | Cooley et al. |
| 3,847,603 A | 11/1974 | Fukuda et al. |
| 3,850,696 A | 11/1974 | Summers et al. |
| 3,886,426 A | 5/1975 | Daggett |
| 3,888,877 A | 6/1975 | Lehn |
| 3,902,916 A | 9/1975 | Warszawski |
| 3,919,062 A | 11/1975 | Lundquist, Jr. et al. |
| 3,945,849 A | 3/1976 | Hoffman |
| 3,947,292 A | 3/1976 | Jackovitz et al. |
| 3,965,116 A | 6/1976 | Cram |
| 3,966,766 A | 6/1976 | Lehn |
| 3,972,727 A | 8/1976 | Cohn |
| 4,001,212 A | 1/1977 | Richman |
| 4,001,279 A | 1/1977 | Cram |
| 4,007,059 A | 2/1977 | Witherspoon et al. |
| 4,054,725 A | 10/1977 | Tuburaya |
| 4,076,600 A | 2/1978 | Huebner |
| 4,117,205 A | 9/1978 | Kitai |
| 4,119,772 A | 10/1978 | Peters et al. |
| 4,132,837 A | 1/1979 | Soffer |
| 4,139,679 A | 2/1979 | Appleby et al. |
| 4,168,349 A | 9/1979 | Buzzelli |
| 4,201,653 A | 5/1980 | O'Neill et al. |
| 4,246,324 A | 1/1981 | De Nora et al. |
| 4,250,236 A | 2/1981 | Haschka et al. |
| 4,265,789 A | 5/1981 | Christopherson et al. |
| 4,312,927 A | 1/1982 | Salmon |
| 4,317,863 A | 3/1982 | Struthers |
| 4,331,460 A | 5/1982 | Dillmann et al. |
| 4,336,043 A | 6/1982 | Aonuma et al. |
| 4,340,449 A | 7/1982 | Srinivasan et al. |
| 4,369,235 A | 1/1983 | Bursell |
| 4,375,427 A | 3/1983 | Miller et al. |
| 4,384,928 A | 5/1983 | Hall |
| 4,385,101 A | 5/1983 | Catanzarite |
| 4,385,967 A | 5/1983 | Brady et al. |
| 4,386,141 A | 5/1983 | Weidner et al. |
| 4,447,504 A | 5/1984 | Goebel |
| 4,448,858 A | 5/1984 | Graf et al. |
| 4,450,211 A | 5/1984 | Vignaud |
| 4,461,817 A | 7/1984 | Itoh et al. |
| 4,479,856 A | 10/1984 | Ando |
| 4,484,936 A | 11/1984 | Sakai |
| 4,485,154 A | 11/1984 | Remick et al. |
| 4,487,818 A | 12/1984 | Ovshinsky et al. |
| 4,521,497 A | 6/1985 | Tamminen |
| 4,535,039 A | 8/1985 | Naarmann et al. |
| 4,552,630 A | 11/1985 | Wheeler et al. |
| 4,581,064 A | 4/1986 | Morrison et al. |
| 4,585,710 A | 4/1986 | McEvoy |
| 4,605,626 A | 8/1986 | Beck |
| 4,670,363 A | 6/1987 | Whitney et al. |
| 4,684,585 A | 8/1987 | Tamminen |
| 4,693,946 A | 9/1987 | Niksa et al. |
| 4,732,823 A | 3/1988 | Ito et al. |
| 4,765,799 A | 8/1988 | Waldrop |
| 1,828,942 A | 5/1989 | Licht |
| 4,842,963 A | 6/1989 | Ross, Jr. |
| 4,869,979 A | 9/1989 | Ohtani et al. |
| 4,871,627 A | 10/1989 | Strong et al. |
| 4,894,355 A | 1/1990 | Takeuchi et al. |
| 4,952,289 A | 8/1990 | Ciccone et al. |
| 4,977,044 A | 12/1990 | Ludwig |
| 5,006,424 A | 4/1991 | Evans et al. |
| 5,009,755 A | 4/1991 | Shor |
| 5,011,747 A | 4/1991 | Strong et al. |
| 5,041,194 A | 8/1991 | Mori et al. |
| 5,093,213 A | 3/1992 | O'Callaghan |
| 5,104,497 A | 4/1992 | Tetzlaff et al. |
| 5,130,211 A | 7/1992 | Wilkinson et al. |
| 5,131,387 A | 7/1992 | French et al. |
| 5,145,752 A | 9/1992 | Goldstein et al. |
| 5,185,218 A | 2/1993 | Brokman et al. |
| 5,188,914 A | 2/1993 | Blomgren et al. |
| 5,190,833 A | 3/1993 | Goldstein et al. |
| 5,200,057 A | 4/1993 | Canaris |
| 5,242,763 A | 9/1993 | Konishi et al. |
| 5,242,765 A | 9/1993 | Naimer et al. |
| 5,284,176 A | 2/1994 | Campau |
| 5,318,861 A | 6/1994 | Harats et al. |
| 5,360,680 A | 11/1994 | Goldman et al. |
| 5,376,471 A | 12/1994 | Hunter et al. |
| 5,397,532 A | 3/1995 | Blaimschein |
| 5,411,815 A | 5/1995 | Goldstein |
| 5,415,949 A | 5/1995 | Stone et al. |
| 5,419,987 A | 5/1995 | Goldstein et al. |
| 5,431,823 A | 7/1995 | Gofer |
| 5,432,022 A | 7/1995 | Cheiky |
| 5,434,020 A | 7/1995 | Cooper |
| 5,439,758 A | 8/1995 | Stone et al. |
| 5,441,820 A | 8/1995 | Siu et al. |
| 5,445,724 A | 8/1995 | Burkhart et al. |
| 5,451,475 A | 9/1995 | Ohta et al. |
| 5,453,334 A | 9/1995 | Melichar |
| 5,458,988 A | 10/1995 | Putt |
| 5,506,067 A | 4/1996 | Tinker |
| 5,512,391 A | 4/1996 | Fleischer |
| 5,549,991 A | 8/1996 | Licht et al. |
| 5,567,540 A | 10/1996 | Stone et al. |
| 5,569,551 A | 10/1996 | Pedicini et al. |
| 5,569,560 A | 10/1996 | Olsen et al. |
| 5,595,949 A | 1/1997 | Goldstein et al. |
| 5,645,952 A | 7/1997 | Lampinen et al. |
| 5,650,240 A | 7/1997 | Rogers |
| 5,652,068 A | 7/1997 | Shuster et al. |
| 5,665,481 A | 9/1997 | Shuster et al. |
| 5,700,596 A | 12/1997 | Ikoma et al. |
| 5,707,757 A | 1/1998 | Lee |
| 5,712,061 A | 1/1998 | Spak et al. |
| 5,716,726 A | 2/1998 | Cheiky |
| 5,731,105 A | 3/1998 | Fleischer et al. |
| 5,733,667 A | 3/1998 | Nakasuji et al. |
| 5,733,677 A | 3/1998 | Golovin et al. |
| 5,788,943 A | 8/1998 | Aladjov |
| 5,789,585 A | 8/1998 | Lee et al. |
| 5,840,443 A | 11/1998 | Gregg et al. |
| 5,850,136 A | 12/1998 | Kaneko |
| 5,935,724 A | 8/1999 | Spillman et al. |
| 5,935,728 A | 8/1999 | Spillman et al. |
| 5,938,899 A | 8/1999 | Forand |
| 5,972,531 A | 10/1999 | Kawakami |
| 5,990,352 A | 11/1999 | Nobori et al. |
| 5,998,967 A | 12/1999 | Umeki et al. |
| 6,014,013 A | 1/2000 | Suppanz et al. |
| 6,025,696 A | 2/2000 | Lenhart et al. |
| 6,034,506 A | 3/2000 | Hall |
| 6,046,514 A | 4/2000 | Rouillard et al. |
| 6,054,840 A | 4/2000 | Nakanishi et al. |
| 6,057,052 A | 5/2000 | Shrim et al. |
| 6,091,230 A | 7/2000 | Winzer |
| 6,120,941 A | 9/2000 | Lee et al. |
| 6,127,061 A | 10/2000 | Shun et al. |
| 6,153,328 A | 11/2000 | Colborn |
| 6,162,333 A | 12/2000 | Lemon et al. |

(56) References Cited

U.S. PATENT DOCUMENTS

| | | | |
|---|---|---|---|
| 6,162,555 | A | 12/2000 | Gutierrez et al. |
| 6,164,309 | A | 12/2000 | Brecht |
| 6,165,638 | A | 12/2000 | Spillman et al. |
| 6,194,098 | B1 | 2/2001 | Ying et al. |
| 6,207,037 | B1 | 3/2001 | Dartnell et al. |
| 6,210,832 | B1 | 4/2001 | Visco et al. |
| 6,211,650 | B1 | 4/2001 | Mumaw et al. |
| 6,228,535 | B1 | 5/2001 | Fierro et al. |
| 6,249,940 | B1 | 6/2001 | Asano et al. |
| 6,265,846 | B1 | 7/2001 | Flechsig et al. |
| 6,268,085 | B1 | 7/2001 | Manthiram et al. |
| 6,271,646 | B1 | 8/2001 | Evers et al. |
| 6,277,508 | B1 | 8/2001 | Reiser et al. |
| 6,300,015 | B1 | 10/2001 | Nishiyama et al. |
| 6,312,846 | B1 | 11/2001 | Marsh |
| 6,355,369 | B1 | 3/2002 | Iarochenko et al. |
| 6,358,643 | B1 | 3/2002 | Katz et al. |
| 6,368,741 | B1 | 4/2002 | Hackel et al. |
| 6,371,995 | B1 | 4/2002 | Yasunami |
| 6,379,828 | B1 | 4/2002 | Worth |
| 6,383,673 | B1 | 5/2002 | Faris et al. |
| 6,383,675 | B1 | 5/2002 | Zhong |
| 6,410,174 | B1 | 6/2002 | Faris |
| 6,416,649 | B1 | 7/2002 | Ray et al. |
| 6,436,576 | B1 | 8/2002 | Hossain |
| 6,458,480 | B1 | 10/2002 | Morris et al. |
| 6,465,638 | B2 | 10/2002 | Gorman et al. |
| 6,465,643 | B1 | 10/2002 | Schiemenz et al. |
| 6,472,093 | B2 | 10/2002 | Faris et al. |
| 6,475,658 | B1 | 11/2002 | Pedicini et al. |
| 6,537,701 | B1 | 3/2003 | Nimon et al. |
| 6,541,151 | B2 | 4/2003 | Minamiura et al. |
| 6,541,941 | B2 | 4/2003 | Adams et al. |
| 6,544,678 | B2 | 4/2003 | Faris et al. |
| 6,558,830 | B2 | 5/2003 | Faris et al. |
| 6,562,494 | B1 | 5/2003 | Tsai et al. |
| 6,562,504 | B2 | 5/2003 | Faris et al. |
| 6,566,000 | B1 | 5/2003 | Iarochenko et al. |
| 6,569,555 | B1 | 5/2003 | Faris et al. |
| 6,579,637 | B1 | 6/2003 | Savage et al. |
| 6,586,909 | B1 | 7/2003 | Trepka |
| 6,641,943 | B1 | 11/2003 | Faris et al. |
| 6,645,904 | B2 | 11/2003 | Schiemenz et al. |
| 6,646,418 | B1 | 11/2003 | Xie et al. |
| 6,649,294 | B2 | 11/2003 | Faris et al. |
| 6,653,252 | B2 | 11/2003 | Kawahara |
| 6,666,909 | B1 | 12/2003 | TeGrotenhuis et al. |
| 6,673,490 | B2 | 1/2004 | Miki et al. |
| 6,677,077 | B2 | 1/2004 | Spillman et al. |
| 6,706,433 | B2 | 3/2004 | Pinto et al. |
| 6,713,206 | B2 | 3/2004 | Markoski et al. |
| 6,756,149 | B2 | 6/2004 | Knights et al. |
| 6,762,587 | B1 | 7/2004 | Barbetta |
| 6,764,588 | B2 | 7/2004 | Smedley et al. |
| 6,776,929 | B2 | 8/2004 | Hossan et al. |
| 6,786,226 | B2 | 9/2004 | Crook et al. |
| 6,787,260 | B2 | 9/2004 | Smedley |
| 6,790,265 | B2 | 9/2004 | Joshi et al. |
| 6,802,946 | B2 | 10/2004 | Basol et al. |
| 6,811,819 | B2 | 11/2004 | Joshi et al. |
| 6,811,903 | B2 | 11/2004 | Vartak et al. |
| 6,822,423 | B2 | 11/2004 | Yau et al. |
| 6,838,203 | B2 | 1/2005 | Zheng |
| 6,849,172 | B2 | 2/2005 | Rigby et al. |
| 6,849,356 | B2 | 2/2005 | Dow et al. |
| 6,855,455 | B1 | 2/2005 | Berger et al. |
| 6,858,347 | B2 | 2/2005 | Tanigawa et al. |
| 6,866,950 | B2 | 3/2005 | Connor et al. |
| 6,899,974 | B2 | 5/2005 | Kamisuki et al. |
| 6,902,602 | B2 | 6/2005 | Keefer et al. |
| 6,911,274 | B1 | 6/2005 | Colborn et al. |
| 6,942,105 | B2 | 9/2005 | Smedley et al. |
| 6,949,310 | B2 | 9/2005 | Phillips |
| 6,962,992 | B2 | 11/2005 | Martin et al. |
| 6,967,064 | B2 | 11/2005 | Haltiner, Jr. et al. |
| 6,986,964 | B2 | 1/2006 | Faris |
| 7,020,355 | B2 | 3/2006 | Lahann et al. |
| 7,040,431 | B2 | 5/2006 | Tartamella et al. |
| 7,060,388 | B2 | 6/2006 | Naruoka |
| 7,070,632 | B1 | 7/2006 | Visco |
| 7,126,310 | B1 | 10/2006 | Barron |
| 7,150,933 | B1 | 12/2006 | McLean |
| 7,201,857 | B2 | 4/2007 | Ovshinsky et al. |
| 7,226,676 | B2 | 6/2007 | Faris et al. |
| 7,238,440 | B2 | 7/2007 | Damore et al. |
| 7,252,898 | B2 | 8/2007 | Markoski et al. |
| 7,270,906 | B2 | 9/2007 | Haltiner, Jr. et al. |
| 7,273,541 | B2 | 9/2007 | Choban et al. |
| 7,276,309 | B2 | 10/2007 | Smedley et al. |
| 7,279,245 | B1 | 10/2007 | Clark |
| 7,285,362 | B2 | 10/2007 | Harrup et al. |
| 7,291,186 | B2 | 11/2007 | Zhang |
| 7,303,835 | B2 | 12/2007 | Mathias et al. |
| 7,466,104 | B2 | 12/2008 | Wang et al. |
| 7,468,221 | B2 | 12/2008 | LaFollette et al. |
| 7,482,081 | B2 | 1/2009 | Hong |
| 7,488,547 | B1 | 2/2009 | Iacovelli |
| 7,535,199 | B2 | 5/2009 | Kimura et al. |
| 7,556,056 | B2 | 7/2009 | Hutchinson |
| 7,598,796 | B2 | 10/2009 | Mizuno et al. |
| 7,670,575 | B2 | 3/2010 | Jarvinen et al. |
| 7,670,705 | B2 | 3/2010 | Ueda et al. |
| 7,670,724 | B1 | 3/2010 | Chan et al. |
| 7,722,988 | B2 | 5/2010 | Webber |
| 7,794,582 | B1 | 9/2010 | Cook et al. |
| 7,964,300 | B2 | 6/2011 | Nakazawa et al. |
| 7,997,425 | B2 | 8/2011 | Golden et al. |
| 8,058,165 | B2 | 11/2011 | Kawano et al. |
| 8,168,337 | B2 | 5/2012 | Friesen et al. |
| 8,206,469 | B2 | 6/2012 | Chiang et al. |
| 8,309,259 | B2 | 11/2012 | Friesen et al. |
| 8,329,346 | B2 | 12/2012 | Janse et al. |
| 8,361,288 | B2 | 1/2013 | Reece et al. |
| 8,397,508 | B2 | 3/2013 | Weimer et al. |
| 8,481,207 | B2 | 7/2013 | Friesen et al. |
| 8,491,763 | B2 | 7/2013 | Friesen |
| 8,492,052 | B2 | 7/2013 | Friesen et al. |
| 8,632,921 | B2 | 1/2014 | Friesen et al. |
| 8,659,268 | B2 | 2/2014 | Krishnan et al. |
| 8,758,948 | B2 | 6/2014 | Narayan et al. |
| 8,877,391 | B2 | 11/2014 | Friesen et al. |
| 8,895,197 | B2 | 11/2014 | Friesen et al. |
| 8,906,563 | B2 | 12/2014 | Friesen et al. |
| 8,911,910 | B2 | 12/2014 | Krishnan et al. |
| 9,065,120 | B2 | 6/2015 | Carlson |
| 9,105,910 | B2 | 8/2015 | Friesen et al. |
| 9,105,946 | B2 | 8/2015 | Friesen et al. |
| 9,172,123 | B2 | 10/2015 | Albertus et al. |
| 9,178,207 | B2 | 11/2015 | Friesen et al. |
| 9,214,708 | B2 | 12/2015 | Friesen et al. |
| 9,263,779 | B2 | 2/2016 | Lee et al. |
| 9,269,995 | B2 | 2/2016 | Friesen et al. |
| 9,269,996 | B2 | 2/2016 | Friesen et al. |
| 9,269,998 | B2 | 2/2016 | Hayes et al. |
| 9,368,486 | B2 | 6/2016 | Wang et al. |
| 9,368,788 | B2 | 6/2016 | Ogg et al. |
| 9,419,273 | B2 | 8/2016 | Kakeya et al. |
| 9,478,806 | B2 | 10/2016 | Ogg et al. |
| 9,537,144 | B2 | 1/2017 | Huang et al. |
| 9,559,385 | B2 | 1/2017 | Ogg et al. |
| 9,577,298 | B2 | 2/2017 | Narayan et al. |
| 9,583,779 | B2 | 2/2017 | Chiang et al. |
| 9,660,265 | B2 | 5/2017 | Visco et al. |
| 9,680,151 | B2 | 6/2017 | Mullins et al. |
| 9,680,154 | B2 | 6/2017 | Chen et al. |
| 9,780,379 | B2 | 10/2017 | Zhamu et al. |
| 9,843,064 | B2 | 12/2017 | Brandon et al. |
| 9,893,397 | B2 | 2/2018 | Yoshida et al. |
| 9,911,985 | B2 | 3/2018 | Dong et al. |
| 9,947,481 | B2 | 4/2018 | Solomon et al. |
| 10,008,754 | B2 | 6/2018 | Englert |
| 10,014,530 | B2 | 7/2018 | Lang et al. |
| 10,033,036 | B2 | 7/2018 | Christensen et al. |
| 10,044,082 | B2 | 8/2018 | Suyama et al. |

(56) References Cited

U.S. PATENT DOCUMENTS

| | | |
|---|---|---|
| 10,147,988 B2 | 12/2018 | Park et al. |
| 10,177,426 B2 | 1/2019 | Nitta |
| 10,302,320 B2 | 5/2019 | Howard |
| 10,530,001 B2 | 1/2020 | Finkelshtain et al. |
| 11,228,066 B2 | 1/2022 | Krishnan et al. |
| 11,611,115 B2 | 3/2023 | Pham et al. |
| 2001/0007725 A1 | 7/2001 | Faris et al. |
| 2002/0015871 A1 | 2/2002 | Tao et al. |
| 2002/0028372 A1 | 3/2002 | Ohlsen et al. |
| 2002/0045075 A1 | 4/2002 | Pinto et al. |
| 2002/0076602 A1 | 6/2002 | Finkelshtain et al. |
| 2002/0098398 A1 | 7/2002 | Chen |
| 2002/0142203 A1 | 10/2002 | Ma et al. |
| 2002/0155351 A1 | 10/2002 | Licht |
| 2003/0054217 A1 | 3/2003 | Faris |
| 2003/0077501 A1 | 4/2003 | Knights et al. |
| 2003/0099882 A1 | 5/2003 | Hampden-Smith et al. |
| 2003/0134163 A1 | 7/2003 | Markoski et al. |
| 2003/0143446 A1 | 7/2003 | Faris et al. |
| 2003/0165727 A1 | 9/2003 | Priestnall et al. |
| 2003/0190504 A1 | 10/2003 | Fisher et al. |
| 2003/0198862 A1 | 10/2003 | Struthers |
| 2004/0005488 A1 | 1/2004 | Faris et al. |
| 2004/0023112 A1 | 2/2004 | Lin |
| 2004/0029723 A1 | 2/2004 | Schiemenz et al. |
| 2004/0031251 A1 | 2/2004 | Priess |
| 2004/0053132 A1 | 3/2004 | Smedley et al. |
| 2004/0058203 A1 | 3/2004 | Priestnall et al. |
| 2004/0058217 A1 | 3/2004 | Ohlsen et al. |
| 2004/0058226 A1 | 3/2004 | Lamarre et al. |
| 2004/0086779 A1 | 5/2004 | Higley et al. |
| 2004/0104124 A1 | 6/2004 | Cobley et al. |
| 2004/0110049 A1 | 6/2004 | Shimotori et al. |
| 2004/0121208 A1 | 6/2004 | James et al. |
| 2004/0146764 A1 | 7/2004 | Tsai et al. |
| 2004/0157092 A1 | 8/2004 | Kimberg et al. |
| 2004/0157101 A1 | 8/2004 | Smedley |
| 2004/0175603 A1 | 9/2004 | Yang et al. |
| 2004/0180246 A1 | 9/2004 | Smedley |
| 2004/0185323 A1 | 9/2004 | Fowler et al. |
| 2004/0185328 A1 | 9/2004 | Lin et al. |
| 2004/0221426 A1 | 11/2004 | Igawa et al. |
| 2004/0225249 A1 | 11/2004 | Leonard et al. |
| 2004/0229107 A1 | 11/2004 | Smedley |
| 2004/0247969 A1 | 12/2004 | Faris et al. |
| 2005/0019634 A1 | 1/2005 | Legg |
| 2005/0019651 A1 | 1/2005 | Tsai et al. |
| 2005/0031911 A1 | 2/2005 | Venkatesan et al. |
| 2005/0042503 A1 | 2/2005 | Kim et al. |
| 2005/0084737 A1 | 4/2005 | Wine et al. |
| 2005/0105229 A1 | 5/2005 | Deng et al. |
| 2005/0123815 A1 | 6/2005 | Tsai et al. |
| 2005/0142398 A1 | 6/2005 | Browall et al. |
| 2005/0170245 A1 | 8/2005 | Vartak et al. |
| 2005/0196656 A1 | 9/2005 | Gomez |
| 2005/0208343 A1 | 9/2005 | Kim et al. |
| 2005/0233191 A1 | 10/2005 | Ushio |
| 2006/0003217 A1 | 1/2006 | Cohen et al. |
| 2006/0024551 A1 | 2/2006 | Smotkin |
| 2006/0038536 A1 | 2/2006 | LaFollette et al. |
| 2006/0039853 A1 | 2/2006 | Fan et al. |
| 2006/0040174 A1 | 2/2006 | Peabody |
| 2006/0076295 A1 | 4/2006 | Leonard et al. |
| 2006/0107639 A1 | 5/2006 | Hamlin et al. |
| 2006/0127731 A1 | 6/2006 | Faris |
| 2006/0175720 A1 | 8/2006 | Kerfoot |
| 2006/0194107 A1 | 8/2006 | Licht |
| 2006/0210867 A1 | 9/2006 | Kenis et al. |
| 2006/0228622 A1 | 10/2006 | Cohen et al. |
| 2006/0234855 A1 | 10/2006 | Gorte et al. |
| 2006/0269826 A1 | 11/2006 | Katz et al. |
| 2006/0281000 A1 | 12/2006 | Hayashigawa |
| 2006/0292407 A1 | 12/2006 | Gervasio et al. |
| 2007/0020496 A1 | 1/2007 | Pelton et al. |
| 2007/0048577 A1 | 3/2007 | Ringeisen et al. |
| 2007/0077491 A1 | 4/2007 | Burchardt |
| 2007/0092787 A1 | 4/2007 | Wang Chen |
| 2007/0099037 A1 | 5/2007 | Senner |
| 2007/0120091 A1 | 5/2007 | Ovshinsky et al. |
| 2007/0134527 A1 | 6/2007 | Desouza et al. |
| 2007/0141415 A1 | 6/2007 | Yang et al. |
| 2007/0141430 A1 | 6/2007 | Huang et al. |
| 2007/0141432 A1 | 6/2007 | Wang et al. |
| 2007/0141440 A1 | 6/2007 | Yang et al. |
| 2007/0141450 A1 | 6/2007 | Yang et al. |
| 2007/0154766 A1 | 7/2007 | Baik et al. |
| 2007/0166602 A1 | 7/2007 | Burchardt |
| 2007/0184314 A1 | 8/2007 | Kagami |
| 2007/0224500 A1 | 9/2007 | White et al. |
| 2007/0234900 A1 | 10/2007 | Soloveichik et al. |
| 2007/0237993 A1 | 10/2007 | Carlsson et al. |
| 2007/0248845 A1 | 10/2007 | Armstrong et al. |
| 2007/0248868 A1 | 10/2007 | Haltiner et al. |
| 2007/0259234 A1 | 11/2007 | Chua et al. |
| 2007/0264550 A1 | 11/2007 | Zhang et al. |
| 2007/0269695 A1 | 11/2007 | Yamazaki et al. |
| 2007/0278107 A1 | 12/2007 | Barnett et al. |
| 2007/0283811 A1 | 12/2007 | Wu |
| 2007/0287034 A1 | 12/2007 | Minteer et al. |
| 2008/0008911 A1 | 1/2008 | Stroock et al. |
| 2008/0009780 A1 | 1/2008 | Leonard et al. |
| 2008/0026265 A1 | 1/2008 | Markoski et al. |
| 2008/0032170 A1 | 2/2008 | Wainright et al. |
| 2008/0044721 A1 | 2/2008 | Heller et al. |
| 2008/0118826 A1 | 5/2008 | Shimamura et al. |
| 2008/0131762 A1 | 6/2008 | Joo et al. |
| 2008/0145719 A1 | 6/2008 | Yang et al. |
| 2008/0145721 A1 | 6/2008 | Shapiro et al. |
| 2008/0145737 A1 | 6/2008 | Cai et al. |
| 2008/0154101 A1 | 6/2008 | Jain et al. |
| 2008/0231231 A1 | 9/2008 | Hartzog |
| 2008/0241617 A1 | 10/2008 | Sato |
| 2008/0252257 A1 | 10/2008 | Sufrin-Disler et al. |
| 2008/0268341 A1 | 10/2008 | Zhang |
| 2009/0018668 A1 | 1/2009 | Galbraith |
| 2009/0027006 A1 | 1/2009 | Vezzini et al. |
| 2009/0081488 A1 | 3/2009 | Sato et al. |
| 2009/0087700 A1 | 4/2009 | Carlisle et al. |
| 2009/0117429 A1 | 5/2009 | Zillmer et al. |
| 2009/0163394 A1 | 6/2009 | Muraishi et al. |
| 2009/0167242 A1 | 7/2009 | Naganuma et al. |
| 2009/0230921 A1 | 9/2009 | Hsu et al. |
| 2009/0233153 A1 | 9/2009 | Carlisle et al. |
| 2009/0239131 A1 | 9/2009 | Winter |
| 2009/0239132 A1 | 9/2009 | Johnson |
| 2009/0284229 A1 | 11/2009 | Friesen et al. |
| 2009/0286149 A1 | 11/2009 | Ci et al. |
| 2009/0305090 A1 | 12/2009 | Chuang |
| 2010/0003570 A1 | 1/2010 | Finsterwalder et al. |
| 2010/0055508 A1 | 3/2010 | Renn |
| 2010/0062303 A1 | 3/2010 | Bae et al. |
| 2010/0062313 A1 | 3/2010 | Browning et al. |
| 2010/0119895 A1 | 5/2010 | Friesen |
| 2010/0119956 A1 | 5/2010 | Tokuda et al. |
| 2010/0178582 A1 | 7/2010 | Zhang et al. |
| 2010/0196768 A1 | 8/2010 | Roberts et al. |
| 2010/0261272 A1 | 10/2010 | Chalmers et al. |
| 2010/0266907 A1 | 10/2010 | Yazami |
| 2010/0285375 A1 | 11/2010 | Friesen et al. |
| 2010/0310905 A1 | 12/2010 | Oriet et al. |
| 2010/0310947 A1 | 12/2010 | Rich et al. |
| 2010/0316935 A1 | 12/2010 | Friesen et al. |
| 2011/0023428 A1 | 2/2011 | Ziebold et al. |
| 2011/0027648 A1 | 2/2011 | Rolison et al. |
| 2011/0039181 A1 | 2/2011 | Friesen et al. |
| 2011/0044528 A1 | 2/2011 | Tsuchiya et al. |
| 2011/0045325 A1 | 2/2011 | Anzai et al. |
| 2011/0059355 A1 | 3/2011 | Zhang et al. |
| 2011/0070481 A1 | 3/2011 | Liang et al. |
| 2011/0070506 A1 | 3/2011 | Friesen et al. |
| 2011/0086278 A1 | 4/2011 | Friesen et al. |
| 2011/0111314 A1 | 5/2011 | Cui et al. |
| 2011/0143219 A1 | 6/2011 | Weiss et al. |
| 2011/0189551 A1 | 8/2011 | Friesen et al. |

(56) References Cited

U.S. PATENT DOCUMENTS

| | | |
|---|---|---|
| 2011/0200893 A1 | 8/2011 | Friesen et al. |
| 2011/0236730 A1 | 9/2011 | Jones |
| 2011/0250512 A1 | 10/2011 | Friesen et al. |
| 2011/0281184 A1 | 11/2011 | Friesen et al. |
| 2011/0305959 A1 | 12/2011 | Friesen et al. |
| 2011/0316485 A1 | 12/2011 | Krishnan et al. |
| 2012/0009491 A1 | 1/2012 | Friesen et al. |
| 2012/0015264 A1 | 1/2012 | Friesen et al. |
| 2012/0021303 A1 | 1/2012 | Amendola et al. |
| 2012/0034536 A1 | 2/2012 | Isom et al. |
| 2012/0052404 A1 | 3/2012 | Friesen et al. |
| 2012/0068667 A1 | 3/2012 | Friesen et al. |
| 2012/0098499 A1 | 4/2012 | Friesen et al. |
| 2012/0139496 A1 | 6/2012 | Krishnan et al. |
| 2012/0187918 A1 | 7/2012 | Narayan et al. |
| 2012/0193224 A1 | 8/2012 | Suk |
| 2012/0193242 A1 | 8/2012 | Marchal |
| 2012/0202127 A1 | 8/2012 | Friesen et al. |
| 2012/0237838 A1 | 9/2012 | Uesaka |
| 2012/0295172 A1 | 11/2012 | Peled et al. |
| 2012/0321969 A1 | 12/2012 | Friesen et al. |
| 2012/0321970 A1 | 12/2012 | Friesen et al. |
| 2013/0022881 A1 | 1/2013 | Friesen et al. |
| 2013/0052013 A1 | 2/2013 | Eckart |
| 2013/0078548 A1 | 3/2013 | Lee et al. |
| 2013/0095393 A1 | 4/2013 | Friesen et al. |
| 2013/0106359 A1 | 5/2013 | Noda et al. |
| 2013/0115523 A1 | 5/2013 | Friesen et al. |
| 2013/0115525 A1 | 5/2013 | Friensen et al. |
| 2013/0115526 A1 | 5/2013 | Friesen et al. |
| 2013/0115531 A1 | 5/2013 | Amendola et al. |
| 2013/0115532 A1 | 5/2013 | Friesen et al. |
| 2013/0115533 A1 | 5/2013 | Friesen et al. |
| 2013/0149615 A1 | 6/2013 | Narayan et al. |
| 2013/0183591 A1 | 7/2013 | Dickson |
| 2013/0189592 A1 | 7/2013 | Roumi et al. |
| 2013/0285597 A1 | 10/2013 | Goldstein |
| 2013/0295471 A1 | 11/2013 | Visco et al. |
| 2014/0091631 A1 | 4/2014 | Naden et al. |
| 2014/0162096 A1 | 6/2014 | Lex et al. |
| 2014/0162129 A1 | 6/2014 | Kim et al. |
| 2014/0191727 A1 | 7/2014 | Toussaint et al. |
| 2014/0217985 A1 | 8/2014 | Gifford et al. |
| 2014/0220256 A1 | 8/2014 | Ogg |
| 2014/0220432 A1 | 8/2014 | Ogg et al. |
| 2014/0220434 A1 | 8/2014 | Ogg |
| 2014/0220435 A1 | 8/2014 | Ogg et al. |
| 2014/0220440 A1 | 8/2014 | Ogg |
| 2014/0220460 A1 | 8/2014 | Ogg et al. |
| 2014/0227615 A1 | 8/2014 | Friesen et al. |
| 2014/0234730 A1 | 8/2014 | Albertus et al. |
| 2014/0262760 A1 | 9/2014 | Hayes et al. |
| 2014/0272477 A1 | 9/2014 | West et al. |
| 2014/0342214 A1 | 11/2014 | Wegner et al. |
| 2015/0010833 A1 | 1/2015 | Amendola et al. |
| 2015/0086884 A1 | 3/2015 | Narayan et al. |
| 2015/0140360 A1 | 5/2015 | Arthur et al. |
| 2015/0140455 A1 | 5/2015 | Imano |
| 2015/0200431 A1 | 7/2015 | Martirosyan et al. |
| 2015/0240368 A1 | 8/2015 | Iacopetti et al. |
| 2015/0295291 A1 | 10/2015 | Sata et al. |
| 2015/0303539 A1 | 10/2015 | Stevens et al. |
| 2015/0372357 A1 | 12/2015 | Kruglak et al. |
| 2016/0020493 A1 | 1/2016 | Van Dijk et al. |
| 2016/0036094 A1 | 2/2016 | Ogg |
| 2016/0036095 A1 | 2/2016 | Ogg |
| 2016/0045841 A1 | 2/2016 | Kaplan et al. |
| 2016/0111730 A1 | 4/2016 | Kim et al. |
| 2016/0118636 A1 | 4/2016 | Jin et al. |
| 2016/0248136 A1 | 8/2016 | Bugga et al. |
| 2016/0293978 A1 | 10/2016 | Krishnan et al. |
| 2016/0308220 A1 | 10/2016 | Qi et al. |
| 2017/0141434 A1 | 5/2017 | Narayan et al. |
| 2017/0170451 A1 | 6/2017 | Englert |
| 2017/0173557 A1 | 6/2017 | Olson et al. |
| 2017/0207464 A1 | 7/2017 | Gyenge et al. |
| 2017/0214265 A1 | 7/2017 | Stevens et al. |
| 2017/0271731 A1 | 9/2017 | Hayashi et al. |
| 2017/0301922 A1 | 10/2017 | Goodenough et al. |
| 2017/0346147 A1 | 11/2017 | Weisenstein et al. |
| 2017/0352936 A1 | 12/2017 | Jin |
| 2018/0010228 A1 | 1/2018 | Ogg et al. |
| 2018/0048041 A1 | 2/2018 | Chen et al. |
| 2018/0123116 A1 | 5/2018 | Lee et al. |
| 2018/0145383 A1 | 5/2018 | Krishnan et al. |
| 2018/0219220 A1 | 8/2018 | Hayashi et al. |
| 2018/0241107 A1 | 8/2018 | Su et al. |
| 2018/0287237 A1 | 10/2018 | Manthiram et al. |
| 2018/0366799 A1 | 12/2018 | Amendola et al. |
| 2019/0006122 A1 | 1/2019 | Peled et al. |
| 2019/0006695 A1 | 1/2019 | Swiegers et al. |
| 2019/0051908 A1 | 2/2019 | Chen et al. |
| 2019/0074536 A1 | 3/2019 | Lee et al. |
| 2019/0229343 A1 | 7/2019 | Roumi et al. |
| 2020/0006745 A1 | 1/2020 | Westwood et al. |
| 2020/0006796 A1 | 1/2020 | Su et al. |
| 2020/0006828 A1 | 1/2020 | Milshtein et al. |
| 2020/0006896 A1 | 1/2020 | Mahadik et al. |
| 2020/0036002 A1 | 1/2020 | Chakraborty et al. |
| 2020/0068358 A1 | 2/2020 | Macrae |
| 2020/0136153 A1 | 4/2020 | Jaramillo et al. |
| 2020/0266423 A1 | 8/2020 | Kitagawa et al. |
| 2020/0280064 A1 | 9/2020 | Takahashi et al. |
| 2020/0411879 A1 | 12/2020 | Hartman et al. |
| 2020/0411932 A1 | 12/2020 | Weber et al. |
| 2021/0013536 A1 | 1/2021 | Golden et al. |
| 2021/0028452 A1 | 1/2021 | Su et al. |
| 2021/0028457 A1 | 1/2021 | Newhouse et al. |
| 2021/0036283 A1 | 2/2021 | Børsheim et al. |
| 2021/0351425 A1 | 11/2021 | Smith et al. |

FOREIGN PATENT DOCUMENTS

| | | |
|---|---|---|
| CN | 1543685 A | 11/2004 |
| CN | 2888658 Y | 4/2007 |
| CN | 101142706 A | 3/2008 |
| CN | 102232004 A | 11/2011 |
| CN | 103003199 A | 3/2013 |
| CN | 103098299 A | 5/2013 |
| CN | 103280604 A | 9/2013 |
| CN | 103400947 A | 11/2013 |
| CN | 1103443982 A | 12/2013 |
| CN | 103515636 A | 1/2014 |
| CN | 104269570 A | 1/2015 |
| CN | 104767006 A | 7/2015 |
| CN | 106575800 A | 4/2017 |
| CN | 206340592 U | 7/2017 |
| CN | 109478653 A | 3/2019 |
| CN | 107196013 B | 6/2019 |
| CN | 114134521 A | 3/2022 |
| DE | 1266021 B | 4/1968 |
| EP | 0037634 A1 | 10/1981 |
| EP | 0058090 A1 | 8/1982 |
| EP | 0277937 A1 | 8/1988 |
| EP | 0677883 A1 | 10/1995 |
| EP | 0598144 B1 | 10/1996 |
| EP | 0637291 B1 | 10/1997 |
| EP | 0664932 B1 | 1/1998 |
| EP | 0832502 A1 | 4/1998 |
| EP | 0823135 B1 | 11/1998 |
| EP | 0895528 A1 | 2/1999 |
| EP | 0987349 A1 | 3/2000 |
| EP | 0835334 B1 | 9/2002 |
| EP | 1027747 B1 | 9/2002 |
| EP | 1413001 B1 | 4/2005 |
| EP | 1266413 B1 | 5/2005 |
| EP | 1723687 A1 | 11/2006 |
| EP | 1723687 B1 | 5/2010 |
| EP | 2274781 A1 | 1/2011 |
| EP | 1977475 B1 | 2/2012 |
| EP | 2486622 B1 | 7/2014 |
| EP | 2424016 B1 | 10/2014 |
| EP | 2823528 B1 | 3/2016 |
| EP | 2586092 B1 | 1/2017 |

(56) References Cited

FOREIGN PATENT DOCUMENTS

| | | |
|---|---|---|
| EP | 2619835 B1 | 6/2017 |
| EP | 2792004 B1 | 11/2017 |
| EP | 2721688 B1 | 2/2018 |
| EP | 2774205 B1 | 3/2018 |
| EP | 2954583 B1 | 4/2018 |
| EP | 2559097 B1 | 5/2018 |
| EP | 2596545 B1 | 6/2018 |
| EP | 2659536 B1 | 8/2018 |
| EP | 2973842 B1 | 5/2019 |
| GB | 1238356 A | 7/1971 |
| GB | 1286173 A | 8/1972 |
| IN | 201917002254 A | 4/2019 |
| JP | S4827097 A | 4/1973 |
| JP | S4827097 B1 | 8/1973 |
| JP | S56500790 A | 6/1981 |
| JP | S56162870 A | 12/1981 |
| JP | S56162870 U | 12/1981 |
| JP | H01159973 A | 6/1989 |
| JP | H01163977 A | 6/1989 |
| JP | H0790662 A | 4/1995 |
| JP | H09501256 A | 2/1997 |
| JP | H10509554 A | 9/1998 |
| JP | 2000205200 A | 7/2000 |
| JP | 2002194411 A | 7/2002 |
| JP | 3387724 B2 | 3/2003 |
| JP | 2008251491 A | 10/2008 |
| JP | 2008277315 A | 11/2008 |
| JP | 2009529213 A | 8/2009 |
| JP | 2009543674 A | 12/2009 |
| JP | 2010140736 A | 6/2010 |
| JP | 2010192313 A | 9/2010 |
| JP | 2010262876 A | 11/2010 |
| JP | 2011003313 A | 1/2011 |
| JP | 2011173083 A | 9/2011 |
| JP | 2011228079 A | 11/2011 |
| JP | 2012518095 A | 8/2012 |
| JP | 2013503257 A | 1/2013 |
| JP | 2013505544 A | 2/2013 |
| JP | 2013507741 A | 3/2013 |
| JP | 2013134838 A | 7/2013 |
| JP | 2014127289 A | 7/2014 |
| JP | 2014150056 A | 8/2014 |
| JP | 2015076379 A | 4/2015 |
| JP | 2016091605 A | 5/2016 |
| JP | 5952540 B2 | 7/2016 |
| JP | 2016136521 A | 7/2016 |
| JP | 6032018 B2 | 11/2016 |
| JP | 2017076595 A | 4/2017 |
| JP | 2017139231 A | 8/2017 |
| JP | 6234917 B2 | 11/2017 |
| JP | 2017216126 A | 12/2017 |
| JP | 2018006057 A | 1/2018 |
| JP | 2018006121 A | 1/2018 |
| JP | 2018046020 A | 3/2018 |
| JP | 2018067399 A | 4/2018 |
| JP | 6352884 B2 | 7/2018 |
| JP | 6363244 B2 | 7/2018 |
| JP | 2018529207 A | 10/2018 |
| JP | 6682102 B2 | 4/2020 |
| KR | 20110101891 A | 9/2011 |
| KR | 20120122053 A | 11/2012 |
| KR | 20140068850 A | 6/2014 |
| KR | 20160115912 A | 10/2016 |
| KR | 20180063144 A | 6/2018 |
| KR | 20190066865 A | 6/2019 |
| TW | 201929311 A | 7/2019 |
| WO | 8402429 A1 | 6/1984 |
| WO | 8905528 A1 | 6/1989 |
| WO | 9321664 A1 | 10/1993 |
| WO | 0201666 A2 | 1/2002 |
| WO | 2008058165 A2 | 5/2008 |
| WO | 2009087917 A1 | 7/2009 |
| WO | 2010065890 A1 | 6/2010 |
| WO | 2011035176 A1 | 3/2011 |
| WO | 2011044528 A1 | 4/2011 |
| WO | 2011103142 A1 | 8/2011 |
| WO | 2011163553 A1 | 12/2011 |
| WO | 2012012364 A1 | 1/2012 |
| WO | WO 2012-012558 A2 | 1/2012 |
| WO | PCT/US2012/031639 * | 10/2012 ............ H01M 4/86 |
| WO | WO2012138576 A1 | 10/2012 |
| WO | 2012156972 A1 | 11/2012 |
| WO | 2013005050 A1 | 1/2013 |
| WO | 2012174433 A3 | 3/2013 |
| WO | 2013053653 A2 | 4/2013 |
| WO | 2013090680 A2 | 6/2013 |
| WO | 2014124386 A1 | 8/2014 |
| WO | 2014142666 A1 | 9/2014 |
| WO | 2015042573 A1 | 3/2015 |
| WO | 2015119041 A1 | 8/2015 |
| WO | 2015145690 A1 | 10/2015 |
| WO | 2015150784 A1 | 10/2015 |
| WO | 2016088673 A1 | 6/2016 |
| WO | 2016138594 A1 | 9/2016 |
| WO | 2016197109 A1 | 12/2016 |
| WO | 2017006666 A1 | 1/2017 |
| WO | 2017045072 A1 | 3/2017 |
| WO | 2017049414 A1 | 3/2017 |
| WO | 2017075577 A1 | 5/2017 |
| WO | 2017117373 A1 | 7/2017 |
| WO | 2017223219 A1 | 12/2017 |
| WO | 2018009930 A2 | 1/2018 |
| WO | 2018018036 A1 | 1/2018 |
| WO | 2018052376 A1 | 3/2018 |
| WO | 2018187561 A1 | 10/2018 |
| WO | 2020006419 A1 | 1/2020 |
| WO | 2020006436 A1 | 1/2020 |
| WO | 2020006506 A2 | 1/2020 |
| WO | 2020023912 A1 | 1/2020 |
| WO | WO2020067226 A1 | 4/2020 |
| WO | 2020264344 A1 | 12/2020 |
| WO | 2020264386 A1 | 12/2020 |
| WO | 2020264415 A1 | 12/2020 |
| WO | 2021021681 A1 | 2/2021 |
| WO | 2021021685 A1 | 2/2021 |
| WO | 2021226399 A1 | 11/2021 |
| WO | 2022048931 A1 | 3/2022 |

OTHER PUBLICATIONS

Timofeeva, E.V. et al., Rechargeable Nanofluid Electrodes for High Energy Density Flow Battery, NSTI-Nanotech, vol. 2, pp. 679-682, (2013).

Yu, W. et al., "Toward a new generation of low cost, efficient, and durable metal-air flow batteries," Journal of Materials Chemistry A, vol. 7, p. 26744-26768, (2019);https://doi.org/10.1039/C9TA10658H.

Chinese Office Action dated Dec. 28, 2015 for Chinese Application No. 2012102393449, 27 pages, including English-language translation.

Office Action for Chinese Application No. 201780034966.9, mailed Mar. 31, 2022, 19 pages, including English-language translation.

International Preliminary Report on Patentability for International Application No. PCT/US2021/031184, mailed Nov. 17, 2022, 6 Pages.

Office Action for Chinese Application No. 201780034966.9, mailed Jan. 13, 2023, 17 pages, including English-language translation.

Office Action for Chinese Application No. 201780034966.9, mailed Jul. 3, 2023, 29 pages, including English-language translation.

Song T., et al., "Solubility and Diffusivity of Oxygen in Ionic Liquids," Oct. 10, 2019, Journal of Chemical and Engineering Data, vol. 64, pp. 4956-4967.

International Search Report and Written Opinion in PCT/US2023/072684, mailed Dec. 18, 2023, 10 pages.

Second Office Action in CN201980056771.3, mailed 2024-06-13, 12 pages.

Office Action in U.S. Appl. No. 16/913,877, mailed Mar. 12, 2024, 12 pages.

International Search Report and Written Opinion in PCT/US2023/076700, mailed Jan. 22, 2024, 13 pages.

(56) References Cited

OTHER PUBLICATIONS

Cao, Z. et al., "Planar all-solid-state rechargeable Zn—air batteries for compact wearable energy storage", Journal of Materials Chemistry A, 2019, vol. 7, pp. 17581-17593.
International Search Report and Written Opinion in PCT/US2023/072680, mailed Dec. 18, 2023, 10 pages.
Yang B., et al., "Organo Sulfur Molecules Enable Iron-Based Battery Electrodes to Meet the Challenges of Large-Scale Electrical Energy Storage," Energy Environment Science, 2014, vol. 7, pp. 2753-2763.
Yang C., et al., "Unique Aqueous Li-ion/sulfur Chemistry With High Energy Density and Reversibility," Proceedings of the National Academy of Sciences of the United States of America, Jun. 13, 2017, vol. 114, No. 24, pp. 6197-6202, Retrieved from URL:www.pnas.org/cgi/doi/10.1073/pnas.1703937114.
You S., et al., "A Microbial Fuel Cell Using Permanganate as the Cathodic Electron Acceptor," Journal of Power Sources, 2006, vol. 162, pp. 1409-1415.
Yu X., et al., "A Voltage-Enhanced, Low-Cost Aqueous Iron-Air Battery Enabled with a Mediator-Ion Solid Electrolyte," ACS Energy Letters, 2017, vol. 2, pp. 1050-1055, DOI: 10.1021/acsenergylett.7b00168.
Yun S., et al., "Materials and Device Constructions for Aqueous Lithium-Sulfur Batteries," Advanced Functional Materials, 2018, vol. 28, pp. 1-17, (1707593), DOI: 10.1002/adfm.201707593.
Zheng J., et al., "Rotating Ring-Disk Electrode Method," Rotating Electrode Methods and Oxygen Reduction Electrocatalysts, NL , Elsevier, Apr. 25, 2014, pp. 199-229, Doi: 10.1016/B978-0-444-63278-4.00006-9, ISBN 9780444632784, XP009522170.
Agarwal R.C., et al., "Study of Electrical and Electrochemical Behaviour on Hot-press Synthesized Nano-Composite Polymer Electrolyte (NCPE) Membranes: [(70PEO: 30 KNO3) + x SiO2]," International Journal of Electrochemical Science, 2011, vol. 6, pp. 867-881.
Al W., et al., "A Novel Graphene-Polysulfide Anode Material for High-Performance Lithium-Ion Batteries," Scientific Reports, 2013, vol. 3, No. 2341, 5 pages, DOI: 10.1038/srep0234.
Al-Hoshan M.S., et al., "Synthesis, Physicochemical and Electrochemical Properties of Nickel Ferrite Spinels Obtained by Hydrothermal Method for the Oxygen Evolution Reaction (OER)," International Journal of Electrochemical Science, 2012, vol. 7, pp. 4959-4973.
Arunchander A., et al., "Synthesis of Flower-Like Molybdenum Sulfide/Graphene Hybrid as an Efficient Oxygen Reduction Electrocatalyst for Anion Exchange Membrane Fuel Cells," Journal of Power Sources, 2017, vol. 353, pp. 104-114.
Bisoi S., et al., "Gas Separation Properties of Troeger's Base-Bridged Polyamides," e-Polymers, 2017, vol. 17, No. 4, pp. 283-293, DOI: https://doi.org/10.1515/epoly-2016-0291.
Blurton K.F., et al., "Metal/Air Batteries: Their Status and Potential—A Review," Journal of Power Sources, 1979, vol. 4, pp. 263-279.
Burke M.S., et al., "Cobalt-Iron (Oxy)Hydroxide Oxygen Evolution Electrocatalysts: The Role of Structure and Composition on Activity, Stability, and Mechanism," J. Am. Chem. Soc., vol. 137, pp. 3638-3648, DOI: 10.1021/acs.5b00281, (2015).
Burke M.S., et al., "Oxygen Evolution Reaction Electrocatalysis on Transition Metal Oxides and (Oxy)hydroxides: Activity Trends and Design Principles," Department of Chemistry and Biochemistry, University of Oregon, Eugene, Pregon 97403, United States, Chemistry of Materials, 2015, 10 pages.
"Busbar," Lexico.com, US Dictionary, Oxford University Press, Retrieved on Oct. 13, 2021, 1 page, Retrieved from URL: https://www.lexico.com/en/definition/busbar.
Cakan R.D., et al., "An Aqueous Electrolyte Rechargeable Li-ion/Polysulfide Battery," Journal of Materials Chemistry A, GB, 2014, vol. 2, No. 24, 5 Pages, DOI:10.1039/C4TA01308E, ISSN 2050-7488, XP055886889, Retrieve from URL: https://pubs.rsc.org/en/content/articlepdf/2014/ta/cAta01308e.
Carta M., et al., "The Synthesis of Microporous Polymers Using Troger's Base Formation," Polymer Chemistry, 2014 vol. 5, No. 18, pp. 5267-5272, DOI:10.1039/CAPY00609G, ISSN 1759-9954, XP055770813.
Chakraborty R., et al., "Negative Electrodes For Electrochemical Cells," U.S. Appl. No. 16/523,722, filed Jul. 26, 2019, 157 Pages.
Chen Y., et al., "Harvesting Polysulfides by Sealing the Sulfur Electrode in a Composite Ion-Selective Net," Journal of Power Sources, 2017, vol. 368, pp. 38-45.
Cherepy N.J., et al., "A Zinc/Air Fuel Cell for Electric Vehicles," IEEE publication, 1999, pp. 11-14.
Chiang Y.M., et al., "High Capacity, Temperature-Stable Lithium Aluminum Manganese Oxide Cathodes for Rechargeable Batteries," Electrochemical and Solid-State Letters, 1999, vol. 2, No. 3, pp. 107-110.
Chinese Office Action dated Dec. 28, 2015 for Appln. No. 2015122301567800.
Chinese Office Action dated Feb. 19, 2013 (with partial English Language translation) of Chinese Patent Appin. No. 201220585211.2 filed Nov. 162012, 4 Pages.
Chinese Office Action dated Feb. 3, 2017 for Application No. 2012800344431, 7 pages.
Chinese Office Action dated Jul. 18, 2016 for Appln. No. 2012102393449.
Chinese Office Action dated May 4, 2016 for Application No. 2012800344431, 17 pages.
Chinese Search Report dated Dec. 6, 2012 of Chinese Appl No. 201220336003.9 filed Jul. 10, 2012 (1 page Chinese Actionwith 3-page Engl. translation).
Cohen J.L., et al., "Fabrication and Preliminary Testing of a Planar Membraneless Microchannel Fuel Cell," Journal of Power Sources, 2005, vol. 139, pp. 96-105.
Colli A.N., et al., "High Energy Density MnO4-/MnO42—Redox Couple for Alkaline Redox Flow Batteries," Chemical Communications, 2016, vol. 52, pp. 14039-14042.
Communication under Rule 71(3) EPC, EP Application No. 14749407.4, dated Sep. 29, 2017, 6 Pages.
Cui B., et al., "Improved Cycle Iron Molten Air Battery Performance Using a Robust Fin Air Electrode," Journal of The Electrochemical Society, 2017, vol. 164, No. 2, pp. A88-A92.
Decision to Grant EP Application No. 14749407.4 dated Mar. 8, 2018, 2 Pages.
Demir-Cakan R., et al., "Use of Ion-selective Polymer Membranes for an Aqueous Electrolyte Rechargeable Li-ion-Polysulphide Battery," Journal of Materials Chemistry A, 2015, vol. 3, pp. 2869-2875, DOI: 10.1039/c4ta05756b.
Dias F.B., et al., "Trends in Polymer Electrolytes for Secondary Lithium Batteries", Journal of Power Sources, 2000, vol. 88, pp. 169-191.
Djefors L., et al., "An-Iron-Air Vehicle Battery," Journal of Power Sources, 1977, vol. 2, pp. 287-296.
Egashira M., et al., "Iron-Air (Secondary and Primary)," Yamaguchi University, Yamaguchi, Japan & 2009 Elsevier B.V. All rights reserved, 2009, pp. 372-375.
Examination Report for Australian Patent Application No. 2014214641 dated Jun. 26, 2017, 6 pages.
Extended European Search Report for European Application No. 12845720.7, mailed Jul. 16, 2015, 7 Pages.
Extended European Search Report for European Application No. 14749407.4, mailed Aug. 31, 2016, 6 Pages.
Extended European Search Report for European Application No. 19826880.7, mailed Feb. 4, 2022, 8 Pages.
Extended European Search Report for European Application No. 19827057.1, mailed Feb. 11, 2022, 8 Pages.
Extended European Search Report of EP Application No. 09751078.8, dated Jul. 27, 2012, 6 Pages.
Ferrigno R., et al., "Membraneless Vanadium Redox Fuel Cell Using Laminar Flow," Journal of American Chemical Society, 2002, vol. 124, pp. 12930-12931.
Figueredo-Rodriguez H.A., et al., "A Rechargeable, Aqueous Iron Air Battery with Nanostructured Electrodes Capable of High Energy Density Operation," Journal of The Electrochemical Society, 2017, vol. 164, No. 6, pp. A1148-A1157.

(56) References Cited

OTHER PUBLICATIONS

Gross M.M., et al., "Aqueous Polysulfide-Air Battery with a Mediator-Ion Solid Electrolyte and a Copper Sulfide Catalyst for Polysulfide Redox," ACS Applied Energy Materials, 2018, vol. 1, No. 12, 7 Pages, DOI: 10.1021/acsaem.8b01679.
Hall D.E., "Porous Nickel-Coated Steel Anodes for Alkaline Water Electrolysis: Corrosion Resistance," Journal of the Electrochemical Society, Feb. 1982, vol. 129, No. 2, pp. 310-315.
Hall D.E., "Ni(OH)2—Impregnated Anodes for Alkaline Water Electrolysis," Journal of Electrochemical Society, 1983, vol. 130, No. 2, pp. 517-521.
Hang B.T., et al., "Effect of Additives on the Electrochemical Properties of Fe2O3/C Nanocomposite for Fe/air Battery Anode," Journal of Electroanalytical Chemistry, 2016, vol. 762, pp. 59-65.
Hang B.T., et al., "Effect of Metal sulfide Additives on Electrochemical Properties of Nano-sized Fe2O3—Loaded carbon or Fe/air Battery Anodes," Journal of Power Sources, 2007, vol. 168, pp. 522-532.
"High," Lexico.com, US Dictionary, Oxford University Press, Retrieved on Oct. 13, 2021, 7 pages, Retrieved from URL: https://www.lexico.com/en/definition/high.
International Preliminary Report on Patentability (Chapter 1 of the Patent Cooperation Treaty) for International Application No. PCT/US2009/040658 dated Dec. 2, 2010, 5 Pages.
International Preliminary Report on Patentability for International Application No. PCT/US12/47395 mailed Sep. 19, 2014, 27 pages.
International Preliminary Report on Patentability for International Application No. PCT/US12/62503 mailed Nov. 27, 2013, 25 pages.
International Preliminary Report on Patentability for International Application No. PCT/US2011/049558 mailed Jan. 11, 2013, 15 pages.
International Preliminary Report on Patentability for International Application No. PCT/US2012/062503, dated Oct. 19, 2013, 25 Pages.
International Preliminary Report on Patentability for International Application No. PCT/US2014/015613, mailed Aug. 20, 2015, 19 Pages.
Mitra D., et al., "An Efficient and Robust Surface-Modified Iron Electrode for Oxygen Evolution in Alkaline Water Electrolysis," Journal of the Electrochemical Society, 2018, vol. 165, No. 5, pp. F392-F400.
Narayan S. R., et al., "Bi-Functional Oxygen Electrodes-Challenges and Prospects," The Electrochemical Society Interface, Summer 2015, pp. 65-69.
Neburchilov V., et al., "Metal-Air And Metal-Sulfur Batteries: Fundamentals and Applications," CRC PressTaylor & Francis Group, 6000 Broken Sound Parkway NW, Suite 300, Boca Raton, FL 33487-2742, Taylor 1 Francis Group, LLC, CRC Press is an imprint of Taylor & Francis Group, an Informa business, 2017, 210 Pages.
"Nickel," Efunda: The Ultimate Online Reference for Engineers, eFunda, Inc., Web, Sep. 5, 2014.
Non-Final Office Action dated Oct. 8, 2019 issued in corresponding Japanese Patent Application No. 2018-550404 with English translation, 4 pages.
Non-final Office Action U.S. Appl. No. 14/505,234 dated Aug. 25, 2017, 15 Pages.
Notice of Allowance for U.S. Appl. No. 14/505,234 dated Jun. 29, 2018, 10 Pages.
Notice of Allowance Japanese Patent Application No. 2015-557176 dated Mar. 13, 2018 with English translation, 5 pages.
Notification Concerning Transmittal of a International Preliminary Report on Patentability and Written Opinion of the International Search Authority for International Patent Application No. PCT/US2018/026243, mailed Oct. 17, 2019 9 pages.
Notification of Transmittal of the International Search Report and Written Opinion of the International Search Authority or International Patent Application No. PCT/US2020/039889, mailed Oct. 15, 2020, 11 pages.

Notification of Transmittal of the International Search Report and Written Opinion of the International Search Authority or International Patent Application No. PCT/US2020/039942, mailed Oct. 22, 2020, 17 pages.
Notification of Transmittal of the International Search Report and Written Opinion of the International Search Authority or International Patent Application No. PCT/US2020/039976, mailed Oct. 23, 2020, 11 pages.
Office Action dated Jan. 13, 2012 issued in corresponding Chinese Patent Application No. 201120307185.2 w/English translation, 9 Pages.
Office Action dated Jun. 17, 2021, issued in corresponding Brazilian Application No. BR112019000713-0 with informal anslation, 5 Pages.
Office Action dated Jun. 3, 2021, issued in corresponding Chinese Patent Application No. 201780045371.3 with English translation, 8 Pages.
Office Action dated Mar. 28, 2017 in Chinese Application 201480017311.7, 21 pages.
Office Action dated May 7, 2021, issued in corresponding Chinese Patent Application No. 201780034966.9, with English translation, 18 pages.
Office Action for Australian Patent Application No. 2012332825 dated Nov. 25, 2015, 3 pages.
Office Action for Canadian Patent Application 2853245 dated Jun. 15, 2017, 3 pages.
Office Action for Canadian Patent Application 2853245 dated Sep. 23, 2016, 3 pages.
Office Action for Indian Patent Application No. 201817034674 dated May 27, 2020, 7 pages.
Office Action issued in corresponding Japanese Patent Application No. 2017-093977 dated May 8, 2018 with English translation, 4 pages.
Office Action issued in corresponding Mexico Application No. MX/a/2014/005136 dated Apr. 17, 2018.
Pan J., et al., "Constructing Ionic Highway in Alkaline Polymer Electrolytes," Energy and Environmental Science, 2014, vol. 7, pp. 354-360.
Park C.H., et al., "Electrochemical Stability and Conductivity Enhancement of Composite Polymer Electrolytes," Solid State Ionics, 2003, vol. 159, pp. 111-119.
Perkins N.R., et al., "Hydrogen Oxidation Electrodes and Electrochemical Cells Including the Same," U.S. Appl. No. 16/951,396, filed Nov. 18, 2020, 88 Pages.
"PTFE," Polymers: A Properties Database (Online), Taylor and Francis Group, LLC, Web, Sep. 5, 2014.
Rejection Decision, Japanese Patent Application No. 2015-557176 dated Oct. 17, 2017 with English translation, 12 pages.
Roe S., et al., "A High Energy Density Vanadium Redox Flow Battery with 3 M Vanadium Electrolyte," Journal of The Electrochemical Society, 2016, vol. 163, No. 1, pp. A5023-A5028.
Ross P.N., et al., "Feasibility Study of a New Zinc-Air Battery Concept Using Flowing Alkaline Electrolyte," Intersociety Energy Conversion Engineering Conference, Aug. 25, 1986, vol. 2, pp. 1066-1072.
Salloum et al., "Sequential Flow Membraneless Microfluidic Fuel Cell with Porous Electrodes," Journal of Power Sources, 2008, vol. 180, pp. 243-252.
Sandal H. et al., "Iron-Based Heterogeneous Catalysts for Oxygen Evolution Reaction, change in Perspective from Activity Promoter to Active Catalyst," Journal of Power Sources, 2018, vol. 395, 22 pages.
Sayilgan E., et al., "A Review of Technologies for the Recovery of Metals from Spent Alkaline and Zinc-Carbon Batteries," Hydrometallurgy, 2009, vol. 97, No. 3-4, pp. 158-166, XP026116549.
Second Office Action Chinese Patent Application No. 201480017311.7 dated Feb. 2, 2018 with English translation.
Sen R.K., et al., "Metal-Air Battery Assessment," Prepared for Office of Energy Storage and Distribution Conservation and Renewable Energy, The U.S. Department of Energy under Contract DE-AC06-76RLO 1830, Pacific Northwest Laboratory, Operated for the U.S. Department of Energy, 1988, 96 Pages.

(56) References Cited

OTHER PUBLICATIONS

Sevinc S., et al., "In-Situ Tracking of NaFePO4 Formation In Aqueous Electrolytes and its Electrochemical Performances In Na-Ion/Polysulfide Batteries," Journal of Power Sources, 2019, vol. 412, pp. 55-62.
Smedley, et al., "A Regenerative Zinc-air Fuel Cell," Journal of Power Sources, 2007, vol. 165, pp. 897-904.
Smith R.D.L., et al., "Water Oxidation Catalysis: Electrocatalytic Response to Metal Stoichiometry in Amorphous Metal Oxide Films Containing Iron, Cobalt, and Nickel," Journal of the American Chemical Society, 2013, vol. 135, No. 31, pp. 11580-11586.
Tekin B., et al., "A New Sodium-Based Aqueous Rechargeable Battery System: The Special Case of Na0.44MnO2/Dissolved Sodium Polysulfide," Energy Technology, 2017, vol. 5, pp. 2182-2188, DOI: 10.1002/ente.201700245.
Thirsk H.R., "Electrochemistry," Thirsk, Ed., The Chemical Society Great Britain Oxford Alden Press, 1974, vol. 4, pp. 16.
Tian B., et al., "The Effect of Na2S Additive in Alkaline Electrolyte on Improved Performances of Fe-Based Air Batteries," Electrochimica Acta, 2018, vol. 259, pp. 196-203.
Trocino S., et al., "High Performance Solid-State Iron-Air Rechargeable Ceramic Battery Operating at Intermediate Temperatures (500-650 C)," Applied Energy, 2019, 9 Pages.
Wei X., et al., "An Aqueous Redox Flow Battery Based on Neutral Alkali Metal Ferri/Ferrocyanide and Polysulfide Electrolytes," Journal of The Electrochemical Society, Nov. 13, 2015, vol. 163, No. 1, pp. A5150-A5153, XP055667015.
Weinrich H., et al., "Understanding the Nanoscale Redox-Behavior of Iron-Anodes for Rechargeable Iron-Air Batteries," Nano Energy, Institute of Energy and Climate Research-Fundamental Electrochemistry (IEK-9) Center for Nanophase Materials Sciences, Oak Ridge National Laboratory. Oak Ridge, Tennessee 378, US, 2017, 46 pages, View Online https://doi.Org/10.1016/j.nanoen.2017.10.023.
Wijayamohanan K., et al., "Rechargeable Alkaline Iron Electrodes," Journal of Power Sources, 1991, vol. 34, pp. 269-285.
Wilke S.K., et al., "Structural Evolution of Directionally Freeze-Cast Iron Foams During Oxidation/Reduction Cycles," Acta Materialia, 2019, vol. 162, pp. 90-102.
Written Opinion for International Application No. PCT/US2016/036026, mailed Sep. 29, 2016, 14 Pages.
Written Opinion of the International Preliminary Examining Authority dated Feb. 24, 2017 for Application. No. PCT/US2016/023564.
Written Opinion of the International Preliminary Examining Authority PCT/US2016/036026 dated May 9, 2017, 13 Pages.
Written Opinion of the International Searching Authority PCT/US2019/031118 dated Aug. 29, 2019, 13 Pages.
International Preliminary Report on Patentability for International Application No. PCT/US2016/023564, dated May 30, 2017, 16 Pages.
International Preliminary Report on Patentability for International Application No. PCT/US2016/036026 mailed Oct. 13, 2017, 26 Pages.
International Preliminary Report on Patentability for International Application No. PCT/US2017/043489, dated Aug. 6, 2018, 20 Pages.
International Preliminary Report on Patentability for International Application No. PCT/US2017/043500, dated Jul. 23, 2018, 18 Pages.
International Preliminary Report on Patentability for International Application No. PCT/US2019/039844, mailed Jan. 7, 2021, 11 Pages.
International Preliminary Report on Patentability for International Application No. PCT/US2019/039973, mailed Jan. 7, 2021, 20 Pages.
International Preliminary Report on Patentability for International Application No. PCT/US2020/031760, dated Nov. 25, 2021, 07 Pages.
International Preliminary Report on Patentability for International Application No. PCT/US2020/039889, mailed Jan. 6, 2022, 8 Pages.
International Preliminary Report on Patentability for International Application No. PCT/US2020/061081, mailed Jun. 2, 2022, 07 Pages.
International Search Report and Written Opinion for International Application No. PCT/US2011/049558 mailed Nov. 16, 2011, 11 pages.
International Search Report and Written Opinion for International Application No. PCT/US2012/047395 mailed Sep. 28, 2012, 10 pages.
International Search Report and Written Opinion for International Application No. PCT/US2012/062503, mailed Jan. 24, 2013, 09 Pages.
International Search Report and Written Opinion for International Application No. PCT/US2014/015613, mailed Jul. 11, 2014, 23 Pages.
International Search Report and Written Opinion for International Application No. PCT/US2016/023564, mailed Jun. 16, 2016, 12 Pages.
International Search Report and Written Opinion for International Application No. PCT/US2017/043489, mailed Nov. 29, 2017, 12 Pages.
International Search Report and Written Opinion for International Application No. PCT/US2017/043500, mailed Nov. 29, 2017, 12 Pages.
International Search Report and Written Opinion for International Application No. PCT/US2020/061081, mailed Apr. 19, 2021, 10 Pages.
International Search Report and Written Opinion of International Application No. PCT/US2020/043630, mailed Nov. 11, 2020, 9 Pages.
International Search Report and Written Opinion of the International Application No. PCT/US2020/043639, mailed Nov. 13, 2020, 11 Pages.
International Search Report and Written Opinion of the International Searching Authority dated Aug. 25, 2020, issued In corresponding International Application No. PCT/US2020/031760, 13 Pages.
International Search Report and Written Opinion of the International Searching Authority for International Patent Application No. PCT/US2018/026243, mailed Jul. 27, 2018, 12 Pages.
International Search Report and Written Opinion of the International Searching Authority for International Patent Application No. PCT/US2019/039844, mailed Oct. 23, 2019, 15 Pages.
International Search Report and Written Opinion of the International Searching Authority for International Patent Application No. PCT/US2019/039867, mailed Nov. 15, 2019, 19 Pages.
International Search Report and Written Opinion of the International Searching Authority for International Patent Application No. PCT/US2019/039973, mailed Jan. 13, 2020, 26 Pages.
International Search Report and Written Opinion of the International Searching Authority for International Patent Application No. PCT/US2019/043745, mailed Nov. 13, 2019, 17 Pages.
International Search Report for International Application No. PCT/US2009/039460, mailed May 26, 2009, 3 pages.
International Search Report for International Application No. PCT/US2009/040658, mailed Aug. 24, 2009, 3 pages.
International Search Report for International Application No. PCT/US2016/036026, mailed Sep. 29, 2016, 05 Pages.
International Search Report for International Application No. PCT/US2019/031118 dated Aug. 29, 2019, 3 pages.
Japanese Office Action dated Feb. 9, 2016 for Application No. 2014-540009, 14 pages.
Japanese Office Action dated Jan. 10, 2017 for Application No. 2014-540009, 17 pages.
Jayashree, et al., "Air-Breathing Laminar Flow-Based Microfluidic Fuel Cell," Journal of American Chemical Society, 2005, vol. 127, pp. 16758-16759.
Ji X., et al., "Stabilizing Lithium-Sulphur Cathodes Using Polysulphide Reservoirs," Nature Communications, 2011, vol. 2, No. 325, 8 Pages, View Online, DOI: 10.1038/icomms1293.

(56) References Cited

OTHER PUBLICATIONS

Jin X., et al., "A High-Fidelity Multiphysics Model for the New Solid Oxide Iron-Air Redox Battery Part I: Bridging Mass Transport and Charge Transfer with Redox Cycle Kinetics," Journal of Power Sources, 2015, vol. 280, pp. 195-204.
Jorne J., et al., "Suppression of Dendrites and Roughness during Electrodeposition by Impinging Flow," Journal of the Electrochemical Society, Jun. 1987, vol. 134, No. 6, pp. 1399-1402.
Kadyk T., et al., "How to Enhance Gas Removal from Porous Electrodes?," Scientific Reports, 2016, vol. 6, No. 38780, pp. 1-14, View Online, DOI: 10.1038/SREP38780.
Klaus S., et al., "Effects of Fe Electrolyte Impurities on Ni(OH)2/NiOOH Structure and Oxygen Evolution Activity," View Online, Journal of Physical Chemistry C, 2015, vol. 119, No. 13, pp. 7243-7254, DOI:10.1021/acs.jpcc.5b00105.
Li Q., et al., "All Solid Lithium Polymer Batteries With a Novel Composite Polymer Electrolyte," Solid State Ionics, 2003, vol. 159, pp. 97-109.
Li Z., et al., "A High-Energy and Low-Cost Polysulfide/iodide Redox Flow Battery," Nano Energy, 2016, vol. 30, pp. 283-292.
Li Z., et al., "Air-Breathing Aqueous Sulfur Flow Battery for Ultralow-Cost Long-Duration Electrical Storage," Joule 1, Cell Press, Oct. 11, 2017, vol. 1, No. 2, pp. 306-327, doi:10.1016/j.joule.2017.08.007, ISSN 2542-4351, XP055667017.
Li Z., et al., "Air-Breathing Aqueous Sulfur Flow Battery for Ultralow-Cost Long-Duration Electrical Storage," Joule, Oct. 11, 2017, vol. 1, No. 2, pp. 306-327, XP055667017.
Licht S., "A Novel Aqueous Aluminum Permanganate Fuel Cell," Electrochemistry Communications, 1999, vol. 1, pp. 33-36.
"Low," Lexico.com, US Dictionary, Oxford University Press, Retrieved on Oct. 13, 2021, 5 Pages, Retrieved from URL: https://www.lexico.com/en/definition/low.
Mainar A.R., et al., "Alkaline Aqueous Electrolytes for Secondary Zinc-Air Batteries: An Overview," International Journal of Energy Research, 2016, vol. 40, pp. 1032-1049.
Malkhandi S., et al., "Organo-Sulfur Additives for Suppressing Hydrogen Evolution in Iron-air Battery," Abstract #688, 220th ECS Meeting, The Electrochemical Society, 2011, 1 page.
Matsuda A., et al., "Preparation of Hydroxide Ion Conductive KOH-ZrO2 Electrolyte for all Solid State Iron/Air Secondary Battery," Solid State Ionics, 2014, vol. 262, pp. 188-191.
Maurya S., et al., "A Review on Recent Developments of Anion Exchange Membranes for Fuel Cells and Redox Flow Batteries," View online DOI: 10.1039/c5ra04741b, RSC Advances, 2015, vol. 5, pp. 37206-37230.
McKerracher R.D., et al., "A Review of the Iron-Air Secondary Battery for Energy Storage," View online DOI: 0.1002/cplu.201402238, ChemPlusChem, 2015, vol. 80, pp. 323-335.
Merle G., et al., "Anion exchange membranes for alkaline fuel cells: A review," Journal of Membrane Science, 2011, vol. 377, 35 pages.
Mitra D., et al., "A Stable and Electrocatalytic Iron Electrode for Oxygen Evolution in Alkaline Water Electrolysis," published Online https://doi.org/10.1007/s11244-018-0971-9, Springer Science+Business Media, LLC, part of Springer Nature 2018, Apr. 23, 2018, 10 pages.
Notice of Allowance in U.S. Appl. No. 16/457,253, mailed Oct. 16, 2024, 7 pages.
Office Action in CN2019800567713, dated Aug. 30, 2024, 2 pages.
International Search Report and Written Opinion in PCT/US2023/030935, mailed Dec. 14, 2023, 9 pages.
Office Action in CN201980056772.8, mailed Jul. 11, 2024, 12 pages.
Office Action in TW109144569, mailed Sep. 5, 2024, 15 pages.
Notice of Allowance in U.S. Appl. No. 16/913,877, mailed Oct. 1, 2024, 10 pages.
Final Office Action in U.S. Appl. No. 16/951,396, mailed Oct. 10, 2024, 9 pages.
Partial Supplementary European Search Report in EP20889924.5, dated Jan. 2, 2025, 10 pages.
"Diaphragm." New Oxford American Dictionary, edited by Angus Stevenson and Christine A. Lindberg, Oxford University Press, 2010. Retrieved from the Internet: <URL: https://www.oxfordreference.com/view/10.1093/acref/9780195392883.001.0001/m_en_us1240123>, 1 page.
International Search Report and Written Opinion in PCT/US2024/036765, mailed Oct. 7, 2024, 13 pages.

\* cited by examiner

OER Electrode

DECOUPLED ELECTRODE ELECTROCHEMICAL ENERGY STORAGE SYSTEM

RELATED APPLICATIONS

This application claim priority to U.S. Provisional Application No. 63/020,709 filed May 6, 2020 entitled "Decoupled Electrode Electrochemical Energy Storage System", the entire contents of which are incorporated herein by reference for all purposes.

BACKGROUND

Energy storage technologies are playing an increasingly important role in electric power grids; at a most basic level, these energy storage assets provide smoothing to better match generation and demand on a grid. The services performed by energy storage devices are beneficial to electric power grids across multiple time scales, from milliseconds to years. Today, energy storage technologies exist that can support timescales from milliseconds to hours, but there is a need for long and ultra-long duration (collectively, at least ≥8 h) energy storage systems.

Metal-air batteries are attractive options for electrochemical energy storage due to the low cost and abundance of air as a reagent for the energy storing reactions. Many challenges associated with the development of metal-air batteries are associated with the mechanical cell architecture. Certain architectures which are suitable for small-scale storage, such as are used for zinc-air hearing aid batteries, are not suitable for large scale energy storage, such as for grid-connected applications.

Iron-air batteries are useful for long duration storage because of the low cost of chemicals, which enables an entitlement to long duration at an economically viable cost structure. A static iron-air battery uses a fixed iron anode and operates with a direct, inverse, relationship between duration and current density, i.e. to achieve long duration, current density must be lowered. One of the challenges of this cell and system architecture is that the parasitic losses due to balance of plant subsystems (e.g., air delivery, water management, etc.) are often relatively fixed—i.e., there is some fixed parasitic loss almost independent of the current density. Thus, on a percentage basis, the losses are greater as current density is decreased. Therefore, it is advantageous to have a system which can achieve long duration and high current density.

In energy storage systems with a solid metal plus oxygen chemistry, the energy storage capacity scales with the amount of metal in the system. It is helpful to the system design to be able to decouple the energy storage capacity from the desired power capability, which is predominantly determined by elements other than the solid metal component.

This Background section is intended to introduce various aspects of the art, which may be associated with embodiments of the present inventions. Thus, the foregoing discussion in this section provides a framework for better understanding the present inventions, and is not to be viewed as an admission of prior art.

SUMMARY

Systems and methods of the various embodiments may provide decoupled electrode electrochemical energy storage systems. Various embodiments may provide an iron-air flow battery. Various embodiments may provide a metal/air energy storage system in which the metal is mobile. In various embodiments, the metal electrode may comprise direct reduced iron (DRI).

Various embodiments may provide a metal/air energy storage system, comprising: a metal electrode vessel, the metal electrode vessel comprising a bed of metal; at least one other electrode; and a pump configured to move electrolyte between the metal electrode vessel and the at least one other electrode Various embodiments may provide an iron-air flow battery, comprising: a fully open reactor through which iron materials and air are flowed.

Various embodiments may provide a metal/air energy storage system, comprising: a metal flow passage; metal pellets; one or more air electrodes; and one or more separators configured to separate the metal flow passage from the one or more air electrodes, wherein the system is configured such that the metal pellets are flowed through the metal flow passage past the one or more air electrode

BRIEF DESCRIPTION OF THE FIGURES

The accompanying drawings, which are incorporated herein and constitute part of this specification, illustrate example embodiments of the claims, and together with the general description given above and the detailed description given below, serve to explain the features of the claims.

DETAILED DESCRIPTION

Figure 1:
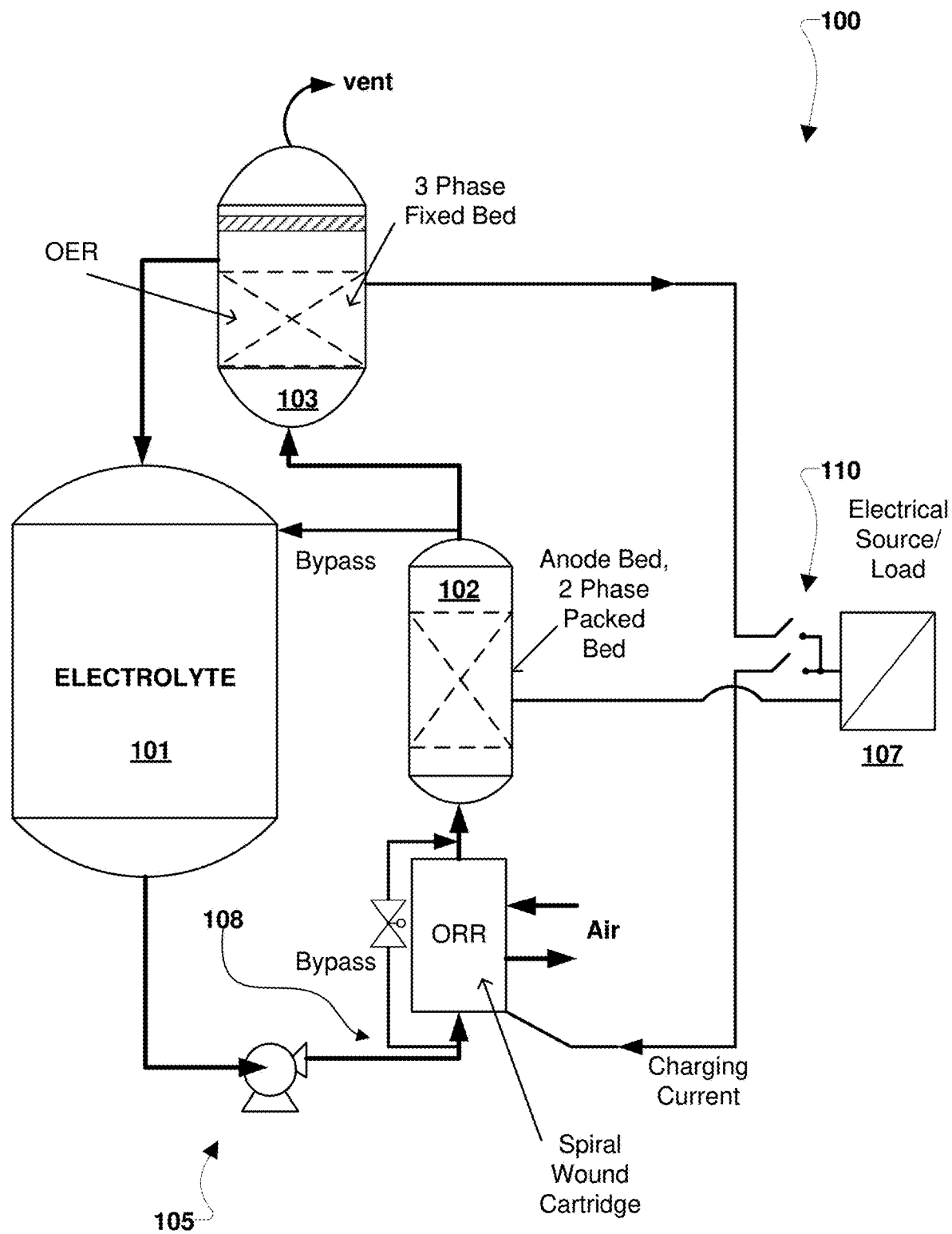
FIG. 1 illustrates a decoupled electrode electrochemical energy storage system according to various embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims. The following description of the embodiments of the invention is not intended to limit the invention to these embodiments but rather to enable a person skilled in the art to make and use this invention.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard ambient temperature and pressure.

Generally, the term "about" as used herein unless specified otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

The following examples are provided to illustrate various embodiments of the present systems and methods of the present inventions. These examples are for illustrative purposes, may be prophetic, and should not be viewed as limiting, and do not otherwise limit the scope of the present inventions.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories may not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and, with existing equipment or activities which may be modified, in-part, based on the teachings of this specification. Further, the various embodiments and examples set forth in this specification may be used with each other, in whole or in part, and in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular figure.

Embodiments of the present invention include apparatus, systems, and methods for long-duration, and ultra-long-duration, low-cost, energy storage. Herein, "long duration" and/or "ultra-long duration" may refer to periods of energy storage of 8 hours or longer, such as periods of energy storage of 8 hours, periods of energy storage ranging from 8 hours to 20 hours, periods of energy storage of 20 hours, periods of energy storage ranging from 20 hours to 24 hours, periods of energy storage of 24 hours, periods of energy storage ranging from 24 hours to a week, periods of energy storage ranging from a week to a year (e.g., such as from several days to several weeks to several months), etc. In other words, "long duration" and/or "ultra-long duration" energy storage cells may refer to electrochemical cells that may be configured to store energy over time spans of days, weeks, or seasons. For example, the electrochemical cells may be configured to store energy generated by solar cells during the summer months, when sunshine is plentiful and solar power generation exceeds power grid requirements, and discharge the stored energy during the winter months, when sunshine may be insufficient to satisfy power grid requirements.

In energy storage systems with a solid metal plus oxygen chemistry, the energy storage capacity scales with the amount of metal in the system. It is helpful to the system design to be able to decouple the energy storage capacity from the desired power capability, which is predominantly determined by elements other than the solid metal component.

Performance advantages of these battery architecture configurations are shown in Table 1 and Table 2. Table 1 depicts possible performance attributes where the metal electrode and air electrodes are housed in separate vessels and the electrolyte is flowing through the vessels according to various embodiments (e.g., as illustrated and discussed with reference to FIGS. 1-10):

TABLE 1

| Reactor Property | Embodiment Range |
| --- | --- |
| Anode Vessel Volume | 0.5-100 m$^3$ |
| Electrolyte Vessel Volume | 0.5-100 m$^3$ |
| Air Electrodes Current Density | 3-200 mA/cm$^2$ |
| Superficial Electrolyte Velocity | 1-100 cm/s |
| Auxiliary Power Load | 5-300 kW/MW |
| Reactor Lifetime | 5-30 years |
| Reactor Discharge Duration | 25-500 hours |

Table 2 depicts possible performance attributes where the air electrode(s) is stationary and the metal electrode is flowing through an electrochemical reactor in close proximity according to various embodiments (e.g., as illustrated and discussed with reference to FIGS. 11-14):

TABLE 2

| Reactor Property | Embodiment Range |
| --- | --- |
| Air Electrodes Current Density | 3-200 mA/cm$^2$ |
| Anode Metal Flow Rate | 0.1-10 kg/s |
| Superficial Electrolyte Velocity | 1-100 cm/s |
| Auxiliary Power Load | 5-300 kW/MW |
| Reactor Lifetime | 5-30 years |
| Reactor Discharge Duration | 25-500 hours |

A reliance on electro-migration, diffusion, and other naturally motivated ion transport limits the scale and structure of individual electrodes by requiring the distance between them to be small. These design restrictions result in highly constrained cell architectures and smaller components with a higher piece counts for large capacity energy storage systems.

Removing the constraints of reliance on electro-migration, diffusion, and other and naturally motivated ion transport may provide five benefits. First, it may allow independent optimization of the various electrodes in terms of form, structure and performance. Second, it may allow the electrodes to be much larger in scale, reducing piece count and assembly/installation costs. Third, the energy storage capacity may be made independent from the power delivery capacity. Fourth, individual units may be easily swapped out for either identical replacement units, improved next generation units, or units with higher energy/power capacities. Fifth, ion transport via forced convection may overcome concentration polarization in the electrolyte and electrode materials, leading to energy storage devices with higher performance, namely higher power density, larger accessible capacity, and smaller overpotential losses.

In various embodiments, by motivating ion transport between electrodes by a motive force, such as a pump, the distance between electrodes can be increased while maintaining electrochemical performance. In a metal/air, three-electrode energy storage system, each electrode may be designed individually without interdependent conflicts/restrictions in various embodiments. FIGS. 1-10 illustrate aspects of decoupled electrode electrochemical energy storage systems according to various embodiments. FIG. 1 illustrates a decoupled electrode electrochemical energy storage system 100 according to various embodiments. The system 100 may include a metal electrode containment vessel 102 fluidically connected to an oxygen evolution reaction (OER) electrode containment vessel 103, electrolyte surge vessel 101, and an oxygen reduction reaction (ORR) electrode containment vessel 104. Electrolyte may be flowed to/from one or more of the metal electrode containment vessel 102, OER electrode containment vessel 103, electrolyte containment vessel 101, and ORR electrode containment vessel 104 by a pump 105. The system 100 may provide current to, and/or receive current from, an electrical source/load 107. An electrical switch 110 may provide the ability to electrically connect different combinations of electrodes. The system 100 may be a metal/air system in various embodiments.

In various embodiments, the metal electrode may be in any form that has a relatively high surface area to volume ratio with electric conductive continuity. Examples of forms that may have a relatively high surface area to volume ratio with electric conductive continuity include powder, pellets, spheroids, metal foam, etc. As a specific example, the metal may be iron pellets. The metal pellets may be direct reduced iron (DRI) pellets. In various embodiments, the metal may be DRI, whether in the form of powder, pellets, spheroids, or any other form. The metal electrode may be disposed within the metal electrode containment vessel 102. The metal electrode may be a porous electrode. In some embodiments, the metal electrode may be an iron electrode, such as a porous iron electrode. In various embodiments, an iron electrode may include DRI in one or more various forms, such as powder, pellets, spheroids, or any other form. In various embodiments, iron electrode may include packed iron powder and/or sintered iron powder. In various embodiments, the iron powder included in the iron electrode may be sponge iron powder and/or atomized iron powder. In various embodiments, the iron electrode may include an iron powder and a polymer binder, such as sponge iron powder and a polymer binder and/or atomized iron and a powder binder.

In some embodiments, the iron electrode may be formed without carbon. In other words, the iron electrode may not include carbon added therein, such that the iron electrode does not include carbon. As specific examples, the iron electrode may include sponge iron powder and a polymer binder without carbon and/or atomized iron and a powder binder without carbon. In some embodiments, the iron electrode may include carbon. In other words, carbon may be an additive element selected to form at least a portion of the composition that is the iron electrode. As specific examples, the iron electrode may include sponge iron powder, a polymer binder, and carbon and/or the iron electrode may include atomized iron, a powder binder, and carbon.

In various embodiments, the metal may be loaded into a containment vessel, e.g., a packed bed. For example, the metal in the containment vessel may be supported by a permeable bed support structure which is itself supported off the vessel walls. The vessel may be vertical or horizontal. The vessel may have at least one liquid inlet and one liquid outlet. For ease of explanation, the metal electrode containment vessel 102 with the metal therein may be referred to as the metal electrode, the electrode vessel, or the metal electrode containment vessel 102. The metal electrode containment vessel 102 may be an anode of the system 100 and may be a two-phase packed bed in various embodiments. The various inlets and/or outlets to the metal electrode containment vessel 102 may be flow controlled inlets/outlets in various embodiments.

In various embodiments, electrolyte may be provided into the metal electrode containment vessel 102 (e.g., pumped in, gravity flowed in, or otherwise fluidically provided to the electrode vessel). The electrolyte may flow into the metal electrode containment vessel 102 via at least one liquid inlet to the electrode vessel 102. The electrolyte may be stored in an electrolyte vessel 101 that may store a volume of electrolyte. The electrolyte vessel 101 may have one or more inlet to allow electrolyte into the electrolyte vessel 101 and/or may have one or more outlet to allow electrolyte out of the electrolyte vessel 100. The various inlets and/or outlets to the electrolyte vessel 101 may be valve controlled inlets/outlets in various embodiments. The electrolyte may flow through the packed bed (e.g., the packed bed of metal in the electrode vessel 102) and out of the electrode vessel 102 via at least one liquid outlet. The electrolyte flow may be driven by the pump 105 connected to an electrolyte circulation piping system, such as an electrolyte circulation piping system 108 illustrated in FIG. 1 that fluidically connects the electrode vessel 102, OER electrode 103, electrolyte vessel 101, and ORR electrode 104. The electrolyte circulation piping system 108 may include one or more bypass conduits and/or bypass valves to change the routing and flow of electrolyte in the system 100, including to isolate one or more of the electrode vessel 102, OER electrode 103, electrolyte vessel 101, and/or ORR electrode 104 from one another. While illustrated as a single pump 105 in FIG. 1, the number and placement of the pump 105 is merely an example, and one or more additional pumps may be included in the system 100 and/or the placement of the pump 105 may be at different points in the electrolyte circulation piping system 108 in various embodiments. The electrode vessel 102 may be maintained with a volume of electrolyte therein by the pump 105 and electrolyte circulation piping system 108. As an example, the electrode vessel 102 may be maintained full of liquid electrolyte.

In various embodiments, physically separating the electrode vessel 102 and OER electrode 103 may reduce the impact of oxygen bubbles or dissolved oxygen on the performance and durability of the metal electrode. In certain embodiments, physically separating the electrode vessel 102 and OER electrode 103 may reduce the rate of self-discharge of the metal electrode by mitigating contact of oxygen bubbles or dissolved oxygen gas with the metal bed. In some embodiments, physically separating the electrode vessel 102 and OER electrode 103 may reduce the rate of oxidation of sulfur-containing additives (e.g., lithium sulfide, sodium sulfide, potassium sulfide, bismuth sulfide, iron sulfide), thereby improving metal electrode capacity over the lifetime of the device. In various embodiments, separating the OER electrode 103 from the other components of the electrochemical system may enable more facile collection and storage of the oxygen generated at the OER electrode.

In various embodiments, current is collected from within the metal bed via the metal itself. In various embodiments, there may also be dedicated structures, vertical or horizontal, within the bed to assist with current collection. In various embodiments, the current may be collected off the electrode vessel 102 itself. In various embodiments, the electrode vessel 102 may be constructed of an electrically conductive material and therefore enable the current collection itself. In various embodiments, the electrode vessel 102 may be constructed of a non-electrically conductive or insulating material and therefore not participate in the circuit. In various embodiments, current may be collected and provided to the electrical source/load 107 via one or more electrical buses connected to the electrical source/load 107. The electrical bus may include one or more switches 110 to reroute current to/from the electrical source/load 107.

Figure 2A:
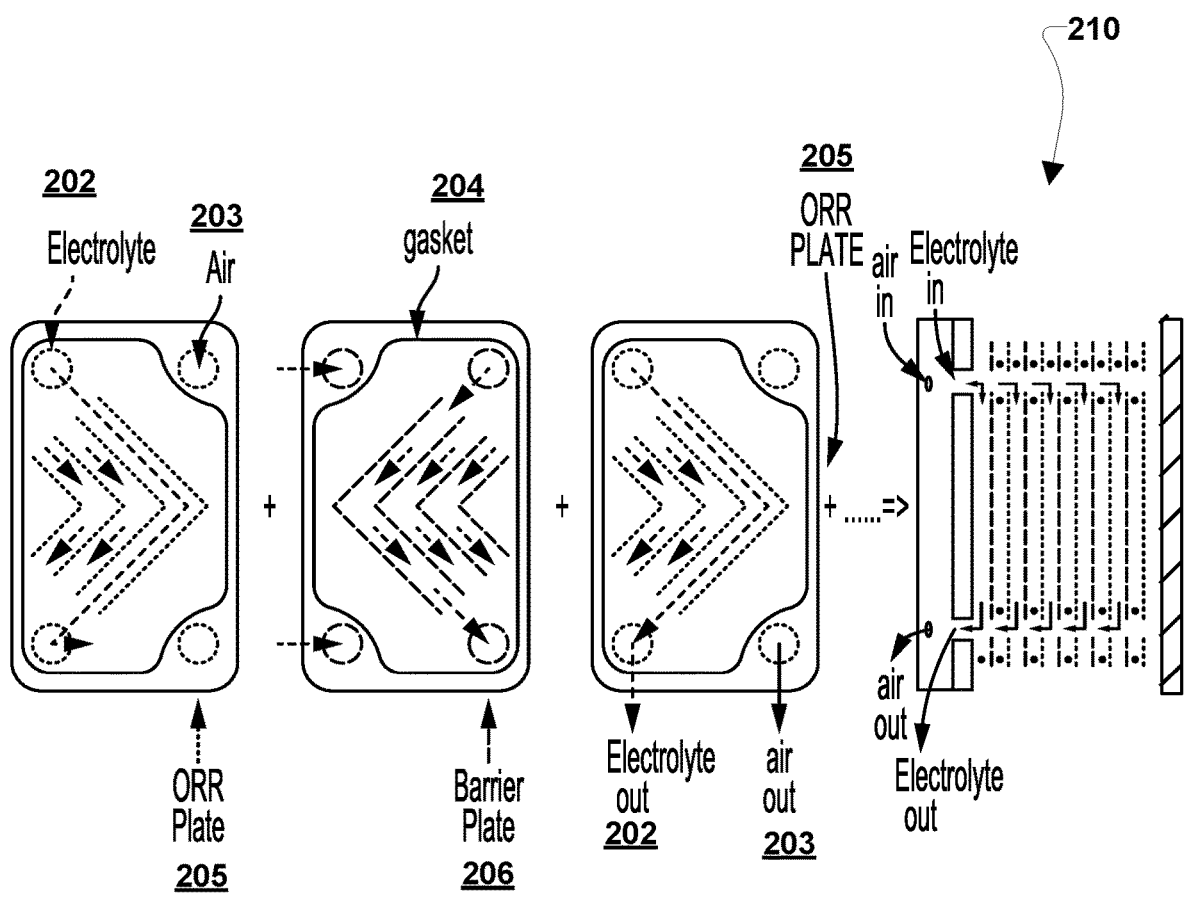
FIG. 2A illustrates an oxygen reduction reaction (ORR) electrode according to various embodiments.
Figure 2B:
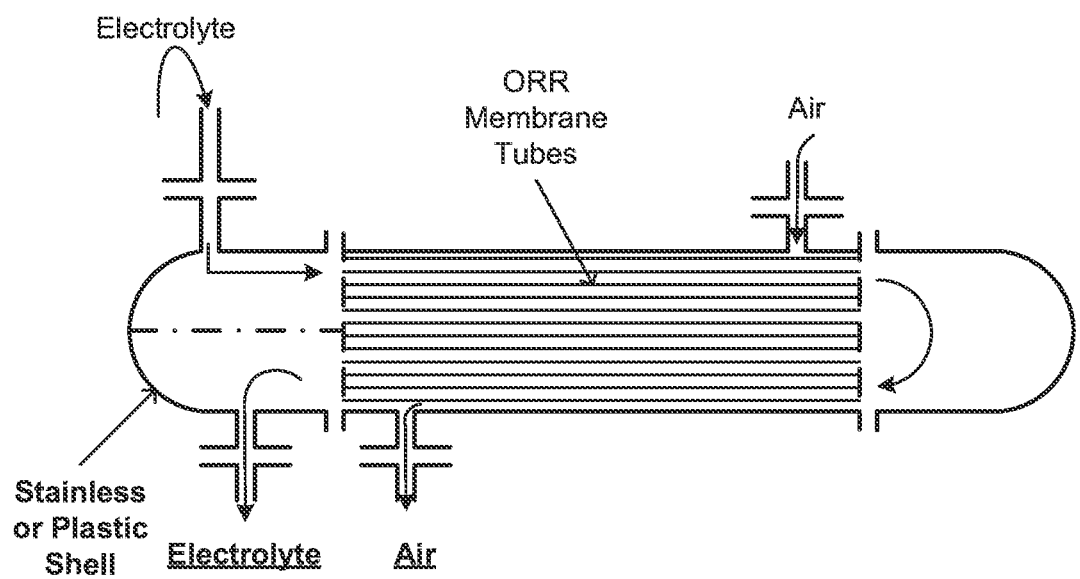
FIG. 2B illustrates an ORR electrode according to various embodiments.
Figure 3:
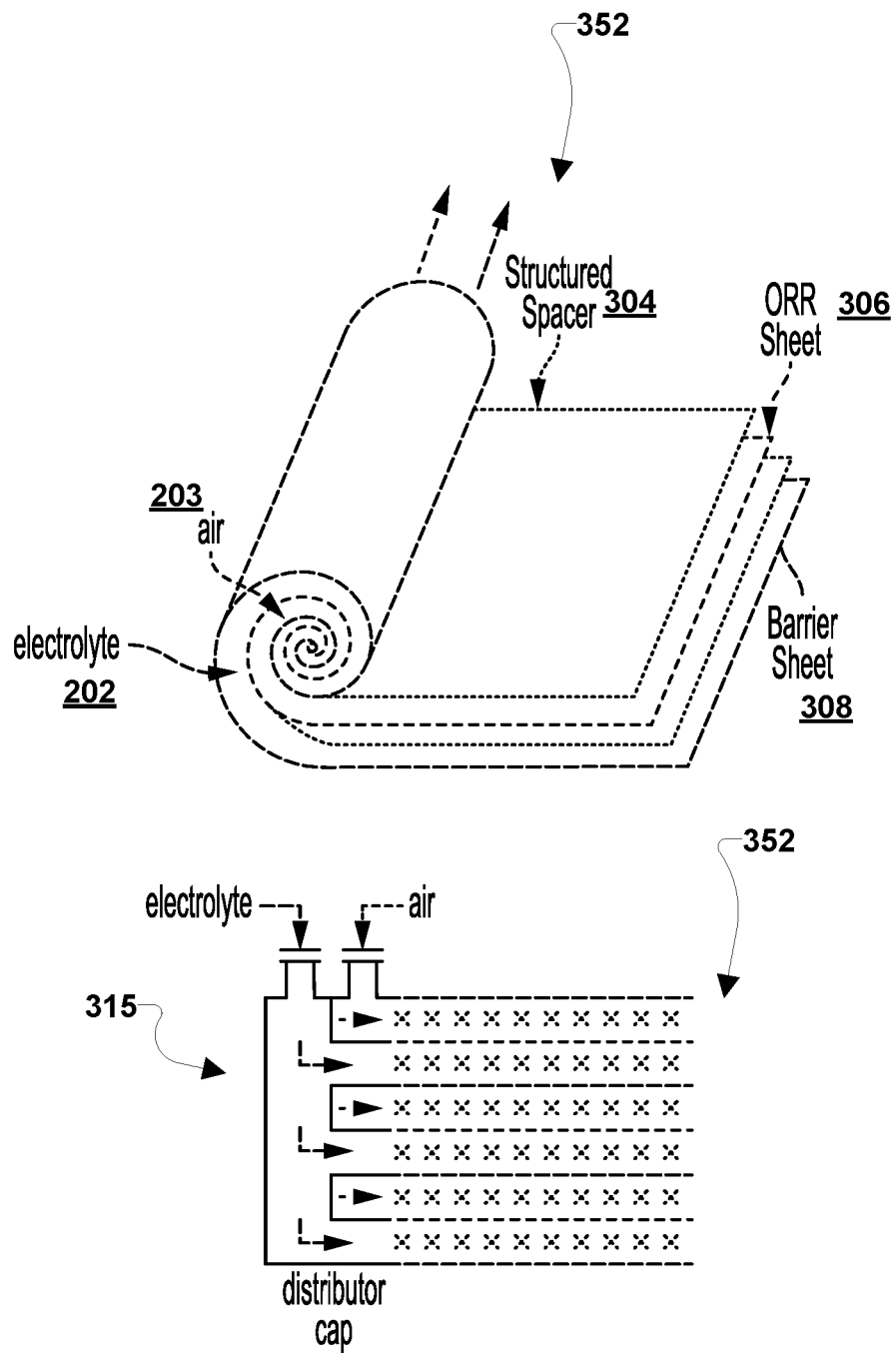
FIG. 3 illustrates an ORR electrode according to various embodiments.

In various embodiments, the ORR electrode 104 may be in any one or more of a variety of familiar three phase forms which maximize active solid surface area contact with the liquid on one side and air/oxygen on the other side. FIGS. 2A, 2B, and 3 illustrate example forms of the ORR electrode 104.

As illustrated in FIG. 2A, in various embodiments, the ORR electrode 104 may be in the form of a plate and frame structure 210, in which one fluid is electrolyte 202, and the other fluid is air 203. The plate and frame structure 210 may also be referred to as an electrochemical stack design. The plates in the structure 210 may alternate with ORR plates 205 formed from ORR materials and barrier plates 206. The ORR plates 205 may be replaced with the oxygen reducing membrane with integral support structure and current collection. A gasket 204 may be disposed between each of the plates 205 and 206 to prevent fluid from leaking out of the unit. Two rigid plates 207 may be bolted on either side of the plate stack, applying a compressive load.

In various embodiments, the ORR electrode 104 may be in the form of a shell and tube structure, similar to a shell and tube heat exchanger, in which oxygen reducing membrane tubes are formed with an integral support structure and current collector. The air 203 would flow through the unit either on the shell side or the tube side, while the electrolyte 202 would flow through the other side, either the shell or the tube side. Configuring the unit with the electrolyte on the tube side has the benefit of high electrolyte velocities, which may reduce fouling associated with the electrolyte. As illustrated in FIG. 2B, the tubes may be straight tubes or in a u-tube configuration. The tube may be in a single or multi-pass configuration.

As illustrated in FIG. 3, in various embodiments, the ORR electrode 104 may be in the form of a spiral wound unit 352 configuration, such as those used in ultrafiltration and reverse osmosis operations. Two structured spacing sheets 304 for every one ORR sheet 306 (or ORR membrane), and one barrier sheet 308 may form the spiral wound unit 352. The ORR sheet 306 and barrier sheets 308 would alternate, with a structured spacer between every layer. The sheets may be rolled into a spiral wound unit 352. The air 203 and electrolyte 202 may be passed through their respective sides by a distributor cap 315 affixed to the structure 352 formed when the sheets are rolled together.

Figure 4:
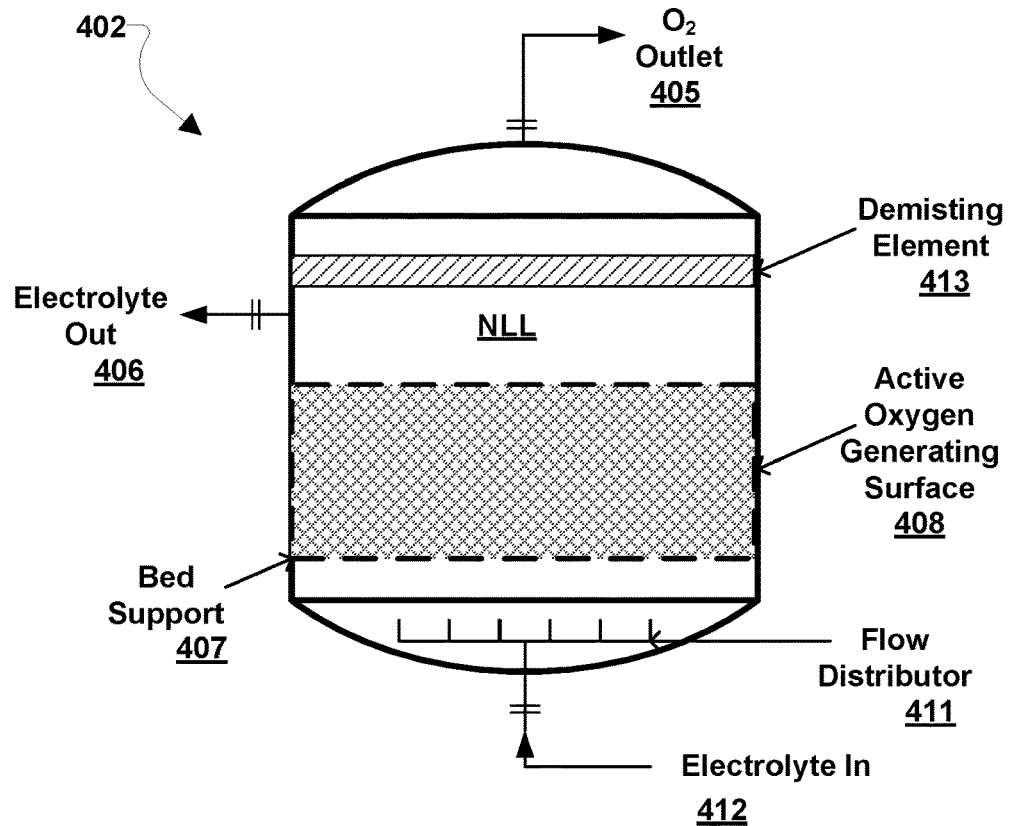
FIG. 4 illustrates oxygen evolution reaction (OER) electrode configurations according to various embodiments.
Figure 4:
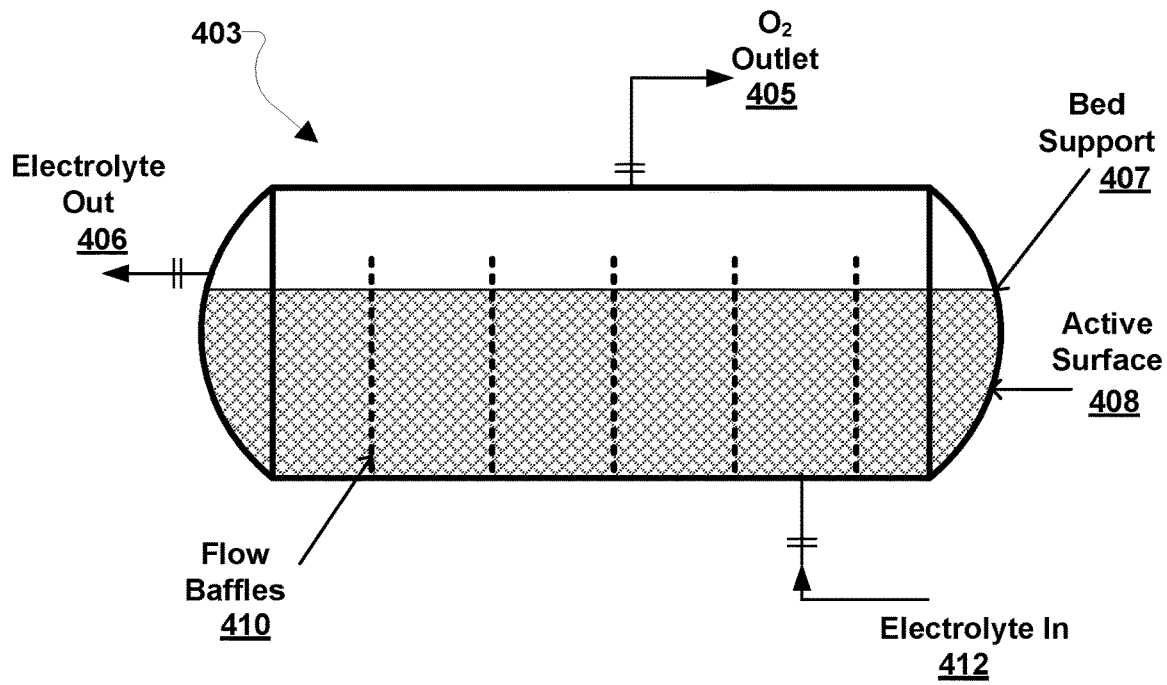

In various embodiments, the OER electrode 103 may be in any form allowing electrical continuity, vapor liquid disengagement, and electrolyte flow therein. The OER electrode 103 active material 408 may be nickel coated iron or nickel coated steel. The active material 408 may be pellets, flakes, foam, wire mesh, structure packing, dump packing, or similar. FIG. 4 illustrates a vertical vessel 402 configuration of the OER electrode 103 according to various embodiments and a horizontal vessel 403 configuration of the OER electrode 103 according to various embodiments. The active material 408 may be loaded into a vessel 402, 403 and this 'bed' may be supported by a permeable bed support structure 407 that is itself supported off the vessel walls. The vessel 402, 403 has at least one liquid inlet 412 and one liquid outlet 406. Electrolyte is flown into the vessel 402, 403, through the packed bed of active material 408 and out of the vessel 402, 403 via these connection points 412, 406. The electrolyte may enter the vessel 402, 403 at the bottom and exit the vessel 402, 403 above the bed of active material 408. The liquid outlet 406 may be located at the height of the desired liquid level, allowing passive liquid level control to a normal liquid level (NLL). The vessel 402, 403 head space may be wide enough to allow effective vapor liquid disengagement during oxygen evolution, which occurs at the submerged active material 408 surface and rises to the electrolyte surface via buoyancy forces. There may also be dedicated structures, vertical or horizontal, within the bed to assist with current collection. The current may be collected off the vessel 402, 403 itself. The vessel 402, 403 may be constructed of a non-electrically conductive material and therefore not participate in the current collection. There may be non-perforated baffles 410 to assist with electrolyte flow patterns. The vessel may contain a structure for flow distribution, such as a flow distributor 411, at the liquid inlet 412 or outlet 406. There may be a demisting element 413 in the vapor headspace of the vessel 402, 403. The vessel 402, 403 may include a gas outlet 405.

Figure 8:
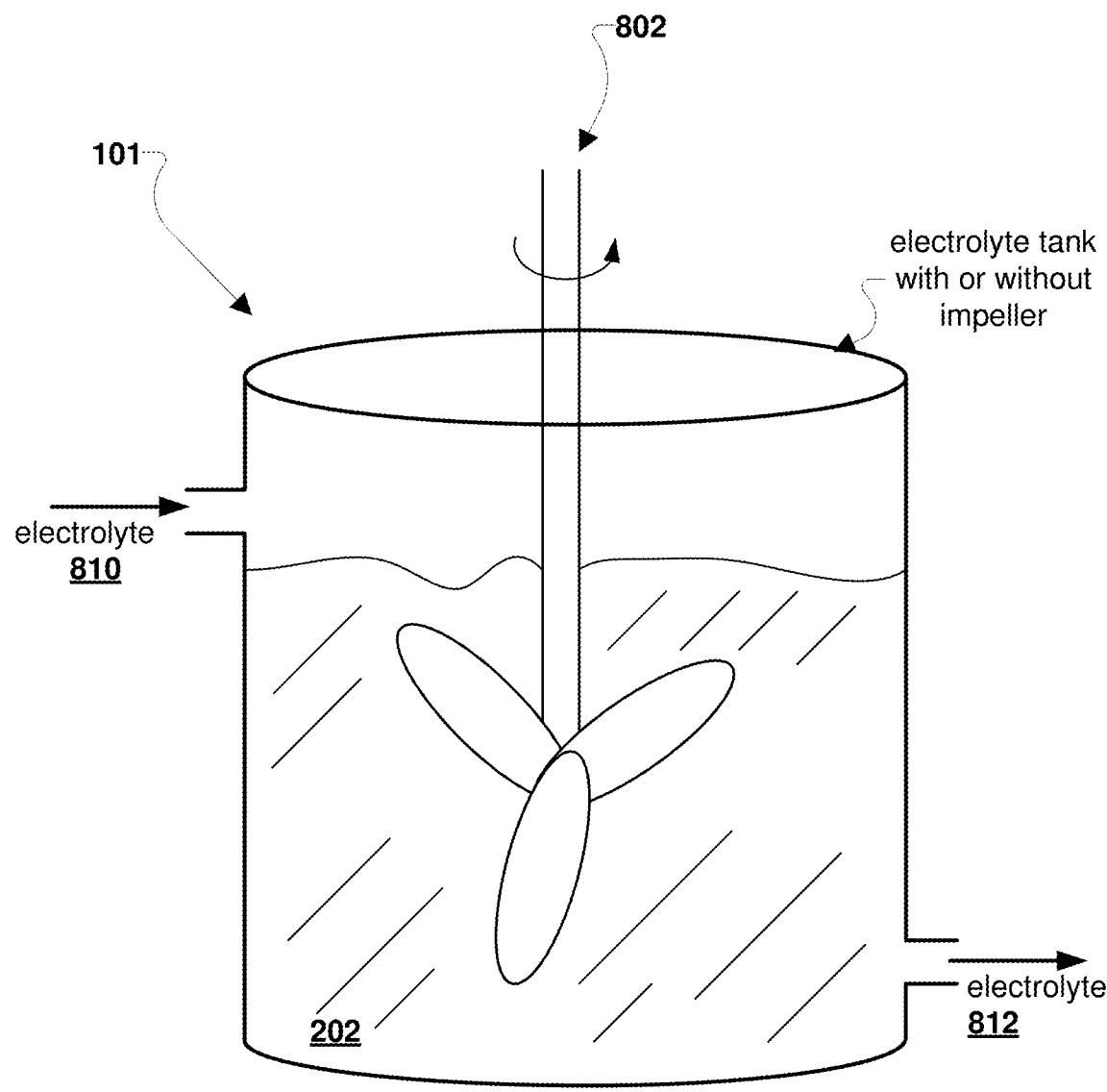
FIG. 8 illustrates an example configuration of an electrolyte vessel according to various embodiments.

FIG. 8 illustrates an example configuration of an electrolyte vessel 101 according to various embodiments. In various embodiments, the electrolyte vessel 101, may include one or more electrolyte inlets 810 through which electrolyte 202 flows into the electrolyte vessel 101 and one or more electrolyte outlets 812 through which electrolyte 202 flows out of the electrolyte vessel 101. In an optional embodiment, an impeller 802 may be included in the electrolyte vessel 101 to stir the electrolyte 202 volume.

Flowing electrolyte through porous electrodes, such as the metal electrode 102 (e.g., an iron electrode) and/or ORR electrode 104 and/or the OER electrode 103, can improve electrochemical performance of the electrodes by improving the rate of mass transfer (reduce concentration polarization) of soluble active species to the solid electrode surface. In the case of a metal air battery (e.g., electrochemical system 100), a flowing concentrated hydroxide electrolyte will reduce the macro-boundary layer of hydroxide species approaching the active electrode surface and reduce concentration boundary layers that develop within the pores of the electrode. Increasing the mass transfer rate of soluble active species to the electrode surface will enable thicker or longer electrodes in the direction of the electrolyte transport.

Thicker or longer electrodes permit greater ratios of active material to inactive material in the system (e.g., system 100).

Figure 5:
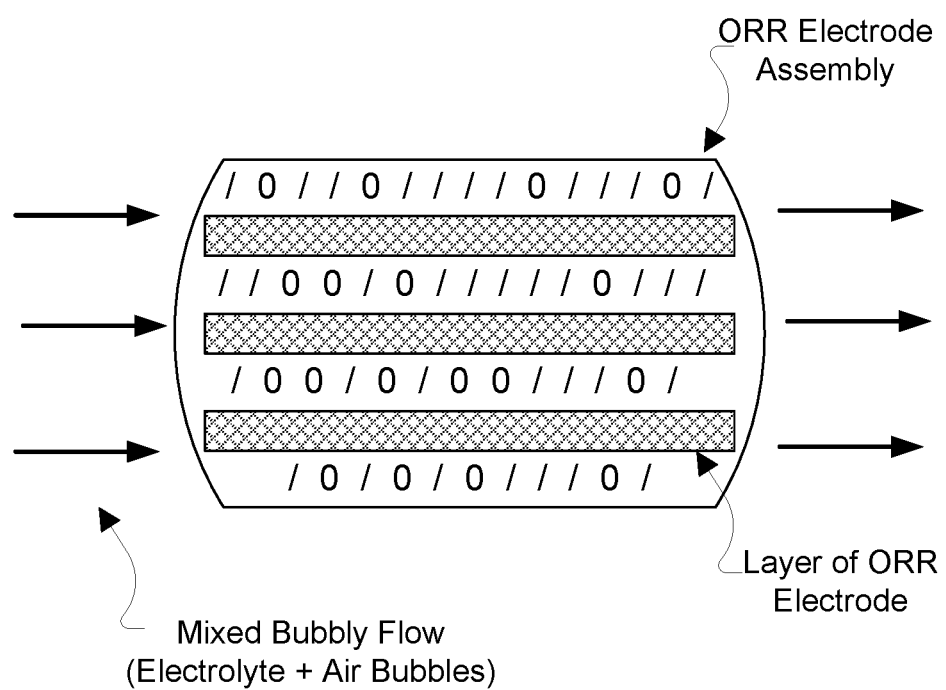
FIG. 5 illustrates an example ORR electrode assembly configuration according to various embodiments.

In various embodiments, the oxygen reduction reaction (ORR) electrode assembly (e.g., ORR electrode 104) may include ORR electrodes that are arranged parallel or counter to the direction of the electrolyte flow as illustrated in FIG. 5. The ORR electrode may be oriented in any direction, horizontal, vertical, diagonal or otherwise. The ORR electrode 104 may be supplied with an oxygenated electrolyte stream, a mixed bubbly (air/oxygen) and electrolyte stream, or separate gas (air/oxygen) and electrolyte streams in various embodiments.

Figure 6:
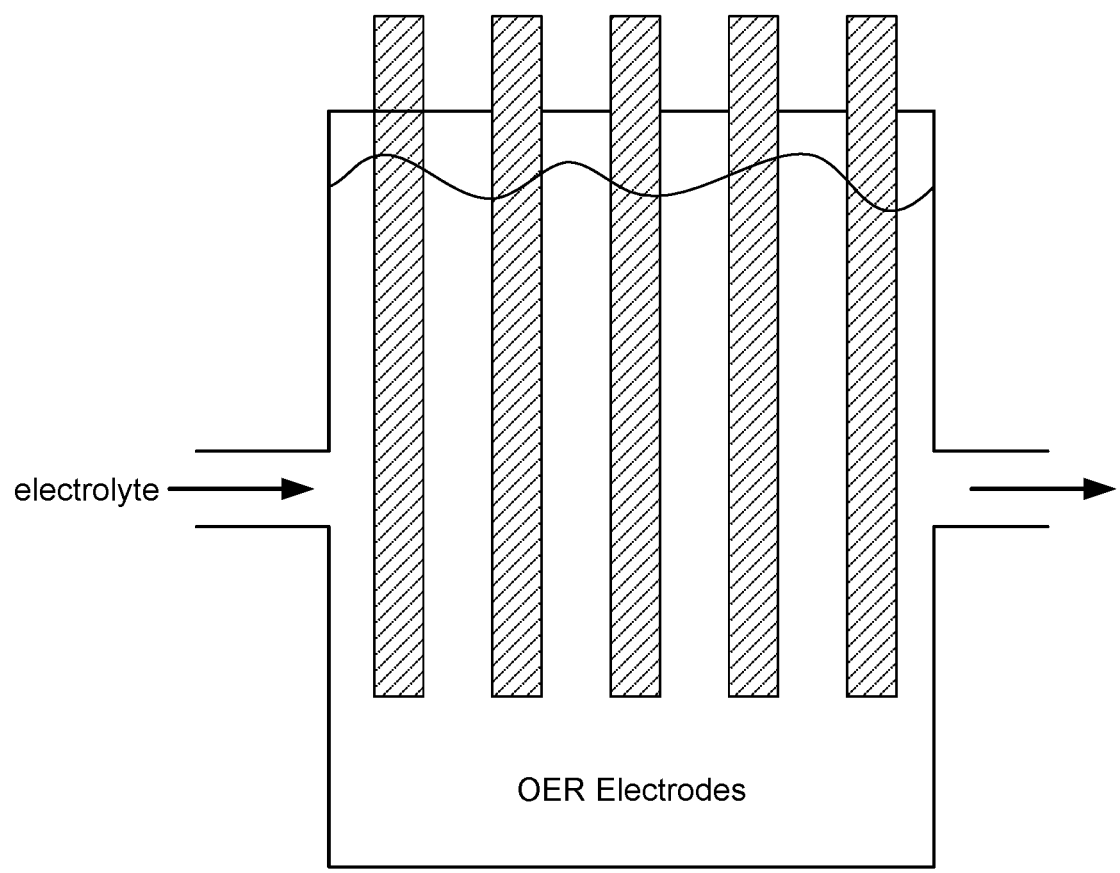
FIG. 6 illustrates an example OER electrode assembly configuration according to various embodiments.

In various embodiments, the oxygen evolution reaction (OER) electrode assembly (e.g., OER electrode 103) may be comprised of OER electrodes that are submerged in a vessel as illustrated in FIG. 6. Gas released from the OER electrodes may escape through ventilation ports or pressure relief valves at the top of the vessel. The OER electrodes may be oriented horizontally, diagonally, or vertically in the vessel.

Figure 7:
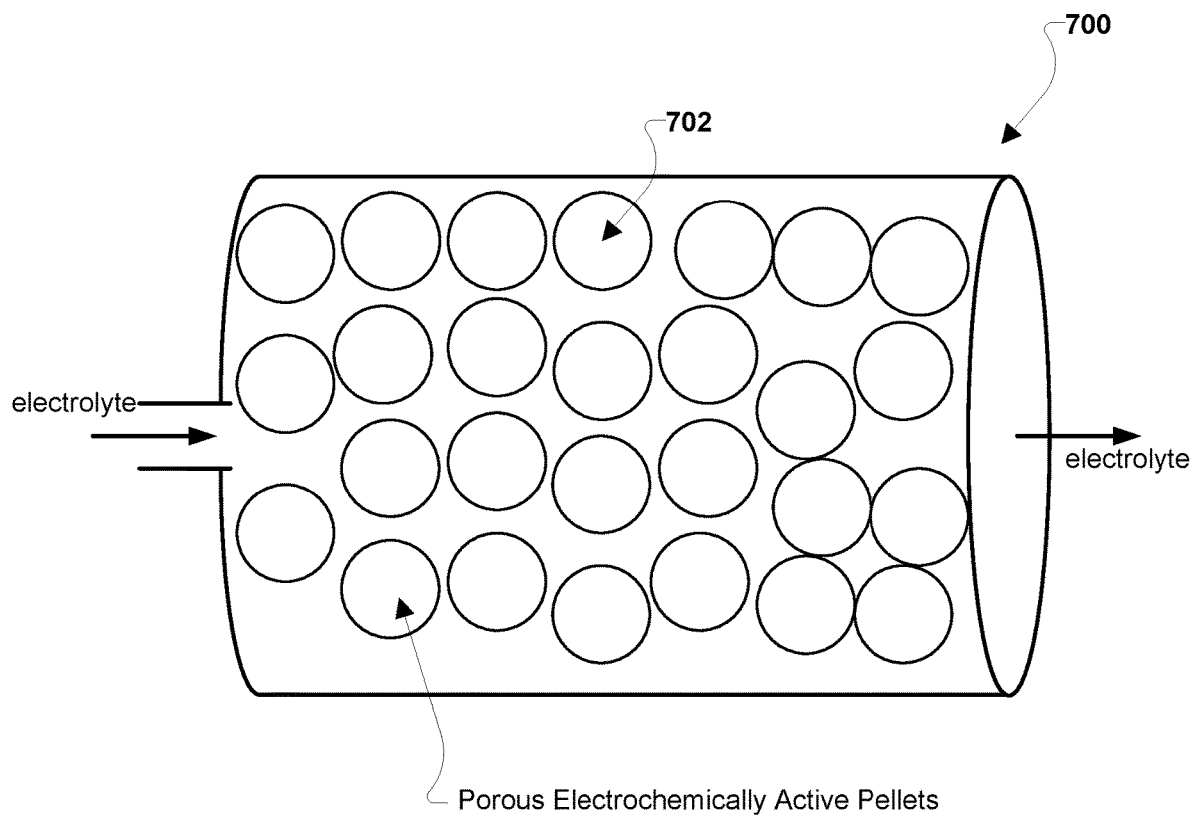
FIG. 7 illustrates an electrochemical energy storage system according to various embodiments.
Figure 9:
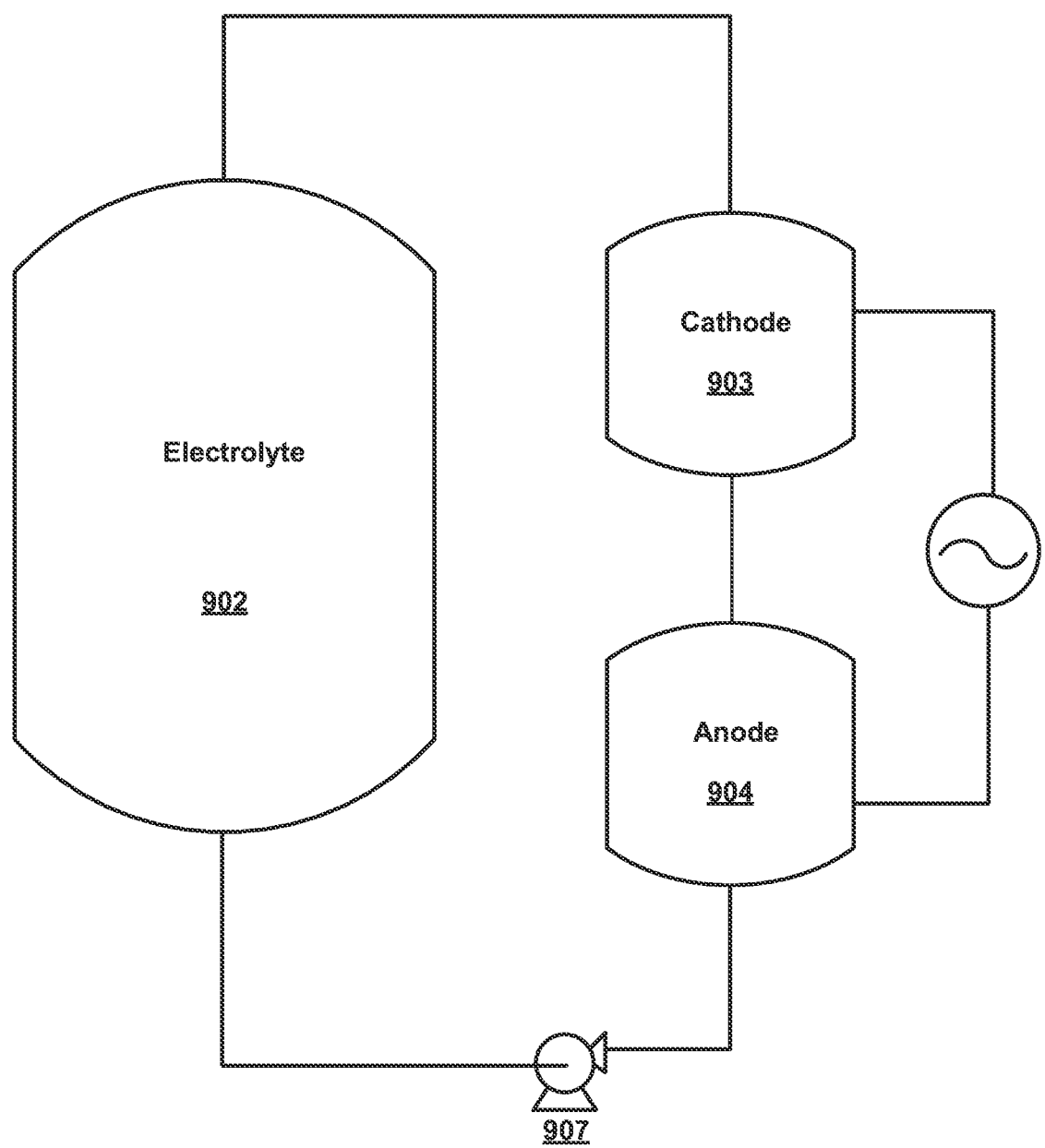
FIG. 9 illustrates a simplified version of a decoupled electrode energy storage system according to various embodiments.
Figure 10:
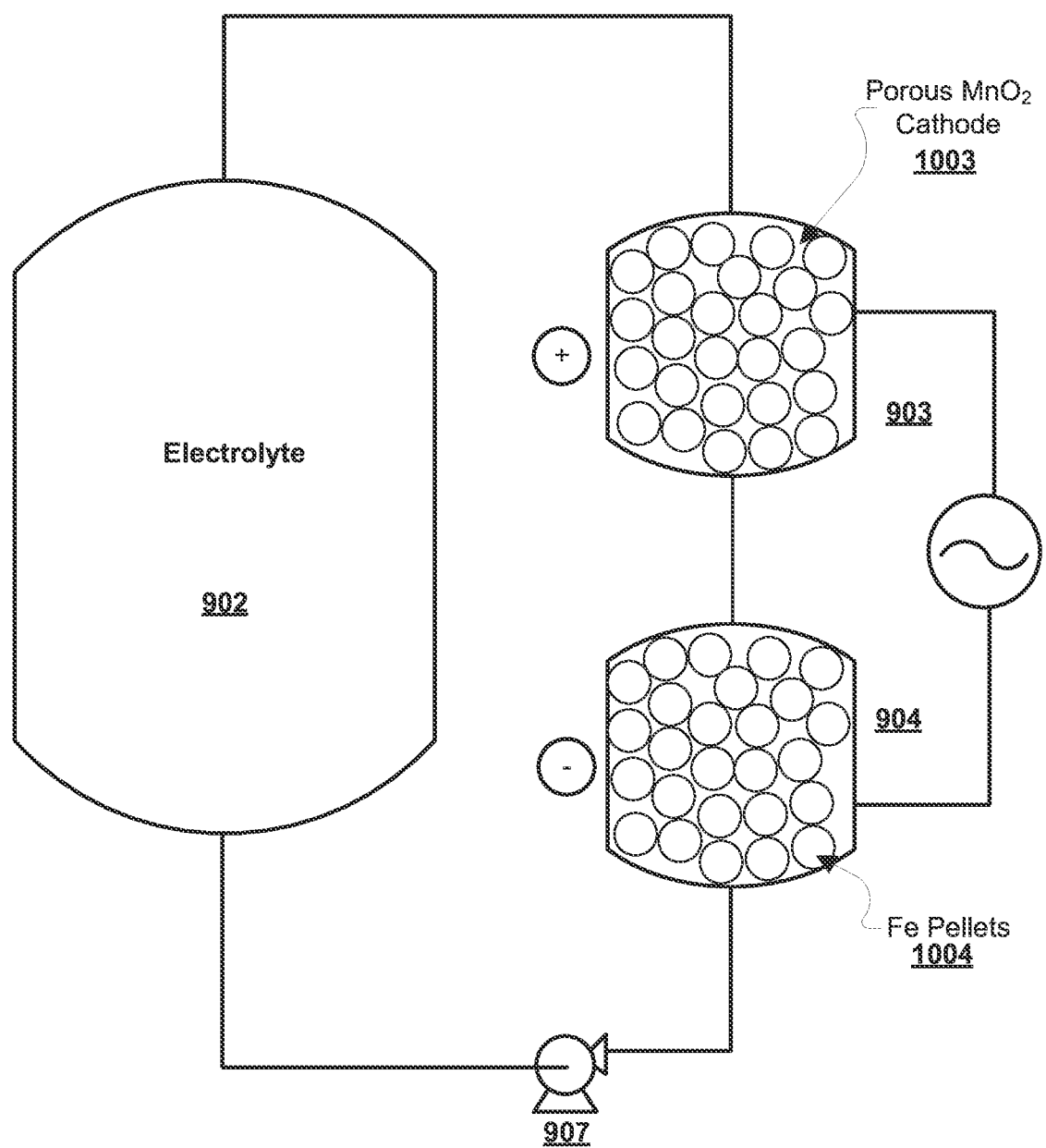
FIG. 10 illustrates a specific example of the system of FIG. 9.

In various embodiments, the decoupled electrode energy storage system may be suitable for use with battery chemistries with solid electrode materials. For example, a solid collection of porous electrochemically active pellets 702 (or powders, or slabs, etc.) in a vessel 700 through which electrolyte flows as illustrated in FIG. 7. In this configuration, both the negative electrode and positive electrode may be comprised of porous pellets, powders, or porous slabs. FIG. 9 illustrates a simplified version of a decoupled electrode energy storage system according to various embodiments. The decoupled electrode energy storage system of FIG. 9 may include an electrolyte vessel 902, cathode vessel 903, and anode vessel 904, all fluidically connected together with electrolyte circulated through the system by a pump 907. FIG. 10 illustrates a specific example of the system of FIG. 9 in which the solid battery chemistry may be an iron and manganese dioxide (Fe/MnO$_2$) chemistry. The negative electrode 1004 may include iron. The negative electrode 1004 may include direct reduced iron (DRI). The negative electrode 1004 may include an iron powder, such as sponge, atomized, or carbonyl iron. The positive electrode 1003 may include manganese. The positive electrode 1003 may include MnO$_2$. The positive electrode 1003 may include MnO$_2$, carbon, and a polymer binder. The positive electrode 1003 may include pelletized MnO$_2$, carbon, and a polymer binder. As another example, the solid battery chemistry may be an iron and nickel (Fe/Ni) chemistry. The positive electrode 1003 may include nickel. As such, the positive electrode 1003 may include Ni, carbon, and a polymer binder rather than the MnO$_2$, carbon, and a polymer binder.

Various embodiments may provide a system which can achieve long duration and high current density. The system may include a fully open reactor, through which iron materials and air are flowed. The reactor may operate at higher current density, but by virtue of replenishing the active material in the reactor, may continue to operate for long durations. DRI pellets provide a near ideal anode for this fully open reactor, as DRI pellets may be definitionally flowable. In various embodiments, the iron materials may include DRI in various forms, such as pellets, spheroids, or any other flowable form. In some embodiments, the iron materials may include packed iron powder and/or sintered iron powder. In various embodiments, the iron powder included in the iron materials may be sponge iron powder and/or atomized iron powder. In various embodiments, the iron materials may include an iron powder and a polymer binder, such as sponge iron powder and a polymer binder and/or atomized iron and a powder binder. In some embodiments, the iron materials may be formed without carbon. In other words, the iron materials may not include carbon added therein, such that the iron materials do not include carbon. As specific examples, the iron materials may include sponge iron powder and a polymer binder without carbon and/or atomized iron and a powder binder without carbon. In some embodiments, the iron materials may include carbon. In other words, carbon may be an additive element selected to form at least a portion of the composition that is the iron materials. As specific examples, the iron materials may include sponge iron powder, a polymer binder, and carbon and/or the iron materials may include atomized iron, a powder binder, and carbon.

Various embodiments may provide energy storage systems with a solid metal plus oxygen chemistry. The energy storage capacity may scale with the amount of metal in the system. The system may be configured such that the energy storage capacity is decoupled from the desired power capability, which may be predominantly determined by elements other than the solid metal components.

Various embodiments may provide a metal/air energy storage system in which the metal is in a transportable form, such as a powder slurry, pellets or marbles, or any other transportable form. FIGS. 11-14 illustrate aspects of metal/air energy storage system in which the metal is in a transportable form according to various embodiments. The shape of the transportable metal may be spheroidal or not. The metal may be iron pellets. The metal may be direct reduced iron (DRI). The metal may be oxidized or reduced during charging/discharging. During these operations, the metal may be brought in close proximity to the counter air electrodes, and it is here that the desired reaction takes place. The metal may be carried away in its desired state (oxidized or reduced) to a storage containment vessel of some kind. The metal movement/flow may be continuous, batch, or semi-batch.

Figure 11:
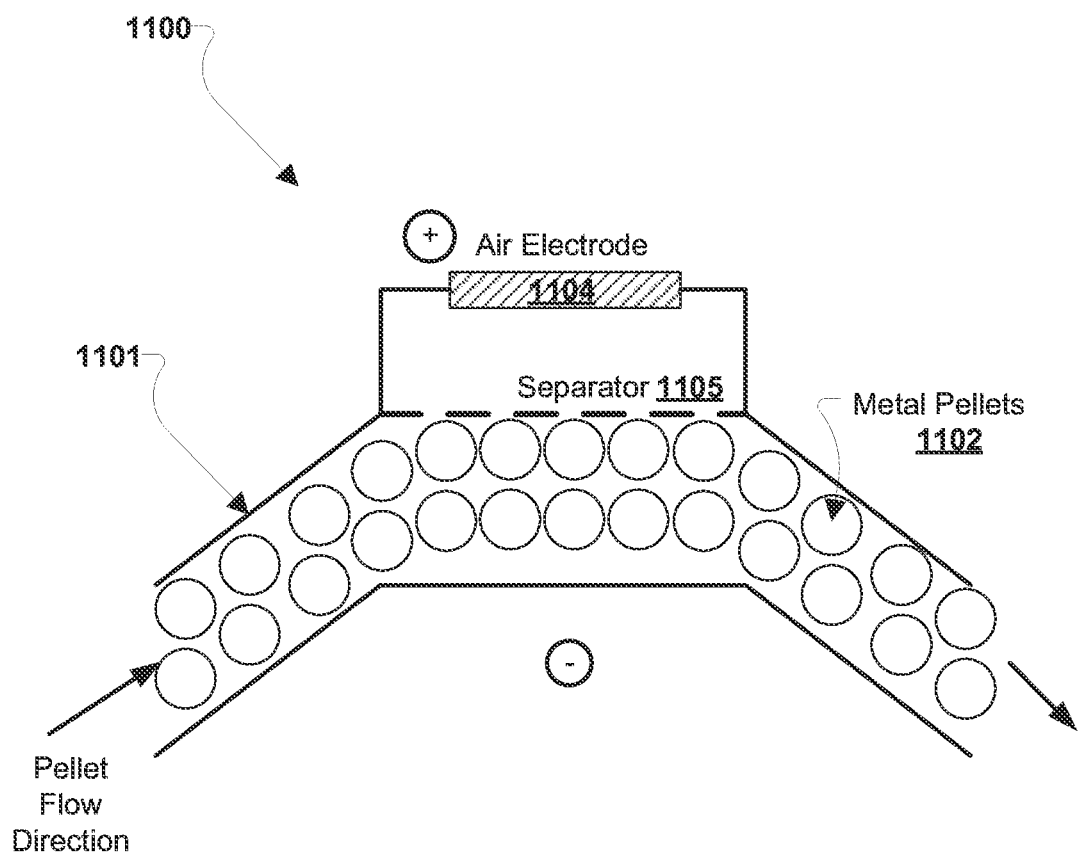
FIG. 11 illustrates a metal/air energy storage system according to various embodiments.

FIG. 11 illustrates a metal/air energy storage system 1100 in which a flow of metal pellets 1102, such as DRI pellets, passes through a metal flow passage 1101 toward an air electrode 1104. A separator 1105 may keep the metal pellets 1102 from contacting the air electrode 1104. The metal pellets 1102 may be circulated in a flow direction past the air electrode 1104. The metal pellets 1102 flowing through the metal flow passage 1101 may constitute the metal electrode in the system 1100.

Figure 12:
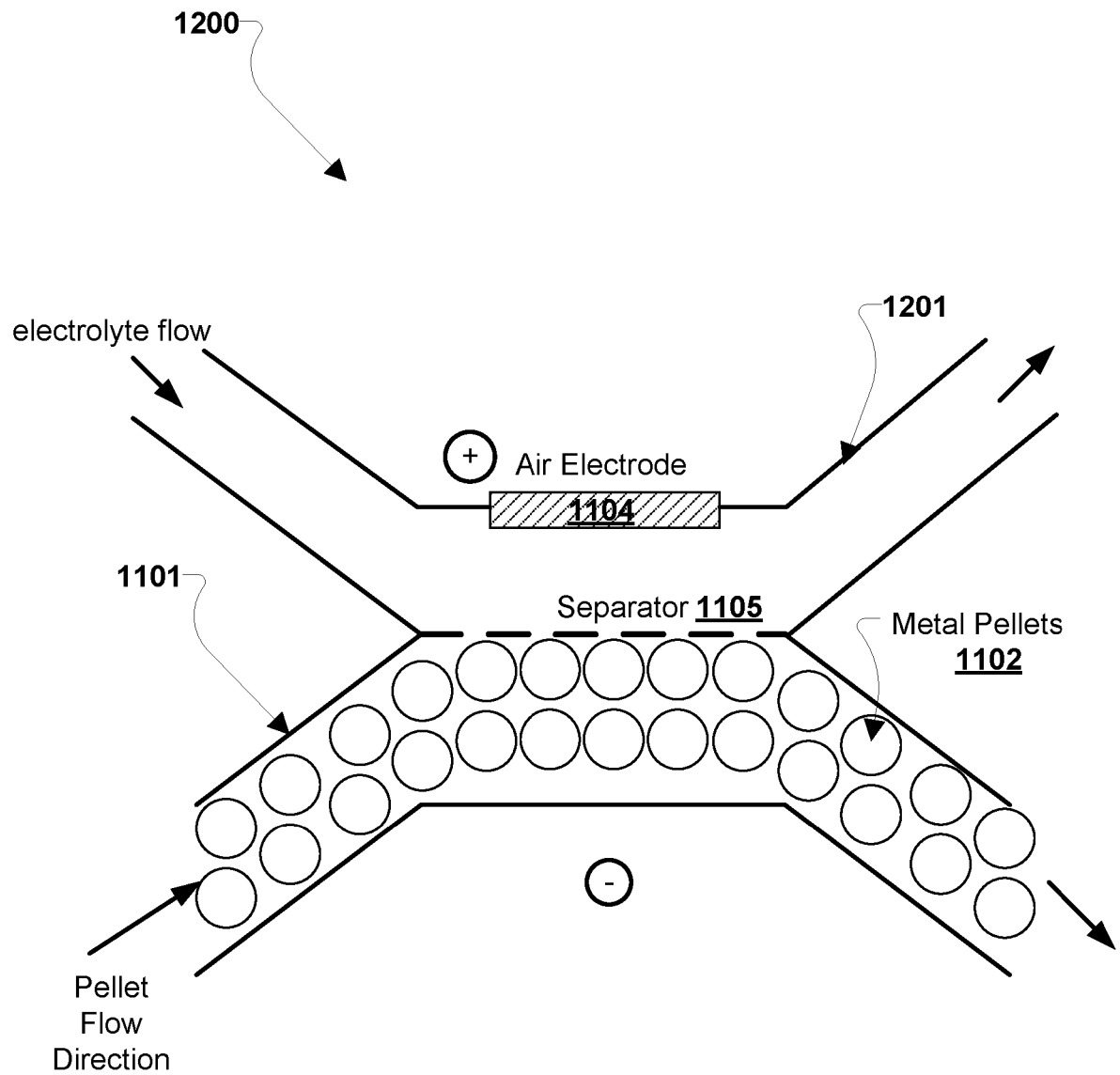
FIG. 12 illustrates an alternative configuration for a metal/air energy storage system according to various embodiments.

The metal electrode may be paired in an electrochemical cell with one or more air electrodes 1104 serving as the counter electrode, which may act as the positive electrode of a secondary battery. The air electrode 1104 may be bifunctional, in that it engages the oxygen reduction reaction (ORR) and the oxygen evolution reaction (OER). FIG. 12 illustrates an alternative configuration 1200 in which an electrolyte flow passage 1201 flows electrolyte between the air electrode 104 and the separator 1105.

Figure 13:
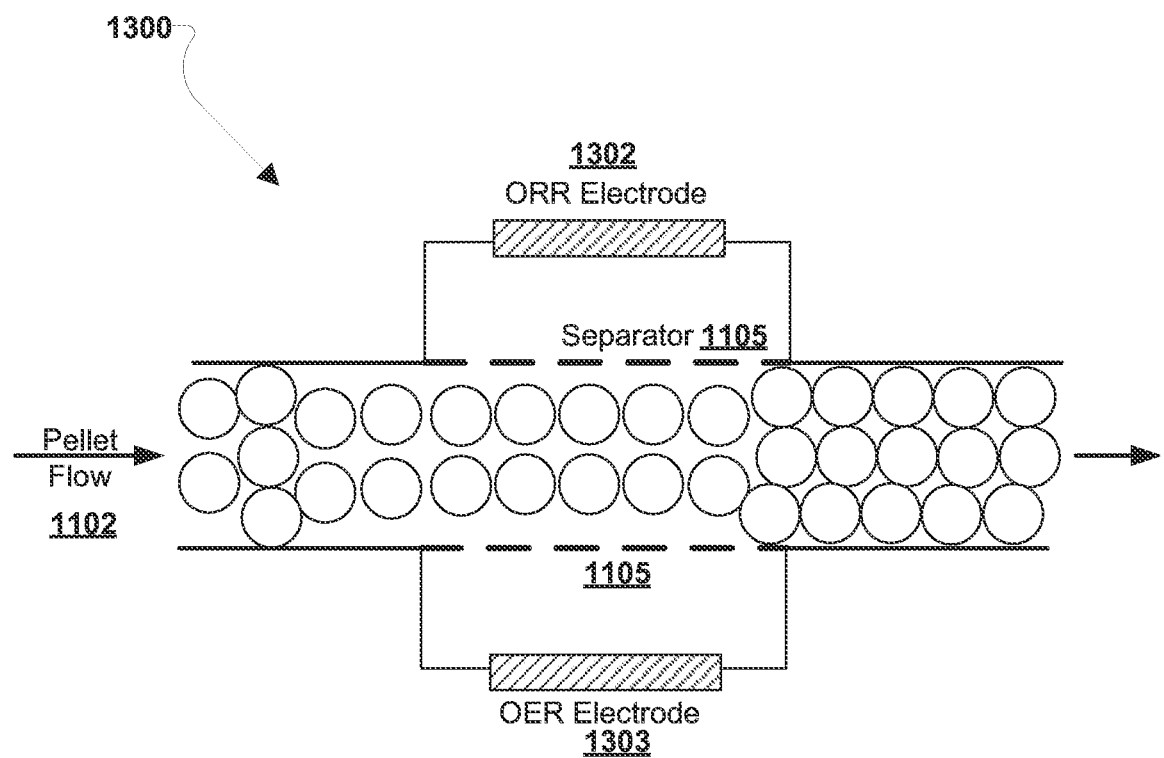
FIG. 13 illustrates a metal/air energy storage system according to various embodiments.
Figure 14:
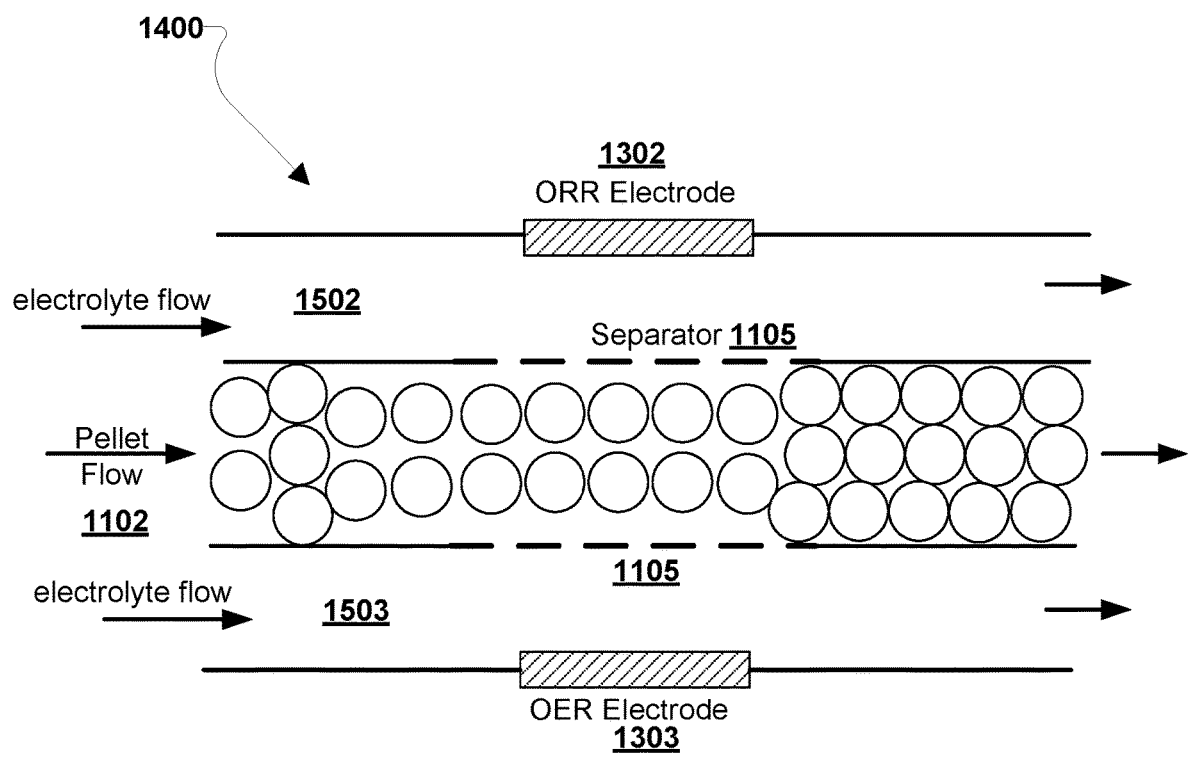
FIG. 14 illustrates a metal/air energy storage system according to various embodiments.

In various embodiments, such as those illustrated in FIGS. 13 and 14, there may be two air electrodes, such as an ORR electrode 1302 and an OER electrode 1303. The discharge air electrode 1302 may engage the ORR. The charge air electrode 1303 may engage the OER. When two air electrodes 1302, 1303 are employed, an external switch can be used to toggle between charge and discharge mode. Electrolyte may or may not be forced to flow past the air electrode(s) 1302, 1303. For example, FIG. 13 illustrates a system 1300 in which electrolyte does not flow past the air electrodes 1302, 1303, while FIG. 14 illustrates a system 1400 in which electrolyte flow passages 1502 and 1503 flow electrolyte past the air electrodes 1302, 1303, respectively. The air electrode(s) 1302, 1303 may be electrically isolated from the flowing metal pellets 1102 by a porous insulating layer (e.g., separator 1105).

Various embodiments are discussed in relation to the use of direct reduced iron (DRI) as a material in an electrochemical system (e.g., a battery (or cell), etc.), as a component of an electrochemical system (e.g., a battery (or cell), etc.), and combinations and variations of these. In various embodiments, the DRI may be produced from, or may be, material which is obtained from the reduction of natural or processed iron ores, such reduction being conducted without reaching the melting temperature of iron. In various embodiments the iron ore may be taconite or magnetite or hematite or goethite, etc. In various embodiments, the DRI may be in the form of pellets, which may be spherical or substantially spherical. In various embodiments the DRI may be porous, containing open and/or closed internal porosity. In various embodiments the DRI may comprise materials that have been further processed by hot or cold briquetting. In various embodiments, the DRI may be produced by reducing iron ore pellets to form a more metallic (more reduced, less highly oxidized) material, such as iron metal ($Fe^0$), wustite (FeO), or a composite pellet comprising iron metal and residual oxide phases. In various non-limiting embodiments, the DRI may be reduced iron ore taconite, direct reduced ("DR") taconite, reduced "Blast Furnace (BF) Grade" pellets, reduced "Electric Arc Furnace (EAF)-Grade" pellets, "Cold Direct Reduced Iron (CDRI)" pellets, direct reduced iron ("DRI") pellets, Hot Briquetted Iron (HBI), or any combination thereof. In the iron and steelmaking industry, DRI is sometimes referred to as "sponge iron;" this usage is particularly common in India. Embodiments of iron materials, including for example embodiments of DRI materials, for use in various embodiments described herein, including as electrode materials, may have, one, more than one, or all of the material properties as described in Table 3 below. As used in the Specification, including Table 3, the following terms, have the following meaning, unless expressly stated otherwise: "Specific surface area" means, the total surface area of a material per unit of mass, which includes the surface area of the pores in a porous structure; "Carbon content" or "Carbon (wt %)" means the mass of total carbon as percent of total mass of DRI; "Cementite content" or "Cementite (wt %)" means the mass of $Fe_3C$ as percent of total mass of DRI; "Total Fe (wt %)" means the mass of total iron as percent of total mass of DRI; "Metallic Fe (wt %)" means the mass of iron in the $Fe^0$ state as percent of total mass of DRI; and "Metallization" means the mass of iron in the $Fe^0$ state as percent of total iron mass. Weight and volume percentages and apparent densities as used herein are understood to exclude any electrolyte that has infiltrated porosity or fugitive additives within porosity unless otherwise stated.

TABLE 3

| Material Property | Embodiment Range |
|---|---|
| Specific surface area* | 0.01-25 m²/g |
| Actual density** | 4.6-7.1 g/cc |
| Apparent density*** | 2.3-6.5 g/cc |
| Minimum $d_{pore,\ 90\%\ volume}$**** | 10 nm-50 μm |
| Minimum $d_{pore,\ 50\%\ surface\ area}$***** | 1 nm-15 μm |
| Total Fe (wt %)# | 65-95% |
| Metallic Fe (wt %)## | 46-90% |
| Metallization (%)### | 59-96% |
| Carbon (wt %)#### | 0-5% |

TABLE 3-continued

| Material Property | Embodiment Range |
|---|---|
| $Fe^{2+}$ (wt %)##### | 1-9% |
| $Fe^{3+}$ (wt %)$ | 0.9-25% |
| $SiO_2$ (wt %)$$ | 1-15% |
| Ferrite (wt %, XRD)$$$ | 22-97% |
| Wustite (FeO, wt %, XRD)$$$$ | 0-13% |
| Goethite (FeOOH, wt %, XRD)$$$$$ | 0-23% |
| Cementite ($Fe_3C$, wt %, XRD)+ | << 80% |

*Specific surface area preferably determined by the Brunauer-Emmett-Teller adsorption method ("BET"), and more preferably as the BET is set forth in ISO 9277 (the entire disclosure of which is incorporated herein by reference); recognizing that other tests, such as methylene blue (MB) staining, ethylene glycol monoethyl ether (EGME) adsorption, electrokinetic analysis of complex-ion adsorption and a Protein Retention (PR) method may be employed to provide results that can be correlated with BET results.

**Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results. Actual density may also be referred to as "true density" or "skeletal density" in the art.

***Apparent density preferably determined by immersion in water, and more preferably as is set forth in ISO 15968 (the entire disclosure of which is incorporated herein by reference); recognizing that other tests may be employed to provide results that can be correlated with He pycnometry results. Porosity may be defined as the ratio of apparent density to actual density:

$$\text{Porosity} = \frac{\text{apparent density}}{\text{actual density}}$$

****$d_{pore,\ 90\%\ volume}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 90\%\ volume}$ is the pore diameter above which 90% of the total pore volume exists.

*****$d_{pore,\ 50\%\ surface\ area}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 50\%\ surface\ area}$ is the pore diameter above which 50% of free surface area exists.

Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.

Metallic Fe (wt %) preferably determined by iron(III) chloride titrimetry, and more preferably as is set forth in ISO 16878 (the entire disclosure of which is incorporated herein by reference); recognizing that other tests, such as bromine-methanol titimetry, may be employed to provide results that can be correlated with iron(III) chloride titimetry.

Metallization (%) preferably determined by the ratio of metallic Fe to total Fe, each as preferably determined by the methods previously described.

Carbon (wt %) preferably determined by infrared absorption after combustion in an induction furnace, and more preferably as is set forth in ISO 9556 (the entire disclosure of which is incorporated herein by reference); recognizing that other tests, such as various combustion and inert gas fusion techniques, such as are described in ASTM E1019-18 may be employed to provide results that can be correlated with infrared absorption after combustion in an induction furnace.

$Fe^{2+}$ (wt %) preferably determined by titrimetry, and more preferably as is set forth in ASTM D3872-05 (the entire disclosure of which is incorporated herein by reference); recognizing that other tests, such as Mossbauer spectroscopy, X-ray absorption spectroscopy, etc., may be employed to provide results that can be correlated with titrimetry.

$ $Fe^{3+}$ (wt %) preferably determined by the mass balance relation between and among Total Fe (wt %), Metallic Fe (wt %), $Fe^{2+}$ (wt %) and $Fe^{3+}$ (wt %). Specifically the equality Total Fe (wt %)=Metallic Fe (wt %)+$Fe^{2+}$ (wt %)+$Fe^{3+}$ (wt %) must be true by conservation of mass, so $Fe^{3+}$ (wt %) may be calculated as $Fe^{3+}$ (wt %)=Total Fe (wt %)−Metallic Fe (wt %)−$Fe^{2+}$ (wt %).

$$ $SiO_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods. In certain methods, the $SiO_2$ wt % is not determined directly, but rather the Si concentration (inclusive of neutral and ionic species) is measured, and the $SiO_2$ wt % is calculated assuming the stoichiometry of $SiO_2$; that is, a 1:2 molar ratio of Si:O is assumed.

$$$ Ferrite (wt %, XRD) preferably determined by x-ray diffraction (XRD).

$$$$ Wustite (FeO, wt %, XRD) preferably determined by x-ray diffraction (XRD).

$$$$$ Goethite (FeOOH, wt %, XRD) preferably determined by x-ray diffraction (XRD).

+ Cementite ($Fe_3C$, wt %, XRD) preferably determined by x-ray diffraction (XRD).

Additionally, embodiments of iron materials, including for example embodiments of DRI materials, for use in various embodiments described herein, including as electrode materials, may have one or more of the following properties, features or characteristics, (noting that values from one row or one column may be present with values in different rows or columns) as set forth in Table 3A.

TABLE 3A

| | | | | |
|---|---|---|---|---|
| Fe total (wt %)[!] | >60% | >70% | >80% | ~83-94% |
| $SiO_2$ (wt %)[!!] | <12% | <7.5% | 1-10% | 1.5-7.5% |
| $Al_2O_3$ (wt %)[!!!] | <10% | <5% | 0.2-5% | 0.3-3% |
| MgO (wt %)[!!!!] | <10% | <5% | 0.1-10% | 0.25-2% |
| CaO (wt %)[!!!!!] | <10% | <5% | 0.9-10% | 0.75-2.5% |
| $TiO_2$ (wt %)[&] | <10% | <2.5% | 0.05-5% | 0.25-1.5% |
| Size (largest cross-sectional distance, e.g. for a sphere the diameter) | <200 mm | ~50 to ~150 mm | ~2 to ~30 mm | ~4 to ~20 mm |
| Actual Density (g/cm³)[&&] | ~5 | ~5.8 to ~6.2 | ~4.0 to ~6.5 | <7.8 |
| Apparent Density (g/cm³)[&&&] | <7.8 | >5 | >4 | 3.4~3.6 |
| Bulk Density (kg/m³)[&&&&] | <7 | >1.5 | ~2.4 to ~3.4 | ~1.5 to ~2.0 |
| Porosity (%)[&&&&&] | >15% | >50% | ~20% to ~90% | ~50% to ~70% |

! Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.

!! $SiO_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods. In certain methods, the $SiO_2$ wt % is not determined directly, but rather the Si concentration (inclusive of neutral and ionic species) is measured, and the $SiO_2$ wt % is calculated assuming the stoichiometry of $SiO_2$; that is, a 1:2 molar ratio of Si:O is assumed.

!!! $Al_2O_3$ (wt %) preferably determined by flame atomic absorption spectrometric method, and more preferably as is set forth in ISO 4688-1 (the entire disclosure of which is incorporated herein by reference); recognizing that other tests, such as x-ray diffraction (XRD), may be employed to provide results that can be correlated with flame atomic absorption spectrometric method. In certain methods, the $Al_2O_3$ wt % is not determined directly, but rather the Al concentration (inclusive of neutral and ionic species) is measured, and the $Al_2O_3$ wt % is calculated assuming the stoichiometry of $Al_2O_3$; that is, a 2:3 molar ratio of Al:O is assumed.

!!!! MgO (wt %) preferably determined by flame atomic absorption spectrometric method, and more preferably as is set forth in ISO 10204 (the entire disclosure of which is incorporated herein by reference); recognizing that other tests, such as x-ray diffraction (XRD), may be employed to provide results that can be correlated with flame atomic absorption spectrometric method. In certain methods, the MgO wt % is not determined directly, but rather the Mg concentration (inclusive of neutral and ionic species) is measured, and the MgO wt % is calculated assuming the stoichiometry of MgO; that is, a 1:1 molar ratio of Mg:O is assumed.

!!!!! CaO (wt %) preferably determined by flame atomic absorption spectrometric method, and more preferably as is set forth in ISO 10203 (the entire disclosure of which is incorporated herein by reference); recognizing that other tests, such as x-ray diffraction (XRD), may be employed to provide results that can be correlated with flame atomic absorption spectrometric method. In certain methods, the CaO wt % is not determined directly, but rather the Ca concentration (inclusive of neutral and ionic species) is measured, and the CaO wt % is calculated assuming the stoichiometry of CaO; that is, a 1:1 molar ratio of Ca:O is assumed.

& $TiO_2$ (wt %) preferably determined by a diantipyrylmethane spectrophotometric method, and more preferably as is set forth in ISO 4691 (the entire disclosure of which is incorporated herein by reference); recognizing that other tests, such as x-ray diffraction (XRD), may be employed to provide results that can be correlated with the diantipyrylmethane spectrophotometric method method. In certain methods, the $TiO_2$ wt % is not determined directly, but rather the Ti concentration (inclusive of neutral and ionic species) is measured, and the $TiO_2$ wt % is calculated assuming the stoichiometry of $TiO_2$; that is, a 1:2 molar ratio of Ti:O is assumed.

&& Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results. Actual density may also be referred to as "true density" or "skeletal density" in the art.

&&& Apparent density preferably determined by immersion in water, and more preferably as is set forth in ISO 15968 (the entire disclosure of which is incorporated herein by reference); recognizing that other tests may be employed to provide results that can be correlated with He pycnometry results.

&&&& Bulk Density ($kg/m^3$) preferably determined by measuring the mass of a test portion introduced into a container of known volume until its surface is level, and more preferably as is set forth in Method 2 of ISO 3852 (the entire disclosure of which is incorporated herein by reference); recognizing that other tests may be employed to provide results that can be correlated with the massing method.

&&&&& Porosity determined preferably by the ratio of the apparent density to the actual density:

$$\text{Porosity} = \frac{\text{apparent density}}{\text{actual density}}$$

The properties set forth in Table 3, may also be present in embodiments with, in addition to, or instead of the properties in Table 3A. Greater and lesser values for these properties may also be present in various embodiments.

In embodiments the specific surface area for the pellets can be from about 0.05 $m^2/g$ to about 35 $m^2/g$, from about 0.1 $m^2/g$ to about 5 $m^2/g$, from about 0.5 $m^2/g$ to about 10 $m^2/g$, from about 0.2 $m^2/g$ to about 5 $m^2/g$, from about 1 $m^2/g$ to about 5 $m^2/g$, from about 1 $m^2/g$ to about 20 $m^2/g$, greater than about 1 $m^2/g$, greater than about 2 $m^2/g$, less than about 5 $m^2/g$, less than about 15 $m^2/g$, less than about 20 $m^2/g$, and combinations and variations of these, as well as greater and smaller values.

In general, iron ore pellets are produced by crushing, grinding or milling of iron ore to a fine powdery form, which is then concentrated by removing impurity phases (so called "gangue") which are liberated by the grinding operation. In general, as the ore is ground to finer (smaller) particle sizes, the purity of the resulting concentrate is increased. The concentrate is then formed into a pellet by a pelletizing or balling process (using, for example, a drum or disk pelletizer). In general, greater energy input is required to produce higher purity ore pellets. Iron ore pellets are commonly marketed or sold under two principal categories: Blast Furnace (BF) grade pellets and Direct Reduction (DR Grade) (also sometimes referred to as Electric Arc Furnace (EAF) Grade) with the principal distinction being the content of $SiO_2$ and other impurity phases being higher in the BF grade pellets relative to DR Grade pellets. Typical key specifications for a DR Grade pellet or feedstock are a total Fe content by mass percentage in the range of 63-69 wt % such as 67 wt % and a $SiO_2$ content by mass percentage of less than 3 wt % such as 1 wt %. Typical key specifications for a BF grade pellet or feedstock are a total Fe content by mass percentage in the range of 60-67 wt % such as 63 wt % and a $SiO_2$ content by mass percentage in the range of 2-8 wt % such as 4 wt %.

In certain embodiments the DRI may be produced by the reduction of a "Blast Furnace" pellet, in which case the resulting DRI may have material properties as described in Table 4 below. The use of reduced BF grade DRI may be advantageous due to the lesser input energy required to produce the pellet, which translates to a lower cost of the finished material.

TABLE 4

| Material Property | Embodiment Range |
| --- | --- |
| Specific surface area* | 0.21-25 $m^2/g$ |
| Actual density** | 5.5-6.7 g/cc |
| Apparent density*** | 3.1-4.8 g/cc |
| Minimum $d_{pore,\ 90\%\ volume}$**** | 50 nm-50 μm |
| Minimum $d_{pore,\ 50\%\ surface\ area}$***** | 1 nm-10 μm |
| Total Fe (wt %)# | 81.8-89.2% |
| Metallic Fe (wt %)## | 68.7-83.2% |
| Metallization (%)### | 84-95% |
| Carbon (wt %)#### | 0.03-0.35% |
| $Fe^{2+}$ (wt %)##### | 2-8.7% |
| $Fe^{3+}$ (wt %)$ | 0.9-5.2% |
| $SiO_2$ (wt %)$$ | 3-7% |
| Ferrite (wt %, XRD)$$$ | 80-96% |
| Wustite (FeO, wt %, XRD)$$$$ | 2-13% |
| Goethite (FeOOH, wt %, XRD)$$$$$ | 0-11% |
| Cementite ($Fe_3C$, wt %, XRD)+ | 0-80% |

*Specific surface area preferably determined by the Brunauer-Emmett-Teller adsorption method ("BET"), and more preferably as the BET is set forth in ISO 9277 (the entire disclosure of which is incorporated herein by reference); recognizing that other tests, such as methylene blue (MB) staining, ethylene glycol monoethyl ether (EGME) adsorption, electrokinetic analysis of complex-ion adsorption and a Protein Retention (PR) method may be employed to provide results that can be correlated with BET results.

**Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results. Actual density may also be referred to as "true density" or "skeletal density" in the art.

***Apparent density preferably determined by immersion in water, and more preferably as is set forth in ISO 15968 (the entire disclosure of which is incorporated herein by reference); recognizing that other tests may be employed to provide results that can be correlated with He pycnometry results. Porosity may be defined as the ratio of apparent density to actual density:

$$\text{Porosity} = \frac{\text{apparent density}}{\text{actual density}}$$

****$d_{pore,\ 90\%\ volume}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 90\%\ volume}$ is the pore diameter above which 90% of the total pore volume exists.

*****$d_{pore,\ 50\%\ surface\ area}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 50\%\ surface\ area}$ is the pore diameter above which 50% of free surface area exists.

Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.

Metallic Fe (wt %) preferably determined by iron(III) chloride titrimetry, and more preferably as is set forth in ISO 16878 (the entire disclosure of which is incorporated herein by reference); recognizing that other tests, such as bromine-methanol titrimetry, may be employed to provide results that can be correlated with iron(III) chloride titrimetry.

Metallization (%) preferably determined by the ratio of metallic Fe to total Fe, each as preferably determined by the methods previously described.

Carbon (wt %) preferably determined by infrared absorption after combustion in an induction furnace, and more preferably as is set forth in ISO 9556 (the entire disclosure of which is incorporated herein by reference); recognizing that other tests, such as various combustion and inert gas fusion techniques, such as are described in ASTM E1019-18 may be employed to provide results that can be correlated with infrared absorption after combustion in an induction furnace.

$Fe^{2+}$ (wt %) preferably determined by titrimetry, and more preferably as is set forth in ASTM D3872-05 (the entire disclosure of which is incorporated herein by reference); recognizing that other tests, such as Mossbauer spectroscopy, X-ray absorption spectroscopy, etc., may be employed to provide results that can be correlated with titrimetry.

$Fe^{3+}$ (wt %) preferably determined by the mass balance relation between and among Total Fe (wt %), Metallic Fe (wt %), $Fe^{2+}$ (wt %) and $Fe^{3+}$ (wt %). Specifically the equality Total Fe (wt %)=Metallic Fe (wt %)+$Fe^{2+}$ (wt %)+$Fe^{3+}$ (wt %) must be true by conservation of mass, so $Fe^{3+}$ (wt %) may be calculated as $Fe^{3+}$ (wt %)=Total Fe (wt %)−Metallic Fe (wt %)−$Fe^{2+}$ (wt %).

$$ $SiO_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods. In certain methods, the $SiO_2$ wt % is not determined directly, but rather the Si concentration (inclusive of neutral and ionic species) is measured, and the $SiO_2$ wt % is calculated assuming the stoichiometry of $SiO_2$; that is, a 1:2 molar ratio of Si:O is assumed.

$$$ Ferrite (wt %, XRD) preferably determined by x-ray diffraction (XRD).

$$$$ Wustite (FeO, wt %, XRD) preferably determined by x-ray diffraction (XRD).

$$$$$ Goethite (FeOOH, wt %, XRD) preferably determined by x-ray diffraction (XRD).

+ Cementite ($Fe_3C$, wt %, XRD) preferably determined by x-ray diffraction (XRD).

The properties set forth in Table 4, may also be present in embodiments with, in addition to, or instead of the properties in Tables 3 and/or 3A. Greater and lesser values for these properties may also be present in various embodiments.

In certain embodiments the DRI may be produced by the reduction of a DR Grade pellet, in which case the resulting DRI may have material properties as described in Table 5 below. The use of reduced DR grade DRI may be advantageous due to the higher Fe content in the pellet which increases the energy density of the battery.

TABLE 5

| Material Property | Embodiment Range |
| --- | --- |
| Specific surface area* | 0.1-0.7 $m^2$/g as received or 0.19-25 $m^2$/g after performing a pre-charge formation step |
| Actual density** | 4.6-7.1 g/cc |
| Apparent density*** | 2.3-5.7 g/cc |
| Minimum $d_{pore,\ 90\%\ volume}$**** | 50 nm-50 μm |
| Minimum $d_{pore,\ 50\%\ surface\ area}$***** | 1 nm-10 μm |
| Total Fe (wt %)# | 80-94% |
| Metallic Fe (wt %)## | 64-94% |
| Metallization (%)### | 80-100% |
| Carbon (wt %)#### | 0-5% |
| $Fe^{2+}$ (wt %)##### | 0-8% |
| $Fe^{3+}$ (wt %)$ | 0-10% |
| $SiO_2$ (wt %)$$ | 1-4% |
| Ferrite (wt %, XRD)$$$ | 22-80% |
| Wustite (FeO, wt %, XRD)$$$$ | 0-13% |
| Goethite (FeOOH, wt %, XRD)$$$$$ | 0-23% |
| Cementite ($Fe_3C$, wt %, XRD)+ | ≪ 80% |

*Specific surface area preferably determined by the Brunauer-Emmett-Teller adsorption method ("BET"), and more preferably as the BET is set forth in ISO 9277 (the entire disclosure of which is incorporated herein by reference); recognizing that other tests, such as methylene blue (MB) staining, ethylene glycol monoethyl ether (EGME) adsorption, electrokinetic analysis of complex-ion adsorption and a Protein Retention (PR) method may be employed to provide results that can be correlated with BET results.

**Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results. Actual density may also be referred to as "true density" or "skeletal density" in the art.

***Apparent density preferably determined by immersion in water, and more preferably as is set forth in ISO 15968 (the entire disclosure of which is incorporated herein by reference); recognizing that other tests may be employed to provide results that can be correlated with He pycnometry results. Porosity may be defined as the ratio of apparent density to actual density:

$$\text{Porosity} = \frac{\text{apparent density}}{\text{actual density}}$$

**** $d_{pore,\ 90\%\ volume}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 90\%\ volume}$ is the pore diameter above which 90% of the total pore volume exists.

***** $d_{pore,\ 50\%\ surface\ area}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 50\%\ surface\ area}$ is the pore diameter above which 50% of free surface area exists.

Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.

Metallic Fe (wt %) preferably determined by iron(III) chloride titrimetry, and more preferably as is set forth in ISO 16878 (the entire disclosure of which is incorporated herein by reference); recognizing that other tests, such as bromine-methanol titimetry, may be employed to provide results that can be correlated with iron(III) chloride titrimetry.

Metallization (%) preferably determined by the ratio of metallic Fe to total Fe, each as preferably determined by the methods previously described.

Carbon (wt %) preferably determined by infrared absorption after combustion in an induction furnace, and more preferably as is set forth in ISO 9556 (the entire disclosure of which is incorporated herein by reference); recognizing that other tests, such as various combustion and inert gas fusion techniques, such as are described in ASTM E1019-18 may be employed to provide results that can be correlated with infrared absorption after combustion in an induction furnace.

$Fe^{2+}$ (wt %) preferably determined by titrimetry, and more preferably as is set forth in ASTM D3872-05 (the entire disclosure of which is incorporated herein by reference); recognizing that other tests, such as Mossbauer spectroscopy, X-ray absorption spectroscopy, etc., may be employed to provide results that can be correlated with titrimetry.

$ $Fe^{3+}$ (wt %) preferably determined by the mass balance relation between and among Total Fe (wt %), Metallic Fe (wt %), $Fe^{2+}$ (wt %) and $Fe^{3+}$ (wt %). Specifically the equality Total Fe (wt %)=Metallic Fe (wt %)+$Fe^{2+}$ (wt %)+$Fe^{3+}$ (wt %) must be true by conservation of mass, so $Fe^{3+}$ (wt %) may be calculated as $Fe^{3+}$ (wt %)=Total Fe (wt %)−Metallic Fe (wt %)−$Fe^{2+}$ (wt %).

$$ $SiO_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods. In certain methods, the $SiO_2$ wt % is not determined directly, but rather the Si concentration (inclusive of neutral and ionic species) is measured, and the $SiO_2$ wt % is calculated assuming the stoichiometry of $SiO_2$; that is, a 1:2 molar ratio of Si:O is assumed.

$$$ Ferrite (wt %, XRD) preferably determined by x-ray diffraction (XRD).

$$$$ Wustite (FeO, wt %, XRD) preferably determined by x-ray diffraction (XRD).

$$$$$ Goethite (FeOOH, wt %, XRD) preferably determined by x-ray diffraction (XRD).

+ Cementite ($Fe_3C$, wt %, XRD) preferably determined by x-ray diffraction (XRD).

The properties set forth in Table 5, may also be present in embodiments with, in addition to, or instead of the properties in Tables 3, 3A, and/or 4. Greater and lesser values for these properties may also be present in various embodiments.

Various embodiments may provide devices and/or methods for use in bulk energy storage systems, such as long duration energy storage (LODES) systems, short duration energy storage (SDES) systems, etc. As an example, various embodiments may provide batteries for bulk energy storage systems, such as batteries for LODES systems. Renewable power sources are becoming more prevalent and cost effective. However, many renewable power sources face an intermittency problem that is hindering renewable power source adoption. The impact of the intermittent tendencies of renewable power sources may be mitigated by pairing renewable power sources with bulk energy storage systems, such as LODES systems, SDES systems, etc. To support the adoption of combined power generation, transmission, and storage systems (e.g., a power plant having a renewable power generation source paired with a bulk energy storage system and transmission facilities at any of the power plant and/or the bulk energy storage system) devices and methods to support the design and operation of such combined power generation, transmission, and storage systems, such as the various embodiment devices and methods described herein, are needed.

A combined power generation, transmission, and storage system may be a power plant including one or more power generation sources (e.g., one or more renewable power generation sources, one or more non-renewable power generations sources, combinations of renewable and non-renewable power generation sources, etc.), one or more transmission facilities, and one or more bulk energy storage systems. Transmission facilities at any of the power plant and/or the bulk energy storage systems may be co-optimized with the power generation and storage system or may impose constraints on the power generation and storage system design and operation. The combined power generation, transmission, and storage systems may be configured to meet various output goals, under various design and operating constraints.

FIGS. 15-23 illustrate various example systems in which one or more aspects of the various embodiments may be used as part of bulk energy storage systems, such as LODES systems, SDES systems, etc. For example, various embodiments described herein with reference to FIGS. 1-14 may be used as batteries and/or systems for bulk energy storage systems, such as LODES systems, SDES systems, etc. and/or various components, such as various electrodes, as described herein may be used as components for bulk energy storage systems. As used herein, the term "LODES system" may mean a bulk energy storage system configured to may have a rated duration (energy/power ratio) of 24 hours (h) or greater, such as a duration of 24 h, a duration of 24 h to 50 h, a duration of greater than 50 h, a duration of 24 h to 150 h, a duration of greater than 150 h, a duration of 24 h to 200 h, a duration greater than 200 h, a duration of 24 h to 500 h, a duration greater than 500 h, etc.

Figure 15:
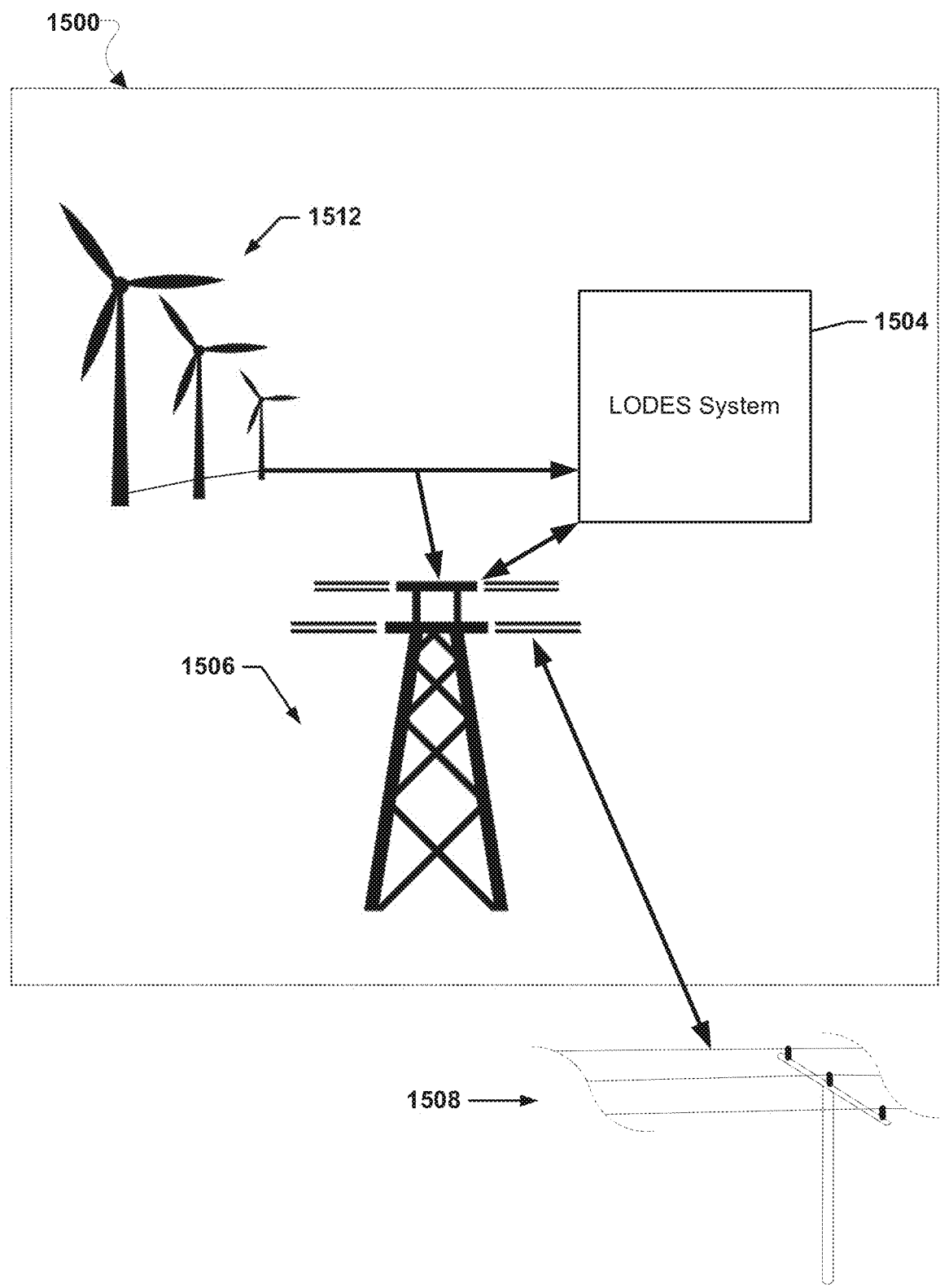
FIGS. 15-23 illustrate various example systems in which one or more aspects of the various embodiments may be used as part of bulk energy storage systems.

FIG. 15 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include various embodiment batteries described herein, various electrodes described herein, etc. The LODES system 1504 may be electrically connected to a wind farm 1512 and one or more transmission facilities 1506. The wind farm 1512 may be electrically connected to the transmission facilities 1506. The transmission facilities 1506 may be electrically connected to the grid 1508. The wind farm 1512 may generate power and the wind farm 1512 may output generated power to the LODES system 1504 and/or the transmission facilities 1506. The LODES system 1504 may store power received from the wind farm 1512 and/or the transmission facilities 1506. The LODES system 1504 may output stored power to the transmission facilities 1506. The transmission facilities 1506 may output power received from one or both of the wind farm 1512 and LODES system 1504 to the grid 1508 and/or may receive power from the grid 1508 and output that power to the LODES system 1504. Together the wind farm 1512, the LODES system 1504, and the transmission facilities 1506 may constitute a power plant 1500 that may be a combined power generation, transmission, and storage system. The power generated by the wind farm 1512 may be directly fed to the grid 1508 through the transmission facilities 1506, or may be first stored in the LODES system 1504. In certain cases the power supplied to the grid 1508 may come entirely from the wind farm 1512, entirely from the LODES system 1504, or from a combination of the wind farm 1512 and the LODES system 1504. The dispatch of power from the combined wind farm 1512 and LODES system 1504 power plant 1500 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 1500, the LODES system 1504 may be used to reshape and "firm" the power produced by the wind farm 1512. In one such example, the wind farm 1512 may have a peak generation output (capacity) of 260 megawatts (MW) and a capacity factor (CF) of 41%. The LODES system 1504 may have a power rating (capacity) of 106 MW, a rated duration (energy/power ratio) of 150 hours (h), and an energy rating of 15,900 megawatt hours (MWh). In another such example, the wind farm 1512 may have a peak generation output (capacity) of 300 MW and a capacity factor (CF) of 41%. The LODES system 1504 may have a power rating of 106 MW, a rated duration (energy/power ratio) of 200 h and an energy rating of 21,200 MWh. In another such example, the wind farm 1512 may have a peak generation output (capacity) of 176 MW and a capacity factor (CF) of 53%. The LODES system 1504 may have a power rating (capacity) of 88 MW, a rated duration (energy/power ratio) of 150 h and an energy rating of 13,200 MWh. In another such example, the wind farm 1512 may have a peak generation output (capacity) of 277 MW and a capacity factor (CF) of 41%. The LODES system 1504 may have a power rating (capacity) of 97 MW, a rated duration (energy/power ratio) of 50 h and an energy rating of 4,850 MWh. In another such example, the wind farm 1512 may have a peak generation output (capacity) of 315 MW and a capacity factor (CF) of 41%. The LODES system 1504 may have a power rating (capacity) of 110 MW, a rated duration (energy/power ratio) of 25 h and an energy rating of 2,750 MWh.

Figure 16:
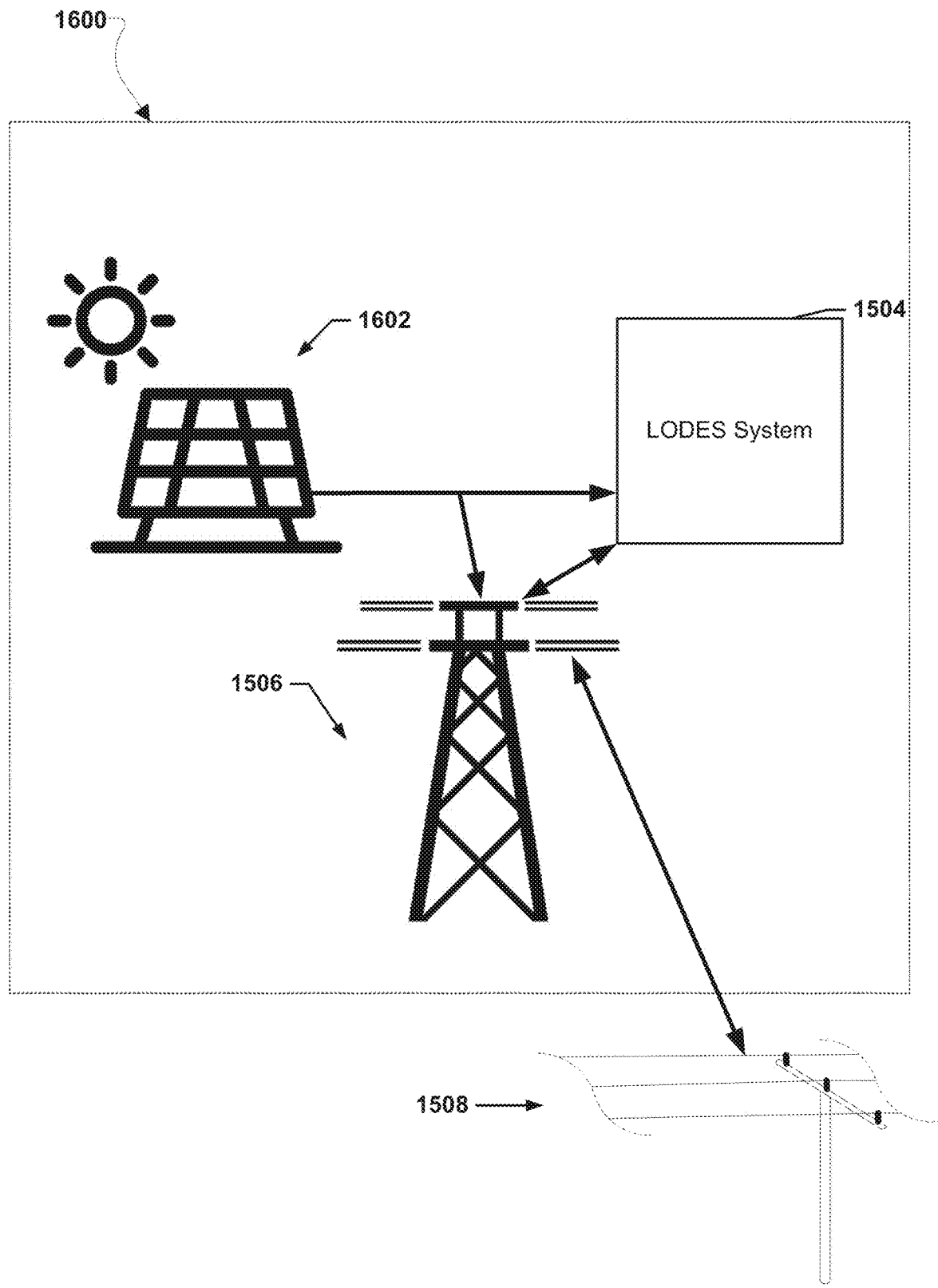

FIG. 16 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include various embodiment batteries described herein, various electrodes described herein, etc. The system of FIG. 16 may be similar to the system of FIG. 15, except a photovoltaic (PV) farm 1602 may be substituted for the wind farm 1512. The LODES system 1504 may be electrically connected to the PV farm 1602 and one or more transmission facilities 1506. The PV farm 1602 may be electrically connected to the transmission facilities 1506. The transmission facilities 1506 may be electrically connected to the grid 1508. The PV farm 1602 may generate power and the PV farm 1602 may output generated power to the LODES system 1504 and/or the transmission facilities 1506. The LODES system 1504 may store power received from the PV farm 1602 and/or the transmission facilities 1506. The LODES system 1504 may output stored power to the transmission facilities 1506. The transmission facilities 1506 may output power received from one or both of the PV farm 1602 and LODES system 1504 to the grid 1508 and/or may receive power from the grid 1508 and output that power to the LODES system 1504. Together the PV farm 1602, the LODES system 1504, and the transmission facilities 1506 may constitute a power plant 1600 that may be a combined power generation, transmission, and storage system. The power generated by the PV farm 1602 may be directly fed to the grid 1508 through the transmission facilities 1506, or may be first stored in the LODES system 1504. In certain cases the power supplied to the grid 1508 may come entirely from the PV farm 1602, entirely from the LODES system 1504, or from a combination of the PV farm 1602 and the LODES system 1504. The dispatch of power from the combined PV farm 1602 and LODES system 1504 power plant 1600 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 1600, the LODES system 1504 may be used to reshape and "firm" the power produced by the PV farm 1602. In one such example, the PV farm 1602 may have a peak generation output (capacity) of 490 MW and a capacity factor (CF) of 24%. The LODES system 1504 may have a power rating (capacity) of 340 MW, a rated duration (energy/power ratio) of 150 h and an energy rating of 51,000 MWh. In another such example, the PV farm 1602 may have a peak generation output (capacity) of 680 MW and a capacity factor (CF) of 24%. The LODES system 1504 may have a power rating (capacity) of 410 MW, a rated duration (energy/power ratio) of 200 h, and an energy rating of 82,000 MWh. In another such example, the PV farm 1602 may have a peak generation output (capacity) of 330 MW and a capacity factor (CF) of 31%. The LODES system 1504 may have a power rating (capacity) of 215 MW, a rated duration (energy/power ratio)

of 150 h, and an energy rating of 32,250 MWh. In another such example, the PV farm 1602 may have a peak generation output (capacity) of 510 MW and a capacity factor (CF) of 24%. The LODES system 1504 may have a power rating (capacity) of 380 MW, a rated duration (energy/power ratio) of 50 h, and an energy rating of 19,000 MWh. In another such example, the PV farm 1602 may have a peak generation output (capacity) of 630 MW and a capacity factor (CF) of 24%. The LODES system 1504 may have a power rating (capacity) of 380 MW, a rated duration (energy/power ratio) of 25 h, and an energy rating of 9,500 MWh.

Figure 17:
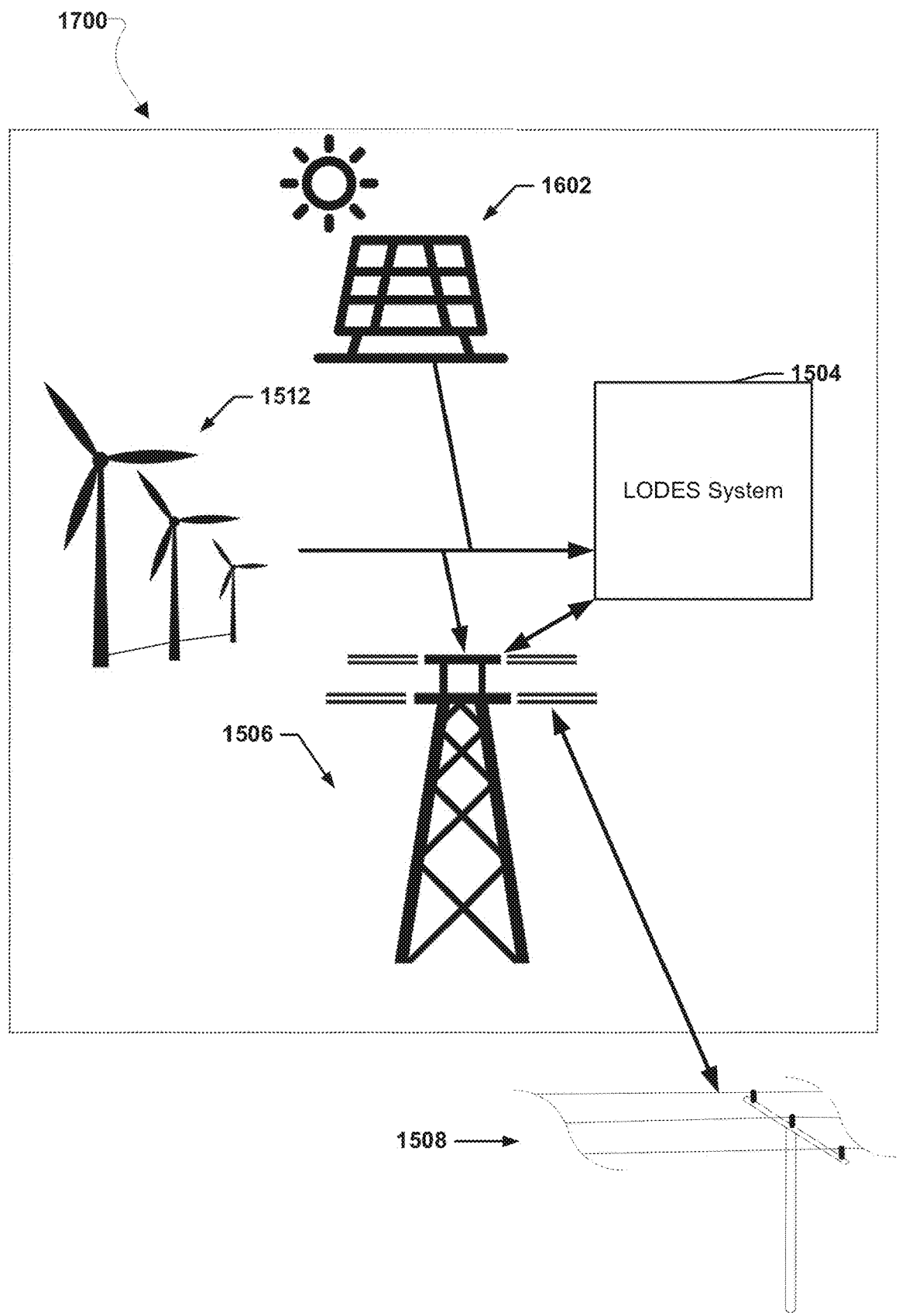

FIG. 17 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include various embodiment batteries described herein, various electrodes described herein, etc. The system of FIG. 17 may be similar to the systems of FIGS. 15 and 16, except the wind farm 1512 and the photovoltaic (PV) farm 1602 may both be power generators working together in the power plant 1700. Together the PV farm 1602, wind farm 1512, the LODES system 1504, and the transmission facilities 1506 may constitute the power plant 1700 that may be a combined power generation, transmission, and storage system. The power generated by the PV farm 1602 and/or the wind farm 1512 may be directly fed to the grid 1508 through the transmission facilities 1506, or may be first stored in the LODES system 1504. In certain cases the power supplied to the grid 1508 may come entirely from the PV farm 1602, entirely from the wind farm 1512, entirely from the LODES system 1504, or from a combination of the PV farm 1602, the wind farm 1512, and the LODES system 1504. The dispatch of power from the combined wind farm 1512, PV farm 1602, and LODES system 1504 power plant 1700 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 1700, the LODES system 1504 may be used to reshape and "firm" the power produced by the wind farm 1512 and the PV farm 1602. In one such example, the wind farm 1512 may have a peak generation output (capacity) of 126 MW and a capacity factor (CF) of 41% and the PV farm 1602 may have a peak generation output (capacity) of 126 MW and a capacity factor (CF) of 24%. The LODES system 1504 may have a power rating (capacity) of 63 MW, a rated duration (energy/power ratio) of 150 h, and an energy rating of 9,450 MWh. In another such example, the wind farm 1512 may have a peak generation output (capacity) of 170 MW and a capacity factor (CF) of 41% and the PV farm 1602 may have a peak generation output (capacity) of 110 MW and a capacity factor (CF) of 24%. The LODES system 1504 may have a power rating (capacity) of 57 MW, a rated duration (energy/power ratio) of 200 h, and an energy rating of 11,400 MWh. In another such example, the wind farm 1512 may have a peak generation output (capacity) of 105 MW and a capacity factor (CF) of 51% and the PV farm 1602 may have a peak generation output (capacity) of 70 MW and a capacity factor (CF) of 31 The LODES system 1504 may have a power rating (capacity) of 61 MW, a rated duration (energy/power ratio) of 150 h, and an energy rating of 9,150 MWh. In another such example, the wind farm 1512 may have a peak generation output (capacity) of 135 MW and a capacity factor (CF) of 41% and the PV farm 1602 may have a peak generation output (capacity) of 90 MW and a capacity factor (CF) of 24%. The LODES system 1504 may have a power rating (capacity) of 68 MW, a rated duration (energy/power ratio) of 50 h, and an energy rating of 3,400 MWh. In another such example, the wind farm 1512 may have a peak generation output (capacity) of 144 MW and a capacity factor (CF) of 41% and the PV farm 1602 may have a peak generation output (capacity) of 96 MW and a capacity factor (CF) of 24%. The LODES system 1504 may have a power rating (capacity) of 72 MW, a rated duration (energy/power ratio) of 25 h, and an energy rating of 1,800 MWh.

Figure 18:
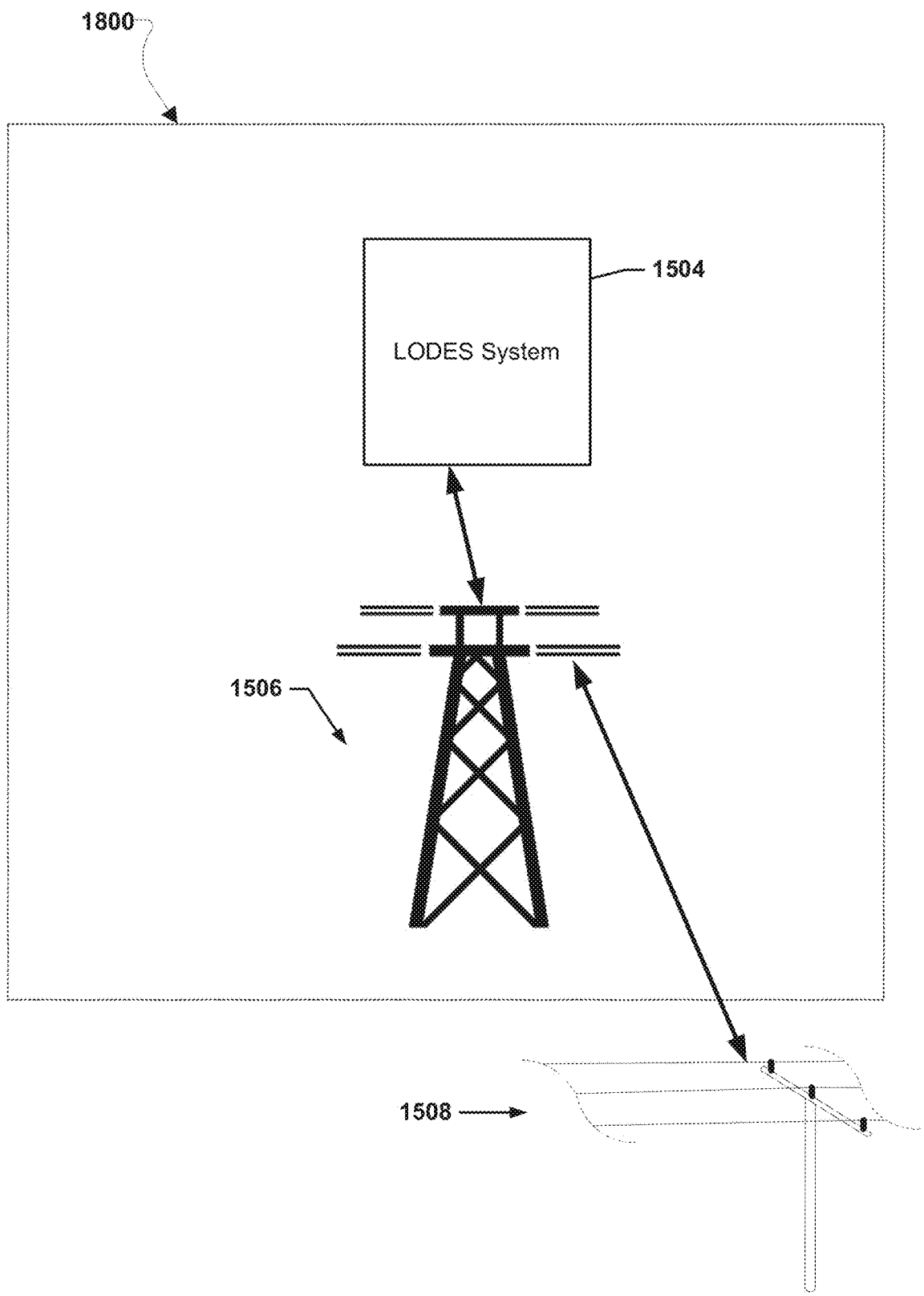

FIG. 18 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include various embodiment batteries described herein, various electrodes described herein, etc. The LODES system 1504 may be electrically connected to one or more transmission facilities 1506. In this manner, the LODES system 1504 may operate in a "stand-alone" manner to arbiter energy around market prices and/or to avoid transmission constraints. The LODES system 1504 may be electrically connected to one or more transmission facilities 1506. The transmission facilities 1506 may be electrically connected to the grid 1508. The LODES system 1504 may store power received from the transmission facilities 1506. The LODES system 1504 may output stored power to the transmission facilities 1506. The transmission facilities 1506 may output power received from the LODES system 1504 to the grid 1508 and/or may receive power from the grid 1508 and output that power to the LODES system 1504.

Together the LODES system 1504 and the transmission facilities 1506 may constitute a power plant 1800. As an example, the power plant 1800 may be situated downstream of a transmission constraint, close to electrical consumption. In such an example downstream situated power plant 1800, the LODES system 1504 may have a duration of 24 h to 500 h and may undergo one or more full discharges a year to support peak electrical consumptions at times when the transmission capacity is not sufficient to serve customers. Additionally in such an example downstream situated power plant 1800, the LODES system 1504 may undergo several shallow discharges (daily or at higher frequency) to arbiter the difference between nighttime and daytime electricity prices and reduce the overall cost of electrical service to customer. As a further example, the power plant 1800 may be situated upstream of a transmission constraint, close to electrical generation. In such an example upstream situated power plant 1800, the LODES system 1504 may have a duration of 24 h to 500 h and may undergo one or more full charges a year to absorb excess generation at times when the transmission capacity is not sufficient to distribute the electricity to customers. Additionally in such an example upstream situated power plant 1800, the LODES system 1504 may undergo several shallow charges and discharges (daily or at higher frequency) to arbiter the difference between nighttime and daytime electricity prices and maximize the value of the output of the generation facilities.

Figure 19:
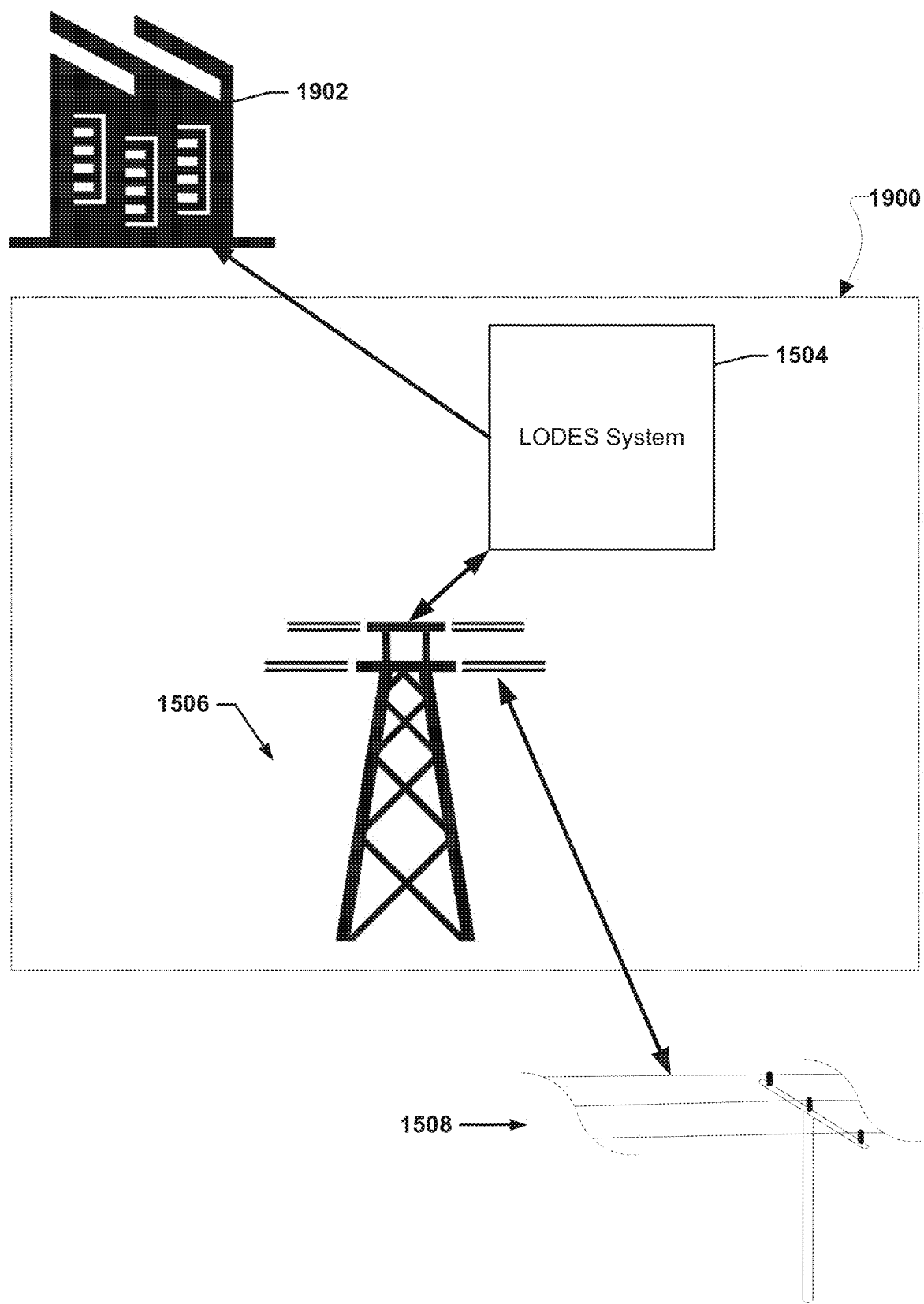

FIG. 19 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include various embodiment batteries described herein, various electrodes described herein, etc. The LODES system 1504 may be electrically connected to a commercial and industrial (C&I) customer 1902, such as a data center, factory, etc. The LODES system 1504 may be electrically connected to one or more transmission facilities 1506. The transmission facilities 1506 may be electrically connected to the grid 1508. The transmission facilities 1506 may receive power from the grid 1508 and output that power to the LODES system 1504. The LODES system 1504 may store power received from the transmission facilities 1506. The LODES system 1504 may output stored power to the C&I customer 1902. In this manner, the LODES system 1504 may operate to reshape electricity purchased from the grid 1508 to match the consumption pattern of the C&I customer 1902.

Together, the LODES system 1504 and transmission facilities 1506 may constitute a power plant 1900. As an example, the power plant 1900 may be situated close to electrical consumption, i.e., close to the C&I customer 1902, such as between the grid 1508 and the C&I customer 1902. In such an example, the LODES system 1504 may have a duration of 24 h to 500 h and may buy electricity from the markets and thereby charge the LODES system 1504 at times when the electricity is cheaper. The LODES system 1504 may then discharge to provide the C&I customer 1902 with electricity at times when the market price is expensive, therefore offsetting the market purchases of the C&I customer 1902. As an alternative configuration, rather than being situated between the grid 1508 and the C&I customer 1902, the power plant 1900 may be situated between a renewable source, such as a PV farm, wind farm, etc., and the transmission facilities 1506 may connect to the renewable source. In such an alternative example, the LODES system 1504 may have a duration of 24 h to 500 h, and the LODES system 1504 may charge at times when renewable output may be available. The LODES system 1504 may then discharge to provide the C&I customer 1902 with renewable generated electricity so as to cover a portion, or the entirety, of the C&I customer 1902 electricity needs.

Figure 20:
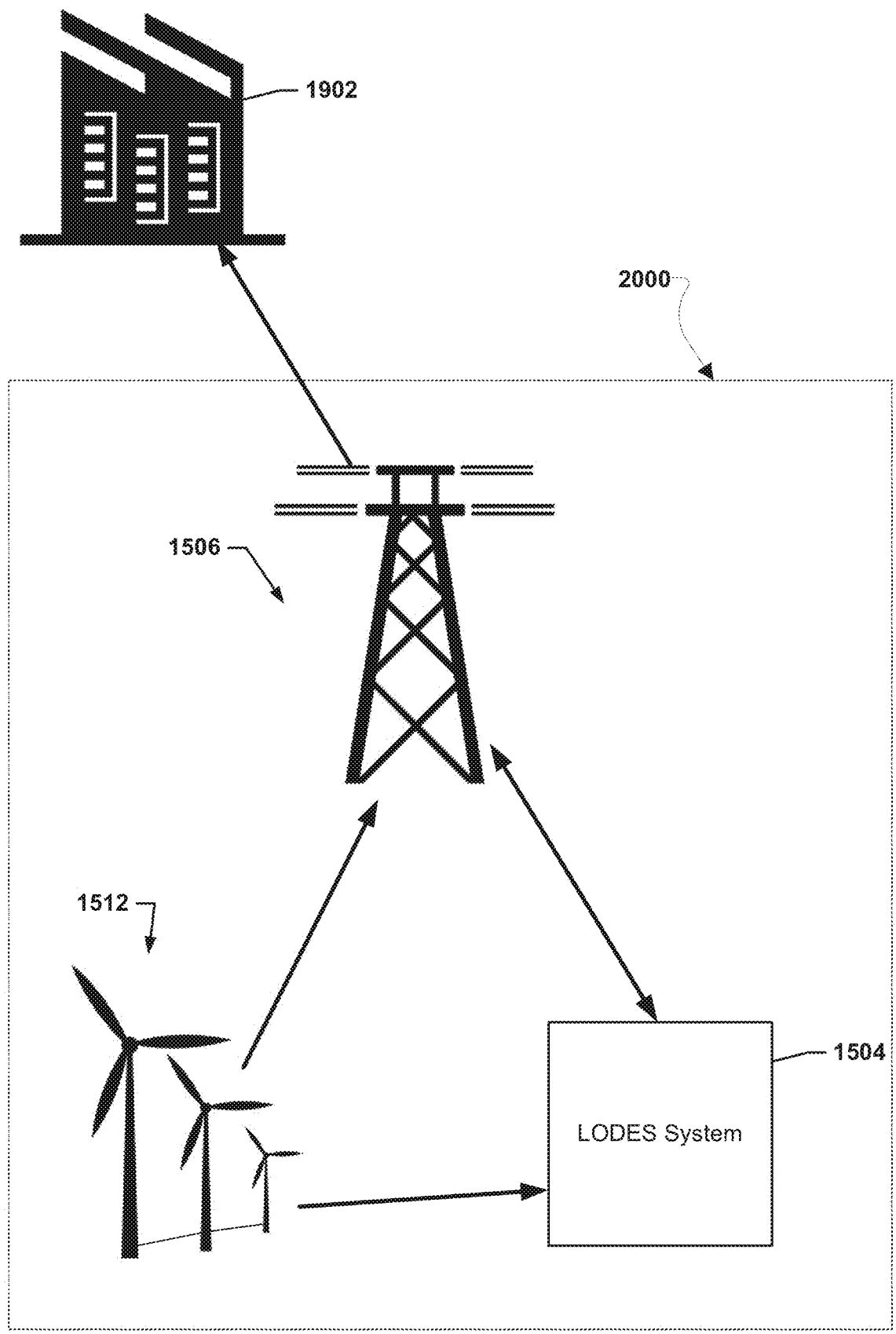

FIG. 20 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include various embodiment batteries described herein, various electrodes described herein, etc. The LODES system 1504 may be electrically connected to a wind farm 1512 and one or more transmission facilities 1506. The wind farm 1512 may be electrically connected to the transmission facilities 1506. The transmission facilities 1506 may be electrically connected to a C&I customer 1902. The wind farm 1512 may generate power and the wind farm 1512 may output generated power to the LODES system 1504 and/or the transmission facilities 1506. The LODES system 1504 may store power received from the wind farm 1512.

The LODES system 1504 may output stored power to the transmission facilities 1506. The transmission facilities 1506 may output power received from one or both of the wind farm 1512 and LODES system 1504 to the C&I customer 1902. Together the wind farm 1512, the LODES system 1504, and the transmission facilities 1506 may constitute a power plant 2000 that may be a combined power generation, transmission, and storage system. The power generated by the wind farm 1512 may be directly fed to the C&I customer 1902 through the transmission facilities 1506, or may be first stored in the LODES system 1504. In certain cases, the power supplied to the C&I customer 1902 may come entirely from the wind farm 1512, entirely from the LODES system 1504, or from a combination of the wind farm 1512 and the LODES system 1504. The LODES system 1504 may be used to reshape the electricity generated by the wind farm 1512 to match the consumption pattern of the C&I customer 1902. In one such example, the LODES system 1504 may have a duration of 24 h to 500 h and may charge when renewable generation by the wind farm 1512 exceeds the C&I customer 1902 load. The LODES system 1504 may then discharge when renewable generation by the wind farm 1512 falls short of C&I customer 1902 load so as to provide the C&I customer 1902 with a firm renewable profile that offsets a fraction, or all of, the C&I customer 1902 electrical consumption.

Figure 21:
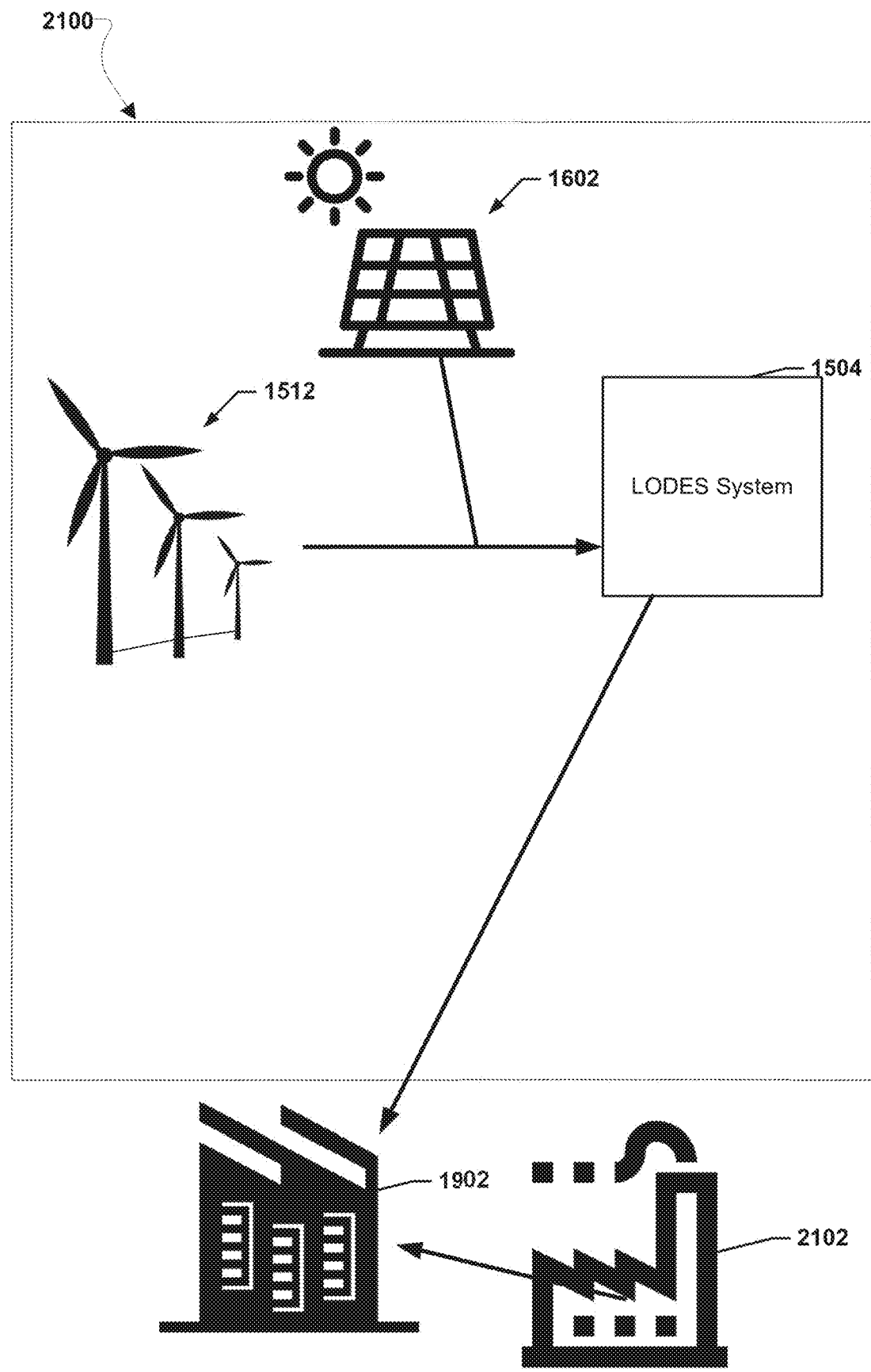

FIG. 21 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include various embodiment batteries described herein, various electrodes described herein, etc. The LODES system 1504 may be part of a power plant 2100 that is used to integrate large amounts of renewable generation in microgrids and harmonize the output of renewable generation by, for example a PV farm 1602 and wind farm 1512, with existing thermal generation by, for example a thermal power plant 2102 (e.g., a gas plant, a coal plant, a diesel generator set, etc., or a combination of thermal generation methods), while renewable generation and thermal generation supply the C&I customer 1902 load at high availability. Microgrids, such as the microgrid constituted by the power plant 2100 and the thermal power plant 2102, may provide availability that is 90% or higher. The power generated by the PV farm 1602 and/or the wind farm 1512 may be directly fed to the C&I customer 1902, or may be first stored in the LODES system 1504.

In certain cases the power supplied to the C&I customer 1902 may come entirely from the PV farm 1602, entirely from the wind farm 1512, entirely from the LODES system 1504, entirely from the thermal power plant 902, or from any combination of the PV farm 1602, the wind farm 1512, the LODES system 1504, and/or the thermal power plant 2102. As examples, the LODES system 1504 of the power plant 2100 may have a duration of 24 h to 500 h. As a specific example, the C&I customer 1902 load may have a peak of 100 MW, the LODES system 1504 may have a power rating of 14 MW and duration of 150 h, natural gas may cost $6/million British thermal units (MMBTU), and the renewable penetration may be 58%. As another specific example, the C&I customer 1902 load may have a peak of 100 MW, the LODES system 1504 may have a power rating of 25 MW and duration of 150 h, natural gas may cost $8/MMBTU, and the renewable penetration may be 65%.

Figure 22:
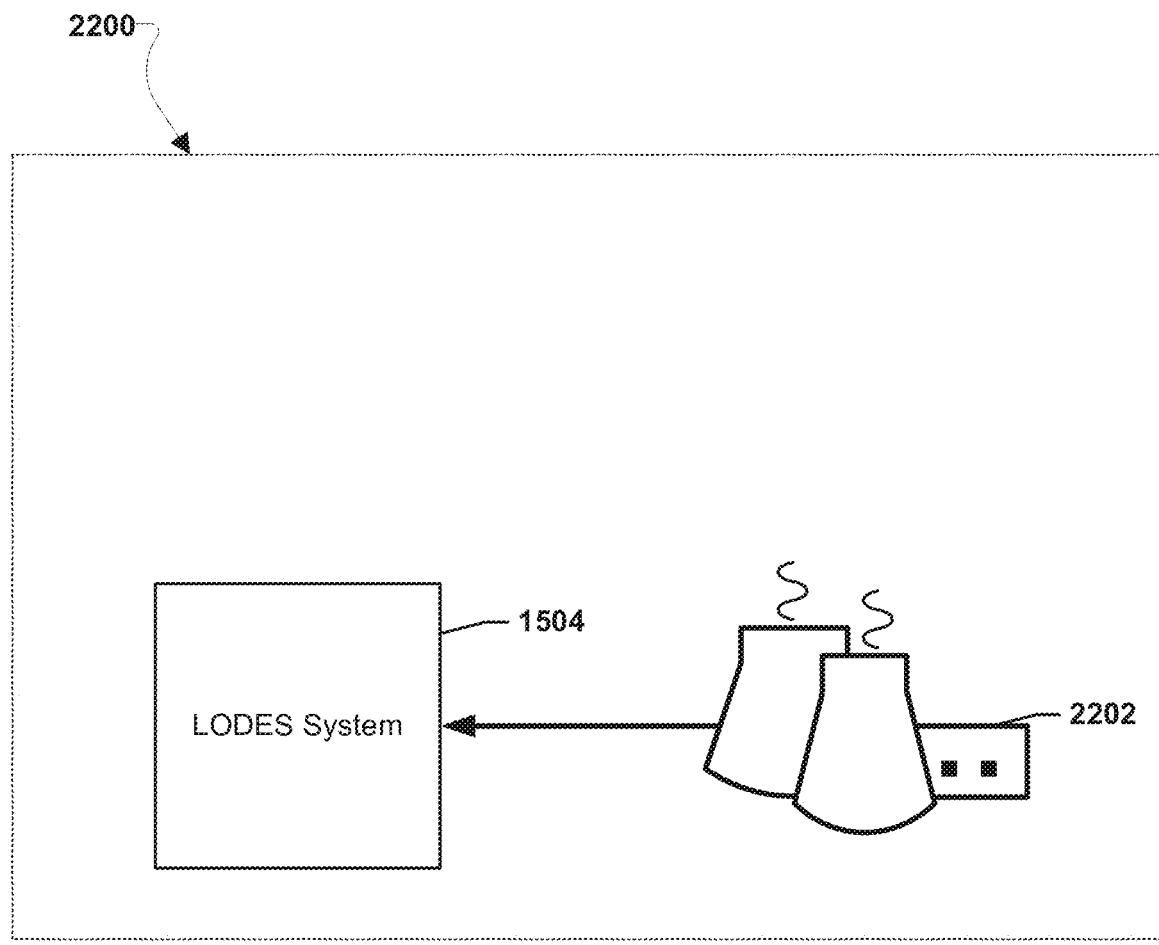

FIG. 22 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include various embodiment batteries described herein, various electrodes described herein, etc. The LODES system 1504 may be used to augment a nuclear plant 2202 (or other inflexible generation facility, such as a thermal, a biomass, etc., and/or any other type plant having a ramp-rate lower than 50% of rated power in one hour and a high capacity factor of 80% or higher) to add flexibility to the combined output of the power plant 2200 constituted by the combined LODES system 1504 and nuclear plant 2202. The nuclear plant 2202 may operate at high capacity factor and at the highest efficiency point, while the LODES system 1504 may charge and discharge to effectively reshape the output of the nuclear plant 2202 to match a customer electrical consumption and/or a market price of electricity. As examples, the LODES system 1504 of the power plant 2200 may have a duration of 24 h to 500 h. In one specific example, the nuclear plant 2202 may have 1,000 MW of rated output and the nuclear plant 2202 may be forced into prolonged periods of minimum stable generation or even shutdowns because of depressed market pricing of electricity. The LODES system 1504 may avoid facility shutdowns and charge at times of depressed market pricing; and the LODES system 1504 may subsequently discharge and boost total output generation at times of inflated market pricing.

Figure 23:
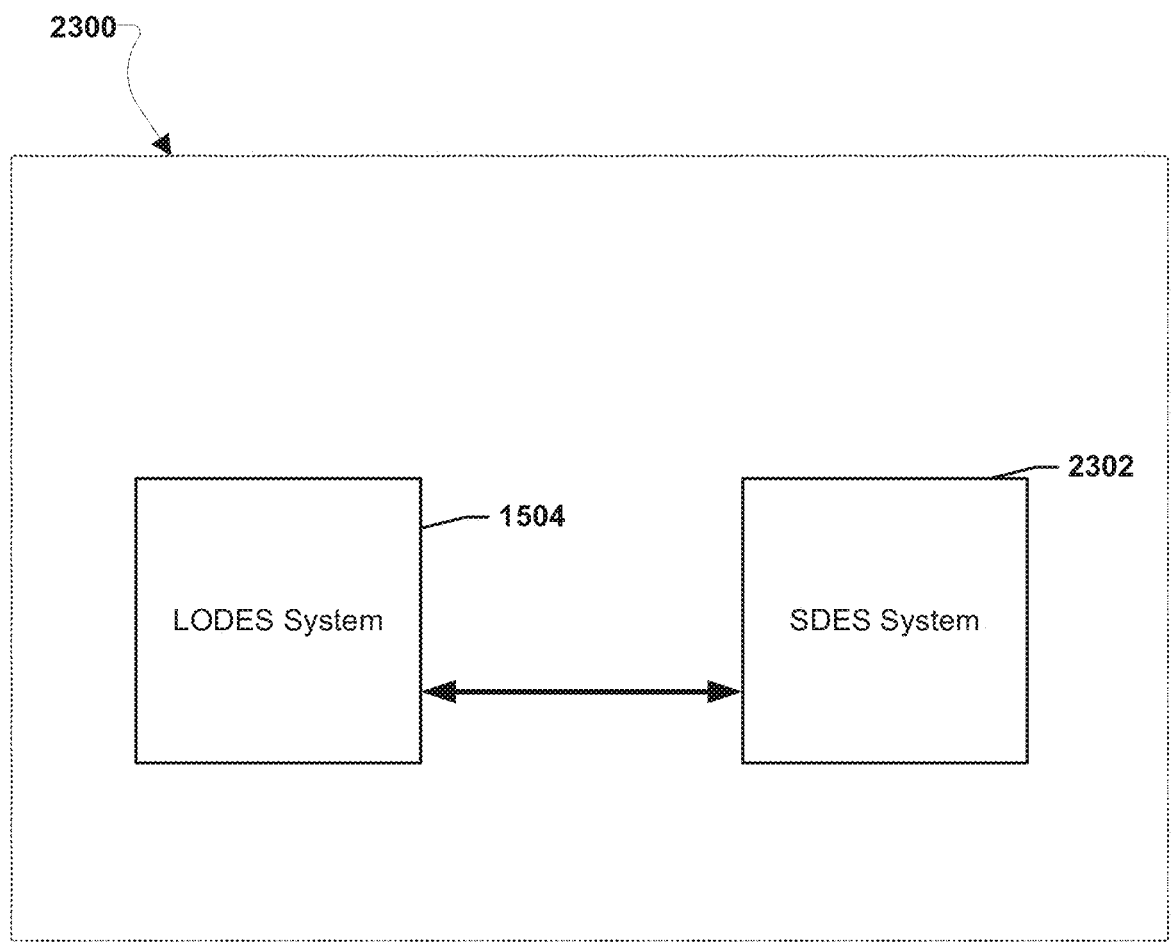

FIG. 23 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include various embodiment batteries described herein, various electrodes described herein, etc. The LODES system 1504 may operate in tandem with a SDES system 2302. Together the LODES system 1504 and SDES system 2302 may constitute a power plant 2300. As an example, the LODES system 1504 and SDES system 2302 may be co-optimized whereby the LODES system 1504 may provide various services, including long-duration back-up and/or bridging through multi-day fluctuations (e.g., multi-day fluctuations in market pricing, renewable generation, electrical consumption, etc.), and the SDES system 2302 may provide various services, including fast ancillary services (e.g. voltage control, frequency regulation, etc.) and/or bridging through intra-day fluctuations (e.g., intra-day fluctuations in market pricing, renewable generation, electrical consumption, etc.). The SDES system 2302 may have durations of less than 10 hours and round-trip efficiencies of greater than 80%. The LODES system 1504 may have durations of 24 h to 500 h and round-trip efficiencies of greater than 40%. In one such example, the LODES system 1504 may have a duration of 150 hours and support customer electrical consumption for up to a week of renewable under-generation. The LODES system 1504 may also support customer electrical consumption during intra-day under-generation events, augmenting the capabilities of the SDES system 2302. Further, the SDES system 2302 may supply customers during intra-day under-generation events and provide power conditioning and quality services such as voltage control and frequency regulation.

Example 1. A metal/air energy storage system, comprising: a metal electrode vessel, the metal electrode vessel comprising a bed of metal; at least one other electrode; and a pump configured to move electrolyte between the metal electrode vessel and the at least one other electrode. Example 2. The system of example 1, wherein the at least one other electrode comprises: an oxygen reduction reaction (ORR) electrode; and an oxygen evolution reaction (OER) electrode, wherein the pump is configured to move electrolyte between the metal electrode vessel, the ORR electrode, and the OER electrode. Example 3. The system of example 2, wherein the ORR electrode comprises a plate structure, a shell and tube structure, or a spiral wound structure. Example 4. The system of example 2, wherein the ORR electrode is supplied with an oxygenated electrolyte stream, a mixed air and electrolyte stream, or separate air and electrolyte streams. Example 5. The system of example 2, wherein the OER electrode is a vertical OER electrode or a horizontal OER electrode. Example 6. The system of any of examples 1-5, wherein the electrolyte is concentrated hydroxide electrolyte. Example 7. The system of any of examples 1-6, wherein the metal electrode is an iron electrode. Example 8. The system of example 7, wherein the at least one other electrode comprises manganese. Example 9. The system of example 8, wherein at least one other electrode comprises manganese dioxide, carbon, and a polymer binder. Example 10. The system of example 7, wherein at least one other electrode comprises nickel. Example 11. The system of example 10, wherein at least one other electrode comprises nickel, carbon, and a polymer binder. Example 12. The system of example 7, wherein the iron electrode comprises direct reduced iron (DRI). Example 13. The system of example 7, wherein the iron electrode comprises packed or sintered iron powder. Example 14. The system of example 13, wherein the iron powder is sponge iron powder or atomized iron powder. Example 15. The system of example 7, wherein the iron electrode comprises: sponge iron powder and a polymer binder; or atomized iron powder and a polymer binder. Example 16. The system of example 15, wherein the iron electrode is formed without carbon. Example 17. The system of example 15, wherein the iron electrode further comprises carbon. Example 18. An iron-air flow battery, comprising: a fully open reactor through which iron materials and air are flowed. Example 19. The iron-air flow battery of example 18, wherein the iron materials comprise direct reduced iron (DRI). Example 20. The iron-air flow battery of example 18, wherein the iron materials comprise packed or sintered iron powder. Example 21. The iron-air flow battery of example 20, wherein the iron powder is sponge iron powder or atomized iron powder. Example 22. The iron-air flow battery of example 18, wherein the iron materials comprise: sponge iron powder and a polymer binder; or atomized iron powder and a polymer binder. Example 23. The iron-air flow battery of example 22, wherein the iron materials are do not include carbon. Example 24. The iron-air flow battery of example 22, wherein the iron materials further comprise carbon. Example 25. A metal/air energy storage system, comprising: a metal flow passage; metal pellets; one or more air electrodes; and one or more separators configured to separate the metal flow passage from the one or more air electrodes, wherein the system is configured such that the metal pellets are flowed through the metal flow passage past the one or more air electrodes. Example 26. The system of example 25, wherein the metal pellets comprise direct reduced iron (DRI). Example 27. The system of example 25, further comprising one or more electrolyte flow passages, wherein the system is configured such that the one or more electrolyte flow passages flow electrolyte between the metal pellets and the one or more air electrodes. Example 28. A bulk energy storage system, comprising: one or more systems and/or batteries of any of examples 1-27. Example 29. A long duration energy storage system configured to hold an electrical charge for at least 24 hours, the system comprising one or more systems and/or batteries of any of examples 1-27.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A system for energy storage, the system comprising:
   a metal electrode comprising a metal electrode containment vessel and a bed of metal therein;
   an oxygen reduction (ORR) electrode;
   an oxygen evolution reaction (OER) electrode fluidically decoupled from the ORR electrode;
   a pump; and
   an electrolyte piping system fluidically coupling the pump with the metal electrode, and the electrolyte piping system selectively switchable to fluidically isolate the ORR electrode and the OER electrode from one another and from the metal electrode.

2. The system of claim 1, wherein the ORR electrode comprises a plate structure.

3. The system of claim 1, wherein the ORR electrode is supplied with an oxygenated electrolyte stream.

4. The system of claim 1, wherein the OER electrode is a vertical OER electrode.

5. The system of claim 1, further comprising an electrolyte movable by the pump, wherein the electrolyte is concentrated hydroxide electrolyte.

6. The system of claim 1, wherein the metal electrode is an iron electrode.

7. The system of claim 6, wherein the iron electrode comprises direct reduced iron (DRI).

8. The system of claim 6, wherein the iron electrode comprises packed or sintered iron powder.

9. The system of claim 8, wherein the iron powder is sponge iron powder or atomized iron powder.

10. The system of claim 9, wherein the iron electrode further comprises a polymer binder.

11. The system of claim 10, wherein the iron electrode is formed without carbon.

12. The system of claim 10, wherein the iron electrode further comprises carbon.

13. The system of claim 1, wherein the ORR electrode comprises a shell and tube structure.

14. The system of claim 1, wherein the ORR electrode comprises a spiral wound structure.

15. The system of claim 1, wherein the ORR electrode is supplied with a mixed air and electrolyte stream.

16. The system of claim 1, wherein the ORR electrode is supplied with separate air and electrolyte streams.

17. The system of claim 1, wherein the OER is a horizontal OER electrode.

* * * * *